(12) United States Patent
Mao

(10) Patent No.: US 11,648,559 B2
(45) Date of Patent: May 16, 2023

(54) DEVICES AND METHODS FOR SEPARATING CIRCULATING TUMOR CELLS FROM BIOLOGICAL SAMPLES

(71) Applicant: University of Georgia Research Foundation, Inc., Athens, GA (US)

(72) Inventor: Leidong Mao, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 494 days.

(21) Appl. No.: 16/636,517

(22) PCT Filed: Aug. 4, 2018

(86) PCT No.: PCT/US2018/045294
§ 371 (c)(1),
(2) Date: Feb. 4, 2020

(87) PCT Pub. No.: WO2019/028445
PCT Pub. Date: Feb. 7, 2019

(65) Prior Publication Data
US 2020/0238287 A1  Jul. 30, 2020

Related U.S. Application Data

(60) Provisional application No. 62/668,355, filed on May 8, 2018, provisional application No. 62/541,552, filed on Aug. 4, 2017.

(51) Int. Cl.
*B01L 3/00* (2006.01)
*G01N 1/40* (2006.01)

(52) U.S. Cl.
CPC .............. *B01L 3/502761* (2013.01); *B01L 3/502776* (2013.01); *G01N 1/4077* (2013.01);
(Continued)

(58) Field of Classification Search
CPC ......... B01L 3/502761; B01L 3/502776; B01L 2200/0652; B01L 2400/043; G01N 1/4077; G01N 2015/1081
See application file for complete search history.

(56) References Cited

U.S. PATENT DOCUMENTS

| 6,432,630 B1 | 8/2002 | Blankenstein |
| 8,021,614 B2 * | 9/2011 | Huang ............... C12Q 1/686 422/50 |

(Continued)

FOREIGN PATENT DOCUMENTS

| DE | 102009005925 A1 | 7/2010 | |
| WO | WO-2012057878 A1 * | 5/2012 | ............ B01D 57/02 |

OTHER PUBLICATIONS

International Search Report in PCT/US2018/45294 dated Oct. 18, 2018.
(Continued)

*Primary Examiner* — Joseph C Rodriguez
(74) *Attorney, Agent, or Firm* — Thomas Horstemeyer, LLP

(57) ABSTRACT

A variety of devices and methods are provided for separating or enriching circulating tumor cells in a biological sample such as whole blood. In some aspects, the devices are multi-stage devices including at least (i) a filtering stage, (ii) a sheath flow stage for ferrohydrodynamic separation of magnetically labelled white blood cells, and (iii) a focusing stage for marker-independent and size-independent focusing of magnetically labeled particles so as to separate or enrich unlabeled rare cells in the biological sample. The devices and methods are, in some aspects, capable of high throughput in excess of 6 milliliters per hour while achieving high separation (>95%) of the unlabeled rare cells.

15 Claims, 39 Drawing Sheets

(52) U.S. Cl.
CPC .......... B01L 2200/0652 (2013.01); B01L 2200/0668 (2013.01); B01L 2300/0681 (2013.01); B01L 2300/0864 (2013.01); B01L 2300/0883 (2013.01); B01L 2400/043 (2013.01)

(56) References Cited

U.S. PATENT DOCUMENTS

| | | | |
|---|---|---|---|
| 9,278,353 | B2 | 3/2016 | Smith et al. |
| 2006/0223178 | A1* | 10/2006 | Barber .......... C12M 35/06 435/372 |
| 2010/0044232 | A1* | 2/2010 | Lin .......... B03C 1/01 204/660 |
| 2010/0297733 | A1 | 11/2010 | Lin et al. |
| 2011/0003303 | A1* | 1/2011 | Pagano .......... B03C 1/288 435/173.9 |
| 2012/0080360 | A1 | 4/2012 | Stone et al. |
| 2013/0306566 | A1 | 11/2013 | Mao et al. |
| 2015/0219544 | A1* | 8/2015 | Liu .......... G01N 1/4077 506/39 |
| 2016/0123858 | A1 | 5/2016 | Kapur et al. |
| 2016/0244714 | A1* | 8/2016 | Spuhler .......... G01N 1/00 |
| 2017/0029782 | A1 | 2/2017 | Mao et al. |
| 2017/0072405 | A1 | 3/2017 | Mao et al. |
| 2017/0248508 | A1* | 8/2017 | Ward .......... B01L 3/502753 |
| 2021/0001339 | A1* | 1/2021 | Liu .......... B03C 1/288 |

OTHER PUBLICATIONS

Adams, et al., "Circulating giant macrophages as a potential biomarker of solid tumors," Proceedings of the National Academy of Sciences of the United States of America, 2014, p. 3514-3519, vol. 111, No. 9, National Academy of Sciences.

Antfolk, et al., "A single inlet two-stage acoustophoresis chip enabling tumor cell enrichment from white blood cells," Lab Chip, 2015, p. 2102-2109, 15, The Royal Society of Chemistry.

Autebert, et al., "High purity microfluidic sorting and analysis of circulating tumor cells: towards routine mutation detection," Lab Chip, 2015, p. 2090-2101,15, The Royal Society of Chemistry.

Campton, et al., "High-recovery visual identification and single-cell retrieval of circulating tumor cells for genomic analysis using a dual-technology platform integrated with automated immunofluorescence staining," BMC Cancer, 2015, p. 1-13, BioMed Central.

Clawson, et al., "Circulating Tumor Cells in Melanoma Patients," PLoS One, 2012, p. 1-12, vol. 7, Issue: 7, e41052.

Desitter, et al., "A New Device for Rapid Isolation by Size and Characterization of Race Circulating Tumor Cells," Anticancer Research, 2011, p. 427-442, 31.

Earhart, et al., "Isolation and mutational analysis of circulating tumor cells from lung cancer patients with magnetic sifters and biochips," Lab Chip, 2014, p. 78-88, 14, The Royal Society of Chemistry.

Fachin, et al., "Monolithic Chip for High-throughput Blood Cell Depletion to Sort Rare Circulating Tumor Cells," Scientific Reports, 2017, p. 1-11, 7: 10936.

Gleghorn, et al., "Capture of circulating tumor cells from whole blood of prostate cancer patients using geometrically enhanced differential immunocapture (GEDI) and a prostate-specific antibody," Lab Chip, 2010, p. 27-29, 10, The Royal Society of Chemistry.

Gupta, et al., "ApoStreamTM, a new dielectrophoretic device for antibody independent isolation and recovery of viable cancer cells from blood," Biomicrofluidics, 2012, p. 024133-1-024133-14, 6, American Institute of Physics.

Harb, et al., "Mutational Analysis of Circulating Tumor Cells Using a Novel Microfluidic Collection Device and qPCR Assay," Translational Oncology, 2013, p. 528-538, vol. 6, No. 5.

Harouaka, et al., "Flexible Micro Spring Array Device for High-Throughput Enrichment of Viable Circulating Tumor Cells," Molecular Diagnostics and Genetics, 2014, p. 323-333, 60:2, American Association for Clinical Chemistry.

He, et al., "Quantitation of circulating tumor cells in blood samples from ovarian and prostate cancer patients using tumor-specific fluorescent ligands," Publication of the International Union Against Cancer, 2008, p. 1968-1973, Global Cancer Control.

Hoshino, et al., "Microchip-based immunomagnetic detection of circulating tumor cells," Lab Chip, 2011, p. 3449-3457, 11, The Royal Society of Chemistry.

Hou, et al., "Isolation and retrieval of circulating tumor cells using centrifugal forces," Scientific Reports, 2013, p. 1-8, 3: 1259.

Kang, et al., "A combined micromagnetic-microfluidic device for rapid capture and culture of rare circulating tumor cells," Lab Chip, 2012, p. 2175-2181, 12, The Royal Society of Chemistry.

Karabacak, et al., "Micro-fluidic, marker-free isolation of circulating tumor cells from blood samples," Nature Protocols, 2014, p. 694-710, vol. 9, No. 3, Nature American, Inc.

Lara, et al., "Enrichment of rare cancer cells through depletion of normal cells using density and flow-through, immunomagnetic cell separation," International Society for Experimental Hematology, 2004, p. 891-904, 32, Elsevier Inc.

Li, et al., "Accoustic separation of circulating tumor cells," Proceedings of the National Academy of Sciences of the United States of America, 2015, p. 4970-4975, vol. 112, No. 16.

Liu, et al., "Negative enrichment by immunomagnetic nanobeads for unbiased characterization of circulating tumor cells from peripheral blood of cancer patients," Journal of Translational Medicine, 2011, p. 1-8, 9:70 BioMed Central.

Lu, et al., "Nano-Velcro Chip for CTC enumeration in prostate cancer patients," National Institutes of Health, 2013, p. 1-20, 64(2).

Mikolajczyk, et al., "Detection of EpCAM—Negative and Cytokeratin—Negative Circulating Tumor Cells in Peripheral Blood," Journal of Oncology, 2011, p. 1-10, vol. 2011, Hindawi Publishing Corporation.

Nagrath, et al., "Isolation of rare circulating tumor cells in cancer patients by microchip technology," Nature, 2007, p. 1235-1241, vol. 450:20/27, Nature Publishing Group.

Ozkumur, et al., Inertial Focusing for Tumor Antigen-Dependent and Independent Sorting of Rare Circulating Tumor Cells, National Institutes of Health, 2013, p. 1-20, 5(179). American Association for the Advancement of Science.

Qin, et al., "Size and deformability based separation of circulating tumor cells from castrate resistant prostate cancer patients using resettable cell traps," Lab Chip, 2015, p. 2278-2286, 15, The Royal Society of Chemistry.

Riethdorf, et al., "Detection of Circulating Tumor Cells in Peripheral Blood of Patients with Metastatic Breast Cancer: A Validation Study of the CellSearch System," Clinical Cancer Research, 2007, p. 920-928, 13, American Association for Cancer Research Journals.

Sarioglu, et al., "A microfluidic device for label-free, physical capture of circulating tumor cell clusters," Nature Methods, 2015, p. 685-694, vol. 12, No. 7, Nature American, Inc.

Sheng, et al., "Capture, release and culture of circulating tumor cells from pancreatic cancer patients using an enhanced mixing chip," Lap Chip, 2014, p. 89-98, 14, The Royal Society of Chemistry.

Sollier, et al., "Size-selection collection of circulating tumor cells using Vortex technology," Lab Chip, 2014, p. 63-77, 14, The Royal Society of Chemistry.

Stott, et al., "Isolation of circulating tumor cells using a microvortex-generating herringbone chip," Proceedings of the National Academy of Sciences of the United States of America, 2010, p. 18392-18397, vol. 107, No. 43.

Talasaz, et al., "Isolating highly enriched populations of circulating epithelial cells and other rare cells from blood using a magnetic sweeper device," Proceedings of the National Academy of Sciences of the United States of America, 2008, p. 3970-3975, vol. 106, No. 10.

Tang, et al., "A chip assisted immunomagnetic separation system for the efficient capture and in situ identification of circulating tumor cells," Lab Chip, 2016, p. 1214-1223, 16, The Royal Society of Chemistry.

(56) References Cited

OTHER PUBLICATIONS

Vona, et al., "Isolation by Size of Epithelial Tumor Cells: A New Method for the Immunomorphological and Molecular Characterization of Circulating Tumor Cells," American Journal of Pathology, 2000, p. 57-63, vol. 156, No. 1, American Society for Investigative Pathology.
Weitz, et al., "Dissemination of Tumor Cells in Patients Undergoing Surgery for Colorectal Cancer," Clinical Cancer Research, 1998, p. 343-348, vol. 4, American Association for Cancer Research Journals.
Yoon, et al., "Sensitive capture of circulating tumor cells by functionalized graphene oxide nanosheets," Nature Nanotechnology, 2013, p. 735-741, vol. 8, Macmillian Publishers Limited.
Zhao, et al., "Label-free ferrohydrodynamic cell separation of circulating tumor cells," Lab Chip, 2017, p. 3097-3111, 17, The Royal Society of Chemistry.
Zhao, et al., "Biocompatible and label-free separation of cancer cells from cell culture lines from white blood cells in ferrofluids," Lab Chip, 2017, p. 2243-2255, 17, The Royal Society of Chemistry.
Zhou, et al., "Separable Bilayer Microfiltration Device for Viable Label-free Enrichment of Circulating Tumour Cells," Scientific Reports, 2014, p. 1-10, 4: 7392.
European Search Report dated Jul. 8, 2021 in co-pending European Patent Application No. 18 84 1411 filed Aug. 4, 2018.

\* cited by examiner

E

F

DEVICES AND METHODS FOR SEPARATING CIRCULATING TUMOR CELLS FROM BIOLOGICAL SAMPLES

CROSS-REFERENCE TO RELATED APPLICATIONS

This application is the 35 U.S.C. § 371 national stage of PCT application having serial number PCT/US2018/045294 having the title "DEVICES AND METHODS FOR SEPARATING CIRCULATING TUMOR CELLS FROM BIOLOGICAL SAMPLES", filed on Aug. 4, 2018, which claims priority to, and the benefit of, U.S. Provisional Application Ser. No. 62/541,552, having the title "CELL SEPARATION OF TUMOR CELLS" filed on Aug. 4, 2017, and U.S. Provisional Application Ser. No. 62/668,355, having the title "CELL SEPARATION OF TUMOR CELLS" filed on May 8, 2018, the contents of each of which are incorporated herein by reference in their entirety.

STATEMENT REGARDING FEDERALLY SPONSORED RESEARCH OR DEVELOPMENT

This invention was made with government support under award 1150042 and award 1359095 awarded by the National Science Foundation and award R21GM104528 awarded by the National Institutes of Health. The government has certain rights in the invention.

TECHNICAL FIELD

The present disclosure generally relates to microfluidics and uses thereof.

BACKGROUND

Circulating tumor cells (CTCs) are cancer cells that are detached from primary solid tumors and carried through the vasculature to potentially seed distant site metastases in vital organs, representing the main cause of death in cancer patients. Molecular assessments of CTCs not only could benefit basic cancer research, but also might eventually lead to a more effective cancer treatment. However, one major limitation has been the limited availability of viable CTCs for investigations, due in part to the small patient blood volumes that are allowable for research, which usually yielded less than 100 CTCs from 1 mL of whole blood. As a result, technologies are needed in order to separate these rare cells from blood, and important performance criteria for these technologies include the ability to process a significant amount of blood quickly (e.g., throughput ~75 mL $h^{-1}$), a high recovery rate of CTCs, a reasonable purity of isolated cancer cells, and cell integrity for further characterization.

Label-based CTC separation technologies were developed to selectively enrich a subset of CTCs from blood, primarily through the use of specific biological markers including epithelial cell adhesion molecule (EpCAM). These antigen-based labels were a rate-limiting factor in effective CTC separation, as the inherent heterogeneity of CTCs render these technologies ineffective for general use. The vast array of various biomarkers that might or might not be expressed, and which cannot be predicted to remain expressed in CTCs undergoing Epithelial-to-Mesenchymal Transitions (EMT) are cumbersome and confounding in these label-based methods. Furthermore, most label-based technologies do not conveniently enable comprehensive molecular analysis of separated CTCs because they are either dead or immobilized to a surface. On the other hand, a variety of label-free methods have been developed to exploit specific physical markers in order to deplete non-CTCs in blood therefore enrich cancer cells. While such methods may be used to separate CTCs based upon, for example, size, the existence of large white blood cells such as monocytes that may have overlapping sizes with CTCs complicate these label-free methods. Other devices have attempted to incorporate two or more of these methods, but still suffer from the time-consuming and laborious sample preparation due to being a label-based method.

There remains a need for improved devices and methods for separating circulating tumor cells that overcome the aforementioned deficiencies.

SUMMARY

In various aspects, microfluidic devices and methods of using microfluidic devices are provided that overcome one or more of the aforementioned deficiencies. The devices and methods can combine filters, sheathing separation, and flow focusing to provide for high throughput cell separation without the need for labeling the circulating tumor cells.

In some aspects, a multi-stage microfluidic device is provided having a (i) a first stage including one or more filters along a length of a first microfluidic channel; (ii) a second stage fluidly connected to the first stage and including a second microfluidic channel, a fluid inlet for a sheathing fluid (which may be a ferrofluid), and a fluid outlet to collect waste particles; and (iii) a third stage fluidly connected to the second stage configured with a magnetic focusing force to focus magnetically labeled cells such as white blood cells, resulting in enrichment of the circulating tumor cells in one or more circulating tumor cell outlets.

In some aspects, a multistage a multi-stage microfluidic device is provided for enriching circulating tumor cells in a biological sample. The device can include at least three stages, although there may be more in some applications. Therefore, the terms first, second, third and so-on, when used to describe the stages, should not be considered limiting on the total number of stages but is used for simplicity to describe the relative ordering of the stages. Additional stages, not explicitly described, may in some aspects appear before the first stage.

Methods are provided for enriching, separating, or isolating unlabeled rare cells such as circulating tumor cells from a sample, e.g. a biological sample such as whole blood. In some aspects, the biological sample is or includes whole blood. In some aspects, the biological sample includes about 50 to about 250 circulating tumor cells per milliliter of the biological sample. Examples of the circulating tumor cells can include those selected from the group consisting of a primary cancer cell, a lung cancer cell, a prostate cancer cell, a breast cancer cell, a pancreatic cancer cell, and a combination thereof.

Other systems, methods, features, and advantages of the devices and methods will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 2A) & (FIG. 2B) magnetic field gradient, and (FIG. 2C) & (FIG. 2D) ferrofluid concentration at flow rates between 1.2 and 7.2 mL h$^{-1}$. Ferrofluid concentration was fixed at 0.26% (v/v) for (FIG. 2A) & (FIG. 2B). Magnetic field was fixed at 443 mT and its gradient was fixed at 56.2 T m$^{-1}$ for (FIG. 2C) & (FIG. 2D).

(FIG. 3A) In absence of magnetic fields, cell mixtures exited the channel through outlets 1 and 2. Scale bar: 200 µm. (FIG. 3B) When magnetic fields were present, larger H1299 lung cancer cells and some WBCs were deflected and exited through outlets 5 and 6 (collection outlets), while smaller WBCs exited through lower outlets (outlets 1-4, waste outlets). Scale bar: 200 µm. (FIG. 3C) Fluorescence image of spiked H1299 lung cancer cell streams during the separation process when magnetic fields were present. H1299 cells were stained by CellTracker Green. Scale bar: 200 µm. (FIG. 3D) Zoomed-in bright-field images of outlets 1-6 when the magnetic fields were present. Scale bars: 100 µm.

(FIG. 4A) Recovery rates of spiked H1299 lung cancer cells from undiluted WBCs at flow rates from 1.2 mL h$^{-1}$ to 6.0 mL h$^{-1}$. Approximately 100 H1299 cancer cells were spiked into 1 mL of undiluted WBCs. Recovery rates decreased from 98.6±5.0% to 92.3±3.6% when flow rate increased from 1.2 mL h$^{-1}$ to 6.0 mL h$^{-1}$. (FIG. 4B) A series of spike-in separation experiments in which a certain number (50, 100, 200, 500, 1000, and 2000) of H1299 cells were spiked into 1 mL of undiluted WBCs to simulate clinically relevant CTC concentration at the flow rate of 6.0 mL h$^{-1}$. An average recovery rate of 91.9% (linear fit, the coefficient of determination $R_2$=0.9994 was calculated between the number of cells counted and the number of cells spiked) was achieved for H1299 lung cancer cells. (FIG. 4C) The removal rate of WBCs increased with the flow rate. 99.92±2.2% of WBCs were removed at a flow rate of 6 mL h$^{-1}$. ~100 H1299 cancer cells were spiked into 1 mL of undiluted WBCs. (FIG. 4D) Recovery rates and purity of separated cancer cells (about 100 cell/mL) for different cancer cell lines at the flow rate of 6 mL h$^{-1}$. Recovery rates of 92.3±3.6%, 88.3±5.5%, 93.7±5.5%, 95.3±6.0%, 94.7±4.0%, and 93.0±5.3% were achieved for H1299 (lung cancer), A549 (lung cancer), H3122 (lung cancer), PC-3 (prostate cancer), MCF-7 (breast cancer), and HCC1806 (breast cancer) cell lines, respectively. The corresponding purities of cancer cells of each cell line are 11.1±1.2% (H1299), 10.1±1.7% (A549), 12.1±2.1% (H3122), 12.8±1.6% (PC-3), 11.9±1.8 (MCF-7), and 12.2±1.6% (HCC1806), respectively. For all experiments above, a ferrofluid with its concentration of 0.26% (v/v) was used; magnetic field was fixed at 443 mT and its gradient was fixed at 56.2 T m$^{-1}$. Error bars indicate standard deviation (s.d.), n=3.

(FIG. 5A) Short-term cell viability comparison before and after FCS process using a Live/Dead assay. Cell viabilities of H1299 lung cancer cells before and after separation process were determined to be 98.9±0.9% and 96.3±0.9%, respectively. Error bars indicate standard deviation (s.d.), n=3. (FIG. 5B) Representative images of Live/Dead cell staining for before (top) and after (bottom) separation groups. Calcein AM (green, live cells) and EhD-1 (red, dead cells) channels were merged. Scale bars: 100 µm. (FIG. 5C) Bright field images of cultured H1299 cells collected after separation from day 1 to day 5. A Live/Dead staining of the cultured cells on day 5 showed excellent cell viability. Scale bars; 50 µm. (FIG. 5D) Comparison of expressions of two key biomarkers (epithelial cell adhesion molecule-EpCAM and cytokeratin-CK) on HCC1806 breast cancer cells before (top) and after (bottom) separation. They showed qualitatively similar EpCAM and CK fluorescence. Scale bars; 20 µm (FIG. 6C) Immunofluorescence images of enriched cells from blood samples from patient B. Three channels including CK, EpCAM and CD45 were examined. Cells were identified as CTCs if the staining pattern is CK+/CD45− or EpCAM+/CD45− or CK+/EpCAM+/CD45−, WBC were identified as CK−/EpCAM−/CD45+. Scale bars: 10 µm.

(FIG. 8A) & (FIG. 8D) & (FIG. 8G) throughput, (FIG. 8B) & (FIG. 8E) & (FIG. 8H) ferrofluid concentration, and (FIG. 8C) & (FIG. 8F) & (FIG. 8I) magnetic field gradient. Ferrofluid concentration was fixed at 0.292% for (FIG. 8A) & (FIG. 8D) & (FIG. 8G) & (FIG. 8C) & (FIG. 8F) & (FIG. 8I), magnetic field gradient was fixed at 132 T m$^{-1}$ for (FIG. 8A) & (FIG. 8D) & (FIG. 8G), and throughput was fixed at 100 μL min$^{-1}$ for (FIG. 8B) & (FIG. 8E) & (FIG. 8H) & (FIG. 8C) & (FIG. 8F) & (FIG. 8I). (FIG. 8D) & (FIG. 8E) & (FIG. 8F) were simulated particles positions and corresponding standard deviations. (FIG. 8G) & (FIG. 8H) & (FIG. 8I) were normalized particle distributions in experiment.

(FIG. 9A) average separation distance between non-magnetic beads and magnetic beads. Non-magnetic beads (20.3 μm, 8.0 μm and 5.7 μm) and magnetic beads (11.8 μm) were spiked into 0.292% ferrofluid at throughput between 10 and 350 μL min$^{-1}$. the magnetic field gradient was fixed at 132 T m$^{-1}$. (FIG. 9B) simulated and experimental separation distance between 8.0 μm non-magnetic beads and 11.8 μm magnetic beads at low ferrofluid concentration between 0.01% and 0.1%, and flow rate between 10 and 210 μL min$^{-1}$. the magnetic field gradient was fixed at 132 T m$^{-1}$. (FIG. 9C) Particle trajectories of 8.0 μm non-magnetic beads at the flow rate of 100 μL min$^{-1}$. A ferrofluid with its concentration of 0.049% (v/v) was used; the magnetic field gradient was fixed at 132 T m$^{-1}$. Scale bar: 200 μm (FIG. 9D) In absence of magnetic fields, all of the beads (20.3 and 8.0 μm non-magnetic beads, and 11.8 μm magnetic beads) were randomly distributed in the channel. Scale bar: 200 μm. (FIG. 9E) When magnetic fields were present, non-magnetic beads (20.3 and 8.0 μm) will be collected from outlet 1. Most of the magnetic beads (11.8 μm) will be collected at outlet 3, and the rest can be identified in outlet 2. Scale bar: 200 μm. (FIG. 9F) Image of collected beads from 3 outlets. The red fluorescent signal comes from 8.0 μm non-magnetic beads and the yellow fluorescent signal comes from 11.8 μm magnetic beads. Scale bar: 200 μm.

(FIG. 10A) the size distribution of different cancer cell lines—Prostate (PC-3), Breast (MCF-7, MDA-MB-231, HCC1806) and Lung (H1299, H3122, H69, DMS79), and white blood cells from healthy donor. (FIG. 10B) Number of magnetic beads (dynabeads) per white blood cell (n=1000). The average is 34±11 dynabeads per WBC. Insect is a WBC labelled with 45 beads. (FIG. 10C) Percentage of magnetic content in labelled WBCs. The volume fraction of magnetic content in dynabeads is 11.5%, the magnetic content for labelled WBC was calculated based on volume fraction.

(FIG. 11B) Collected PC-3 from outlet 1. (FIG. 11C) Normalized size distributions of spiked and collected cancer cells from outlet 1 for PC-3, MCF-7 and MDA-MB-231, (FIG. 11D) Magnetic beads enumeration on collected WBCs from outlet 1 with different concentration of ferrofluid. (FIG. 11E) Recovery rate and purity for different cancer cell lines (~100 cells per mL). Recovery rate of 97.9±1.0%, 97.6±1.0%, 98.8±1.4%, 99.4±0.6%, 98.7±0.6%, 95.0±1.2%, 95.9±1.3% and 99.7±0.6% were achieved for MCF-7, MDA-MB-231, HCC1806, H1299, H3122, DMS79, H69 and PC-3 cell lines, respectively. The corresponding purities are 212.0±1.3%, 23.5±0.7%, 25.2±1.5%, 23.1±0.9%, 22.2±0.9%, 24.2±1.7%, 21.7±0.8% and 23.3±0.4%, respectively. Error bars indicate standard deviation, n=3. (FIG. 11F) a series of experiments with different number of spiked PC-3 cancer cells (100, 250, 500, 1000 and 2000). An average recovery rate of 98.8% (linear fit, R$^2$=0.9998) was achieved for PC-3 cancer cells.

(FIG. 12A) Top-view of the FCSv2 device with labels of inlets, debris filters and outlets. The arrow indicates the direction of magnetic field during device operation. The device integrates 3 stages into one single device for biomarker- and size-independent OTC enrichment. Stage one filters out large cell debris. Stage 2 depletes the unbound magnetic beads and WBCs bound with 3 beads into waste outlet 1 (FIG. 12B ii). Stage 3 continuously deflects unlabeled CTCs into collection outlet, while at the same time focuses WBCs bound with ≥1 bead into waste outlet 2 (FIG. 12B iii). (FIG. 12C) The microfluidic device is sandwiched between the device holders, which consist of top and bottom magnet arrays repelling each other and are secured with screws and nuts. The thickness of channel is 250 μm. The width of stage 2 is 1600 μm and width of stage 3 is 1200 μm.

(FIG. 18B) Cross-section view of the FCS device. The red arrow indicates the direction of permanent magnet's magnetization.

(FIG. 22A) Magnetization of the as-synthesized ferrofluid. Solid red lines are the fitting of the experimental date to the Langevin function. Saturation magnetization of this ferrofluid was 0.96 kA m$^{-1}$, corresponding to a 0.26 volume fraction or concentration. (FIG. 22B) Rheological plots of the ferrofluid and blood. The viscosity of ferrofluid was measured to be 2.92 mPa·s. (FIG. 22C) Size distribution of maghemite nanoparticles within the ferrofluid (d=10.25±2.96 nm). (FIG. 22D) Size distribution of maghemite nanoparticles was measured by dynamic light scattering (DLS). Hydrodynamic diameter was 40.77±12.71 nm. (FIG. 22E) Zeta potential of ferrofluid was measured to be −27.2±11.4 mV, indicating a negative surface charge on the particles. (FIG. 22F) A transmission electron microscopy (TEM) image of the maghemite nanoparticles. Scale bar: 20 nm.

(FIG. 23B) Colloidal stability of biocompatible ferrofluids. The maghemite nanoparticles remained colloidally stable for at least 10 months in solution and there was no visible precipitation over time. (FIG. 23C) Blood cells, mixed with a commercial water-based ferrofluid, showed an irreversible flocculation. (FIG. 23D) No flocculation or aggregation of blood cells was found within the biocompatible ferrofluid. Scale bars: 50 µm.

DETAILED DESCRIPTION

Figure 1A:
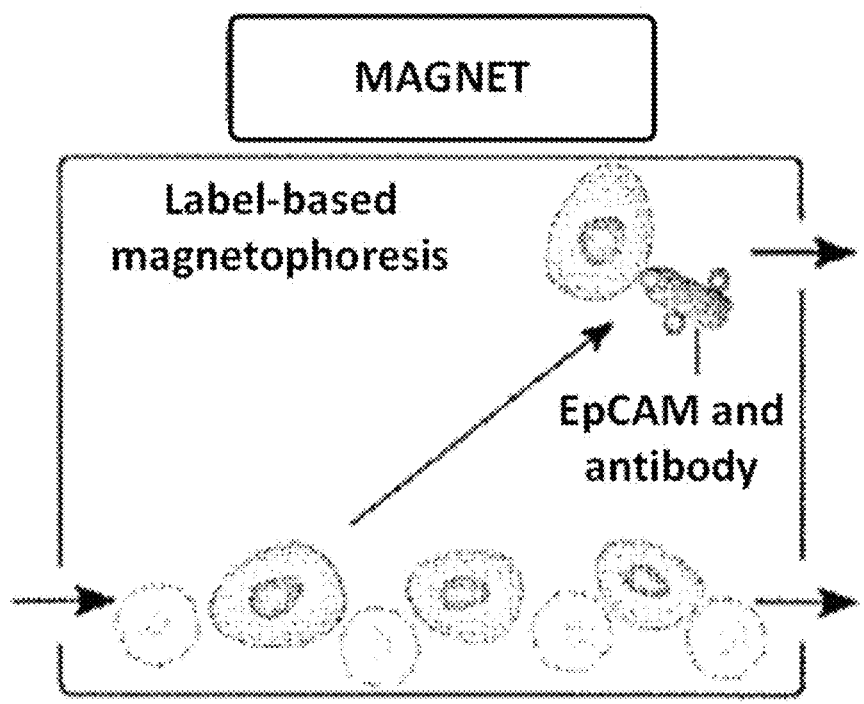
FIG. 1A is a schematic illustration of traditional and frequently used label-based magnetophoresis for CTC separation, in which rare cells were targeted via specific biomarkers such as epithelial cell adhesion molecule (EpCAM) through functionalized magnetic particles in order to pull these cells through magnetic force towards magnetic field maxima in a continuous-flow manner.
Figure 1B:
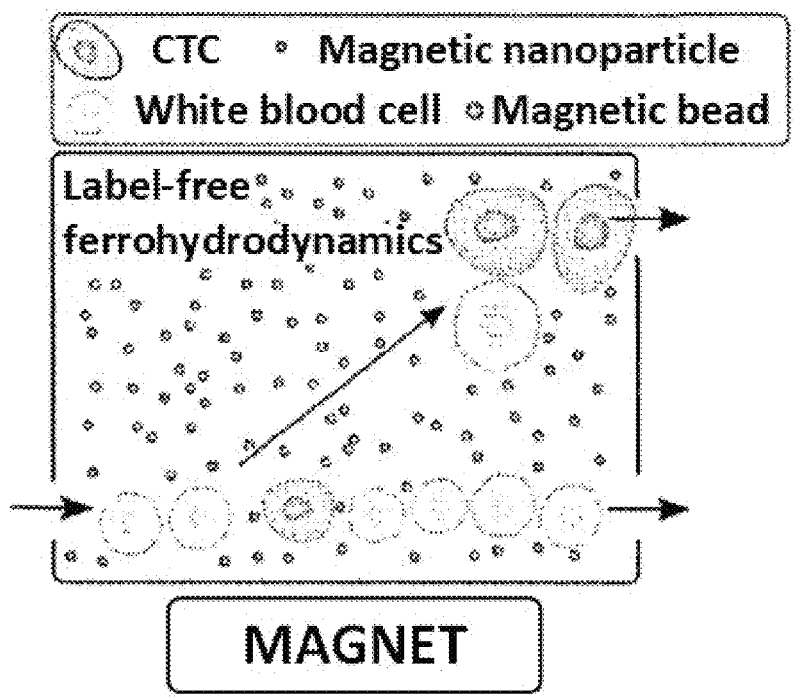
FIG. 1B is a schematic illustration of a label-free ferrohydrodynamic cell separation (FCS) for CTCs. In FCS, RBC-lysed blood and biocompatible ferrofluids (colloidal suspensions of magnetic nanoparticles) were processed in continuous flow within a FCS device, such as the one shown in FIG. 1C. Cells in blood were first filtered to remove debris, then focused by a ferrofluid sheath flow from inlet B. After entering the channel region that was on top of a permanent magnet, large cells including CTCs and some WBCs experienced more size-dependent magnetic buoyance force than smaller WBCs, resulting in a spatial separation between them at the outlets of the FCS device.

In various aspects, microfluidic devices and methods of using microfluidic devices are provided for separating and/or enriching circulating tumor cells in a biological sample such as whole blood. The methods are capable of high throughputs with high levels of retention and separation of the circulating tumor cells.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

A biocompatible substance or fluid, as described herein, indicates that the substance or fluid does not adversely affect the short-term viability or long-term proliferation of a target cell within a particular time range.

Microfluidic Devices and Methods of Use Thereof

In various aspects, microfluidic devices and methods of using microfluidic devices are provided for high throughput sorting, separation, and/or enrichment of circulating tumor cells and other unlabeled rare cells in a biological sample such as blood. In some aspects, the devices are single-stage devices, while in some aspects the devices have multiple stages.

In some aspects, a multistage a multi-stage microfluidic device is provided for enriching circulating tumor cells in a biological sample. The device can include at least three stages, although there may be more in some applications. Therefore, the terms first, second, third and so-on, when used to describe the stages, should not be considered limiting on the total number of stages but is used for simplicity to describe the relative ordering of the stages. Additional stages, not explicitly described, may in some aspects appear before the first stage.

In some aspects, the first stage in the multi-stage microfluidic device includes a first end, a second end, a first microfluidic channel fluidly connecting the first end and the second end, a first fluid inlet fluidly connected to the first microfluidic channel at the first end, and one or more filters along a length of the first microfluidic channel. The first fluid inlet can be used for introducing, pumping, and/or injecting a biological sample into the device. Where there is a stage prior to the first stage, the inlet may be fluidly connected to the previous stage in such a way as to receive a sample (a biological sample) from the previous stage. The one or more filters can filter large cell debris from the biological sample.

In some aspects, a second stage in the multi-stage microfluidic device includes a third end, a fourth end, a second microfluidic channel fluidly connecting the third end and the fourth end. The second stage can be used to separate at least a portion of the white blood cells that are associated with the magnetic beads by flowing the filtered sample through a sheath flow in a nonuniform magnetic field to produce a first enriched sample. The second stage can include, for example, a second fluid inlet fluidly connected to the second microfluidic channel at the third end, and a first fluid outlet fluidly connected to the second microfluidic channel at the fourth end; wherein the second fluid inlet is configured to receive a sheathing fluid; wherein the first fluid outlet is configured to receive a second plurality of waste particles from the biological sample. The third end of the second microfluidic channel can be fluidly connected to the second end of the first microfluidic channel, i.e. the first stage and the second stage can be fluidly connected such that there is a fluid connection from the first microfluidic channel to the second microfluidic channel.

In some aspects, a third stage in the multi-stage microfluidic device includes a fifth end, a sixth end, a third microfluidic channel fluidly connecting the fifth end and the sixth end; a second fluid outlet fluidly connected to the third microfluidic channel at the sixth end, and one or more circulating tumor cell outlets fluidly connected to the third microfluidic channel at the sixth end; wherein the second fluid outlet is configured to receive a third plurality of waste particles from the biological sample; and wherein the one or more circulating tumor cell outlets are configured to receive a majority of the circulating tumor cells from the biological sample. The fifth end of the third microfluidic channel can be fluidly connected to the fourth end of the second microfluidic channel, i.e. the second stage and the third stage can be fluidly connected such that there is a fluid connection from the second microfluidic channel to the third microfluidic channel. The third stage can be used for isolating a majority of the unlabeled rare cells by magnetic flow focusing to separate magnetically labeled white blood cells from the unlabeled rare cells.

In some aspects, the microfluidic device includes one or more magnetic sources, wherein the one or more magnetic sources cause one or both of: (a) a non-uniform magnetic field along a length of the second microfluidic channel having a component sufficiently perpendicular to the second microfluidic channel to cause magnetic particles in the second microfluidic channel to be deflected into the first fluid outlet; and (b) a focusing magnetic field having a field maximum along a length of the third microfluidic channel sufficient to cause magnetic particles in the third microfluidic channel to be focused toward a center of the third microfluidic channel. For example, the device can include a first magnet array and a second magnet array; wherein the third stage is sandwiched between the first magnet array and the second magnet array; wherein the first magnet array and the second magnet array are oriented to repel each other; and wherein the third stage is oriented such that the length of the third microfluidic channel is centrally aligned between the first magnet array and the second magnet array.

In some aspects, one or more of the first microfluidic channel, the second microfluidic channel, and the third microfluidic channel have a thickness of about 10 μm to about 10000 μm, about 10 μm to about 1000 μm, about 10 μm to about 500 μm, about 150 μm to about 350 μm, about 220 μm to about 280 μm, or about 250 μm.

In some aspects, the second stage has a width of about 50 μm to about 10000 μm, about 500 μm to about 5000 μm, about 1200 μm to about 2000 μm, about 1400 μm to about 1800 μm, or about 1600 μm.

In some aspects, the third stage has a width of about 50 μm to about 10000 μm, about 500 μm to about 5000 μm, about 800 μm to about 1600 μm, about 1000 μm to about 1400 μm, or about 1200 μm.

In some aspects, the methods are capable of isolating a majority of the unlabeled rare cells. In some aspects, the unlabeled rare cells are circulating tumor cells in a whole blood sample, and the majority of the circulating tumor cells comprises about 90%, about 92%, about 95%, about 97%, or more of the circulating tumor cells as compared to a total number of circulating tumor cells present in the biological sample inserted into the first fluid inlet when in operation.

In some aspects, the biological sample includes whole blood, wherein the whole blood includes a plurality of components. In some aspects, the plurality of components comprises magnetically labelled white blood cells, and wherein at least 95%, at least 98%, at least 99%, at least 99.9%, or more of the white blood cells are not collected in the one or more circulating tumor cell outlets as compared to a total number of white blood cells present in the whole blood inserted into the first fluid inlet when in operation. This can mean, for instance, that at least 95%, at least 98%, at least 99%, at least 99.9%, or more of the white blood cells are collected in one or more of the filters, the first fluid outlet, and the second fluid outlet as compared to a total number of white blood cells present in the whole blood inserted into the first fluid inlet when in operation. This can result in, for example, that at least 90%, 92%, 95%, or more of the unlabeled rare cells are collected in the one or more circulating tumor cell outlets as compared to a total number of unlabeled rare cells present in the whole blood inserted into the first fluid inlet when in operation.

In some aspects, a single-stage microfluidic device is provided for enriching circulating tumor cells in a biological sample, the device comprising a first stage comprising: a first end, a second end, a microfluidic channel fluidly connecting the first end and the second end, a fluid inlet fluidly connected to the microfluidic channel at the first end, three fluid outlets each fluidly connected to the microfluidic channel at the second end, and a magnet along a length of the microfluidic channel to create a non-uniform magnetic field along the microfluidic channel. In some aspects, the microfluidic channel has a length of about 1 cm to about 100 cm, about 2 cm to about 50 cm, about 2 cm to about 10 cm, or about 3 cm to about 5 cm. In some aspects, the microfluidic channel has a width of about 50 μm to about 10000 μm, about 100 μm to about 5000 μm, about 500 μm to about 1500 μm, or about 700 μm to about 1200 μm. In some aspects, the microfluidic channel has a thickness of about 10 μm to about 10000 μm, about 10 μm to about 1000 μm, about 10 μm to about 100 μm, or about 30 μm to about 80 μm. In some aspects, a gradient of magnetic field flux density of the magnet is about 0.001 T/m to 1000 T/m, about 10 T/m to about 500 T/m, or about 10 T/m to about 90 T/m.

Methods are provided for enriching, separating, or isolating unlabeled rare cells such as circulating tumor cells from a sample, e.g. a biological sample such as whole blood. In some aspects, the biological sample is or includes whole blood. In some aspects, the biological sample includes about 50 to about 250 circulating tumor cells per milliliter of the biological sample. Examples of the circulating tumor cells can include those selected from the group consisting of a primary cancer cell, a lung cancer cell, a prostate cancer cell, a breast cancer cell, a pancreatic cancer cell, and a combination thereof.

The methods can include enriching circulating tumor cells in a sample of whole blood, wherein the whole blood includes unlabeled rare cells and white blood cells, the method including: (i) adding a plurality of magnetic beads to the sample to produce a magnetically labeled sample, wherein at least some of the white blood cells are associated with the magnetic beads; (ii) filtering the magnetically labeled sample in a microfluidic device to produce a filtered sample by removing large cell debris from the magnetically labeled sample; (iii) separating at least a portion of the white blood cells that are associated with the magnetic beads by flowing the filtered sample through a sheath flow in a nonuniform magnetic field to produce a first enriched sample; and (iv) isolating a majority of the unlabeled rare cells by magnetic flow focusing the first enriched sample in a microfluidic channel.

The methods can include introducing the biological sample, which may be mixed with a ferrofluid prior to introduction, into the first fluid inlet of a microfluidic device described herein at a flow rate sufficient to cause the biological sample to flow along the microfluidic channel(s) of the device such that a majority of the circulating tumor cells from the biological sample are collected in the one or more circulating tumor cell outlets.

The methods can include introducing a biocompatible ferrofluid, which may include mixing the biological sample with the ferrofluid as well as the use of the ferrofluid as a sheathing fluid flow in the operation of the device.

The methods are devices are capable of high throughput. In some aspects, the throughput is about 6 milliliters to about 25 milliliters of the biological sample per hour. In some aspects, the flow rate is about the flow rate is about 10 µL to about 600 µL per minute.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Label-free Ferrohydrodynamic Cell Separation of Circulating Tumor Cells The example demonstrates a laminar-flow microfluidic ferrohydrodynamic cell separation (FCS) device that was capable of enriching rare CTCs from patients' blood in a biocompatible manner with a high throughput (6 mL h$^{-1}$) and a high rate of recovery (92.9%). Systematic optimization of the FCS devices through a validated analytical model was performed to determine optimal magnetic field and its gradient, ferrofluid properties, and cell throughput that could process clinically relevant amount of blood. The capability of the FCS devices was verified by successfully separating low-concentration (~100 cells mL$^{-1}$) cancer cells using six cultured cell lines from undiluted white blood cells (WBCs), with an average 92.9% cancer cell recovery rate and an average 11.7% purity of separated cancer cells, at a throughput of 6 mL per hour. Specifically, at 100 cells mL$^{-1}$ spike ratio, the recovery rates of cancer cells were 92.3±3.6% (H1299 lung cancer), 88.3±5.5% (A549 lung cancer), 93.7±5.5% (H3122 lung cancer), 95.3±6.0% (PC-3 prostate cancer), 94.7±4.0% (MCF-7 breast cancer), and 93.0±5.3% (HCC1806 breast cancer), and the corresponding purities of separated cancer cells were 11 1%±1.2% (H1299 lung cancer), 10.1±1.7% (A549 lung cancer), 12.1±2.1% (H3122 lung cancer), 12.8±1.6% (PC-3 prostate cancer), 11.9±1.8% (MCF-7 breast cancer), and 12.2±1.6% (HCC1806 breast cancer). Biocompatibility study on H1299 cell line and HCC1806 cell line showed that separated cancer cells had excellent short-term viability, nom1al proliferation and unaffected key biomarker expressions. Enrichment of CTCs was demonstrated in blood samples obtained from two patients with newly diagnosed advanced non-small cell lung cancer (NSCLC).

Experimental Section

Three-Dimensional Model of Ferrohydrodynamic Cell Separation (FCS)

Figure 17:
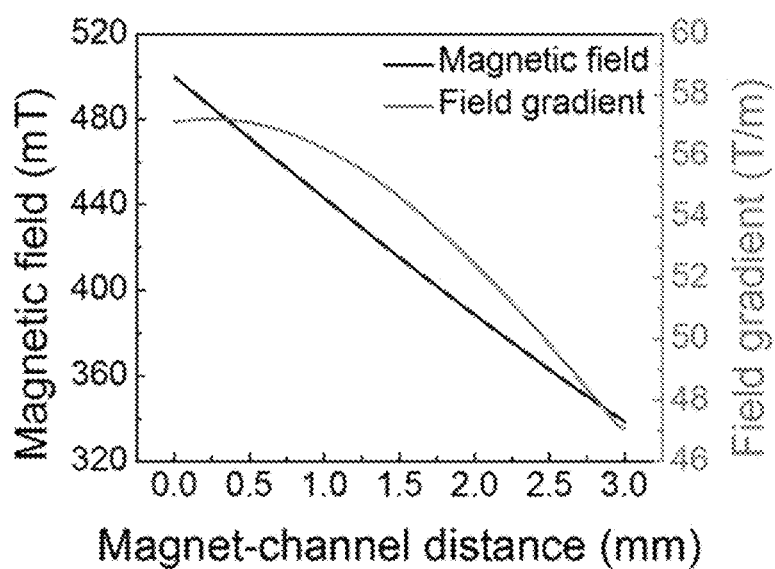
FIG. 17 Measured magnetic field and its gradient of the center of magnet's surface vs. distance between the magnet's surface and the microfluidic channel wall.
Figures 18A, 18B:
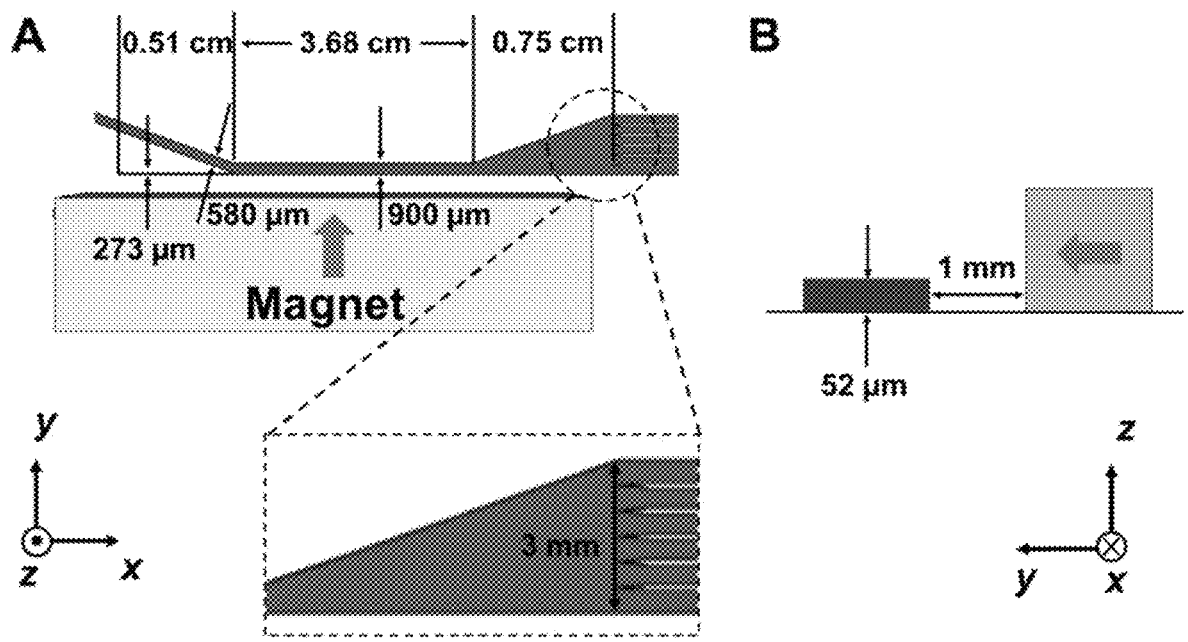
FIGS. 18A-18B Schematic and relevant dimensions of a FCS device, (FIG. 18A) Top-view of the FCS device and relevant dimensions.

Cell or bead trajectories are simulated in a three-dimensional (3D) FOS device (relevant dimensions are listed in FIG. 18) by slight modifications of previously developed models with cell properties from cancer cell, white blood cells (WBCs) and relevant beads. We first calculate the 3D magnetic buoyancy force via an experimentally verified and analytical distribution of magnetic fields as well as their gradients, together with a nonlinear magnetization model of the custom-made ferrofluid. In order to simulate the magnetic field distribution in the channel generated from the permanent magnet, we followed the 3 steps as below:

We experimentally measured flux density at the center of magnet's polar surface, and points away from surface to obtain a flux density-distance relationship (see FIG. 17).

From measured flux density-distance plot, we determined value of remnant magnetization of the permanent magnet. This value was used in the magnetic field simulation based on a set of governing equations, in order to generate a simulated flux density-distance relationship. We compared the experimental and simulated flux density-distance relationship and they were within 5.81% error range.

The simulated magnetic field distribution (flux density, strength, and gradient) was then confirmed to be valid and used in subsequent FCS device optimizations.

The magnetic buoyancy force is expressed as, $$\vec{F}_m = \mu_0 V_c [(M\vec{M}_c - \vec{M}_f) \cdot \nabla] \vec{H} \quad [S1]$$

where $\mu_0 = 4\pi \times 10^{-7}$ H/m is the permeability of free space, $V_c$ is the volume of a single cell, $\vec{M}_c$ is its magnetization, $\vec{M}_f$ is magnetization of the magnetic fluid surrounding the body, and $h$ is the magnetic field strength at the center of the body.[4] The magnetization of the ferrofluid $\vec{M}_f$ under an external field $h$ is a Langevin function, $$\vec{M}_f = \left( \coth(\alpha_f) - \frac{1}{\alpha_f} \right) \phi \vec{M}_{f,b} \quad [S2]$$

where $\alpha_f = \mu_0 \pi M_{f,b} H d_f^3 / 6k_B T$. $M_{f,b}$ is saturation moments of the bulk magnetic materials, $d_f$ is diameters of magnetic nanoparticles in ferrofluid, $\kappa_B$ is the Boltzmann constant and T is the temperature. $\phi$ is the concentration (volume fraction) of the magnetic nanoparticles in the ferrofluid.[4]

We also derived the hydrodynamic viscous drag force with velocity difference between the cell and the local flow, $$\vec{F}_d = -3\pi \eta D_c (\vec{U}_c - \vec{U}_f) f_D \quad [S3]$$

where $\eta$ is viscosity of magnetic fluids, $D_c$ is diameter of a spherical cell, $\vec{U}_c$ and $\vec{U}_f$ are velocity vectors of the cell and the fluids respectively, $f_D$ is hydrodynamic drag force coefficient of a moving cell considering the influence with a solid surface in its vicinity, which is referred to as the "wall effect". The velocity vectors of the fluids $\vec{U}_f$ were extracted from a 3D velocity profile simulation generated in COMSOL Multiphysics (Version 3.5, COMSOL Inc., Burlington, Mass.) through an interpolation method. The COMSOL simulation was conducted with exact conditions of experiments.

We finally solved governing equations of motion using analytical expressions of magnetic buoyancy force and hydrodynamic viscous drag force. Because of the low Reynolds number in a microchannel, inertial effects on the particle are negligible. Motion of a non-magnetic cell in ferrofluids is determined by the balance of hydrodynamic viscous drag force and magnetic buoyancy force.

$$\vec{F}_m + \vec{F}_d = 0. \quad [S4]$$

This equation was solved by using a fourth-order Runge-Kutta time integration scheme in MATLAB (MathWorks Inc., Natick, Mass.).

Figures 19A, 19B:
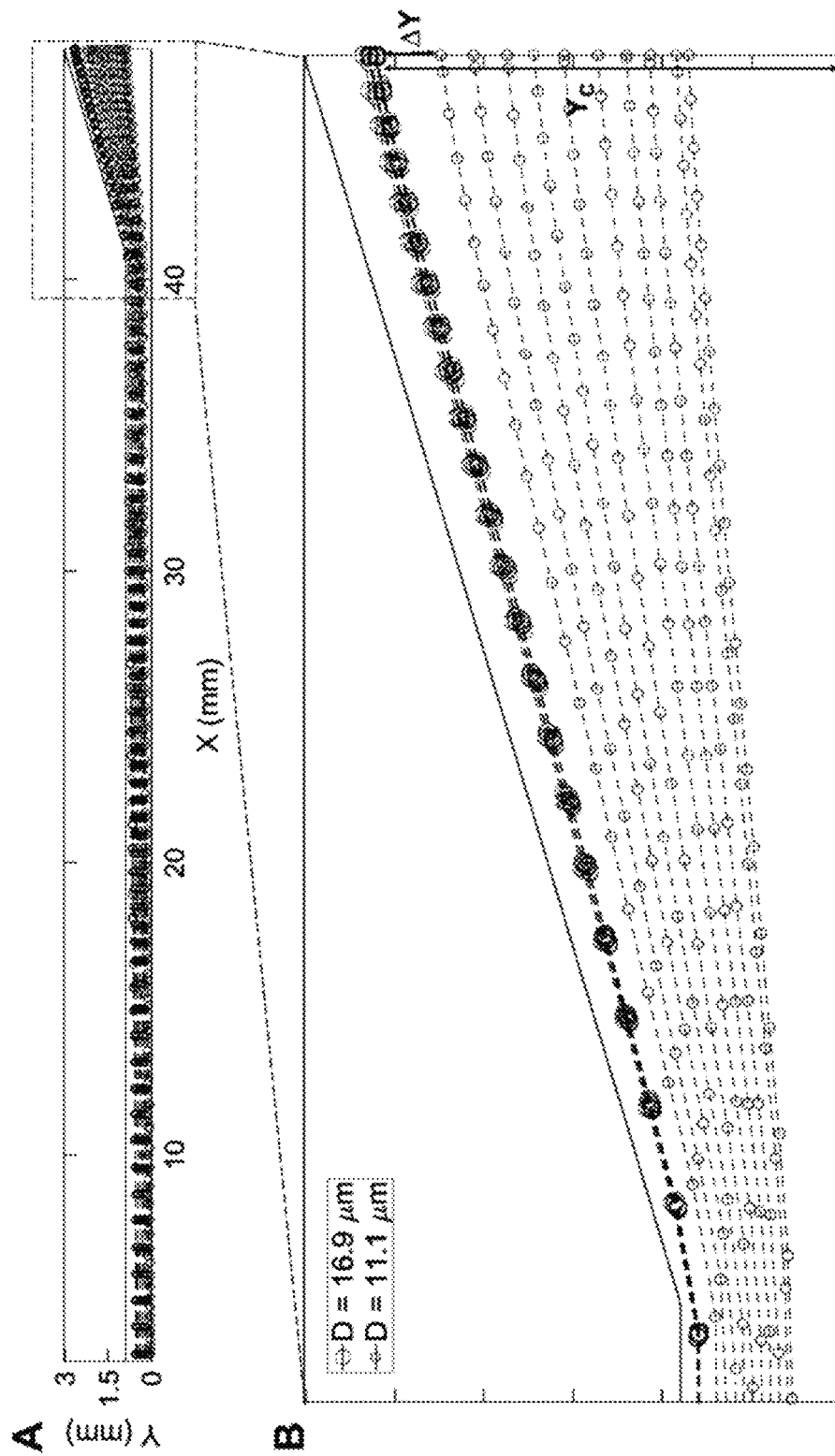
FIG. 19A Cell trajectory simulation of H1299 lung cancer cell (16.9 µm) and WBCs (11.1 µm) in a FCS device.
FIG. 19B Zoomed-in view of cell trajectories at the end of FCS device. Blue and red trajectories indicate H1299 and WBCs, respectively. Flow rate of cell inlet (Inlet A) was fixed at 6 mL h$^{-1}$, ferrofluid concentration was fixed at 0.26% (v/v), and magnetic field was fixed at 443 mT and its gradient was fixed at 56.2 T m$^{-1}$ for this simulation.
Figure 20:
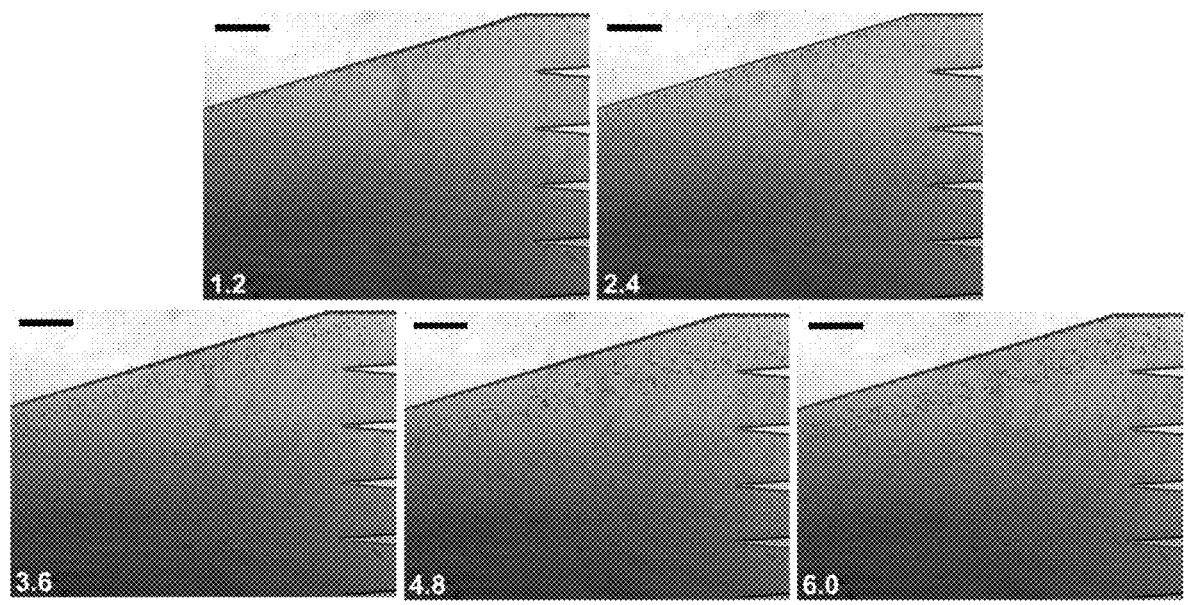
FIG. 20 FCS device calibration with H1299 cells (replaced with beads of similar size, 15.6 µm) and WBCs (11.1 µm). The left-bottom number in each figure indicates the associated flow rate of cell inlet A (mL h$^{-1}$). Flow rate of cell inlet (Inlet A) was fixed at 6 mL h$^{-1}$, ferrofluid concentration was fixed at 0.26% (v/v), and magnetic field was fixed at 443 mT and its gradient was fixed at 56.2 T m$^{-1}$ for this calibration. 1×10$^4$ polystyrene microparticles were mixed with 1 mL of undiluted WBCs. Scale bars: 500 µm.
Figure 21:
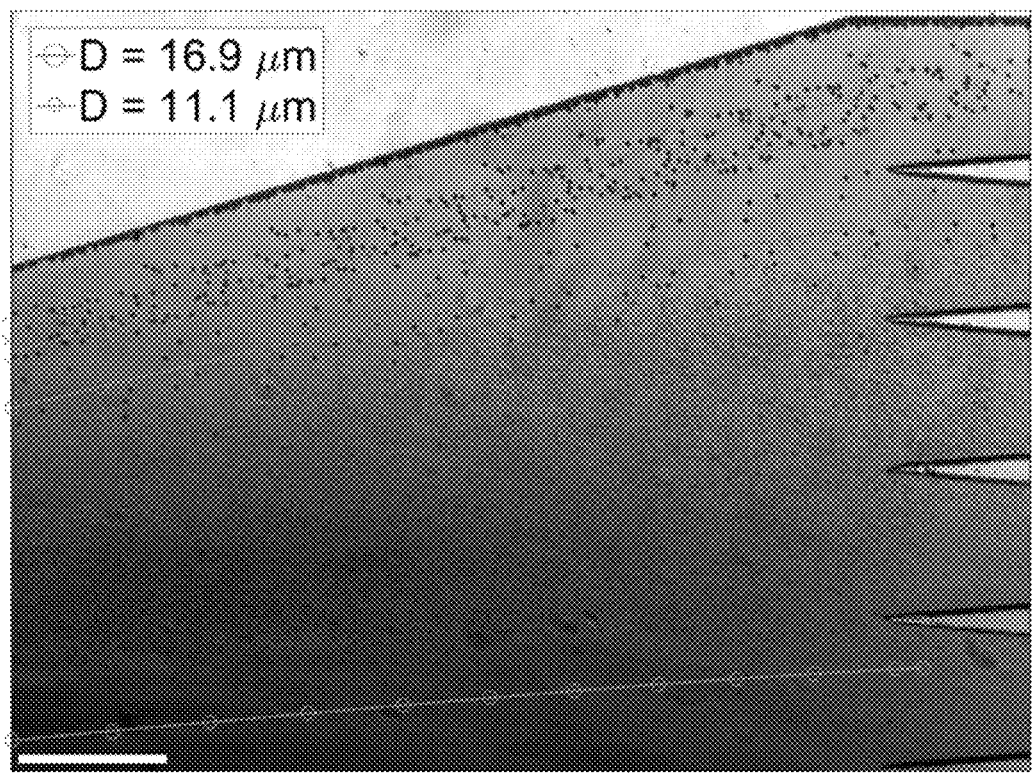
FIG. 21 Comparison of cell trajectories from calibration experiments and simulations of H1299 cells and WBCs at the end of FCS device. Blue lines are the boundary of the simulated H1299 cell trajectory, and red lines are the boundary of the simulated WBC trajectory. The simulated trajectories considered the initial width of microparticle and cell streams at the entry of the channel, therefore had an up and low bound of trajectories. Overall the simulated trajectories matched well with the experimental calibration trajectories, therefore could be used for subsequent FCS device optimization. Flow rate of cell inlet (Inlet A) was fixed at 6 mL h$^{-1}$, ferrofluid concentration was fixed at 0.26% (v/v), and magnetic field was fixed at 443 mT and its gradient was fixed at 56.2 T m$^{-1}$ for simulation and calibration. Scale bar: 500 µm.
Figure 22A:
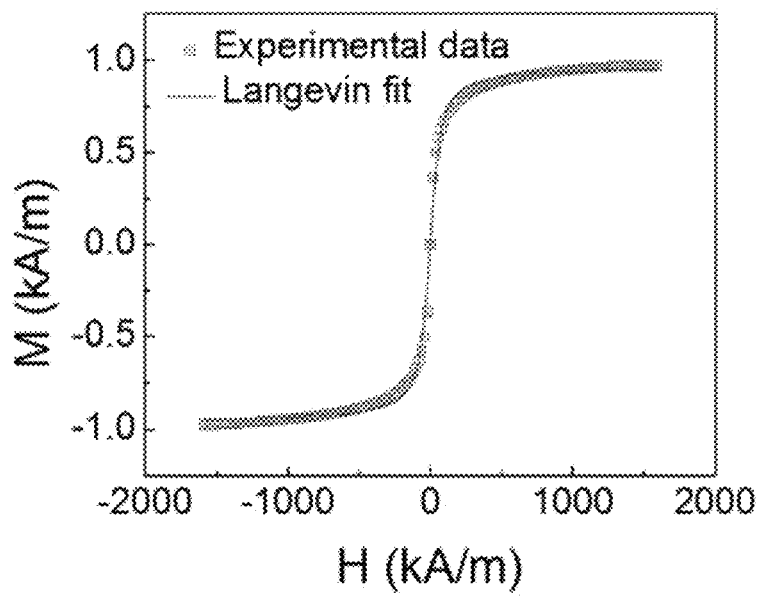
FIGS. 22A-22F Characterization of custom-made ferrofluids.
Figure 22B:
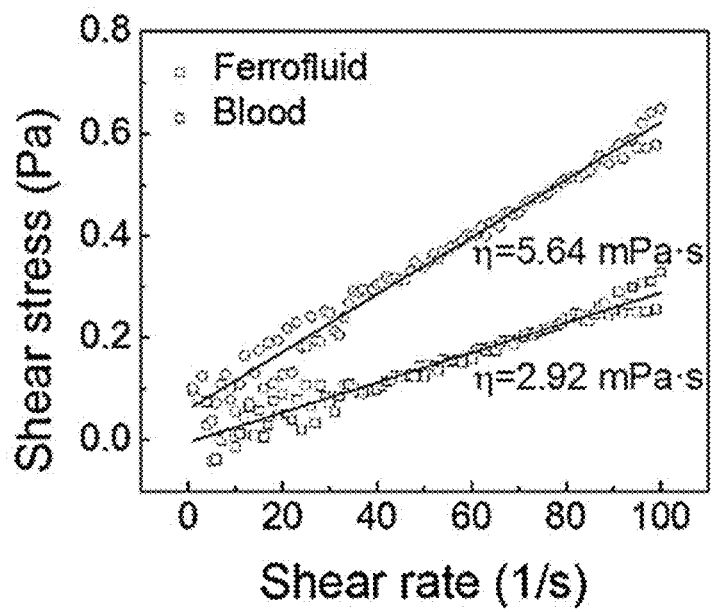
Figure 22C:
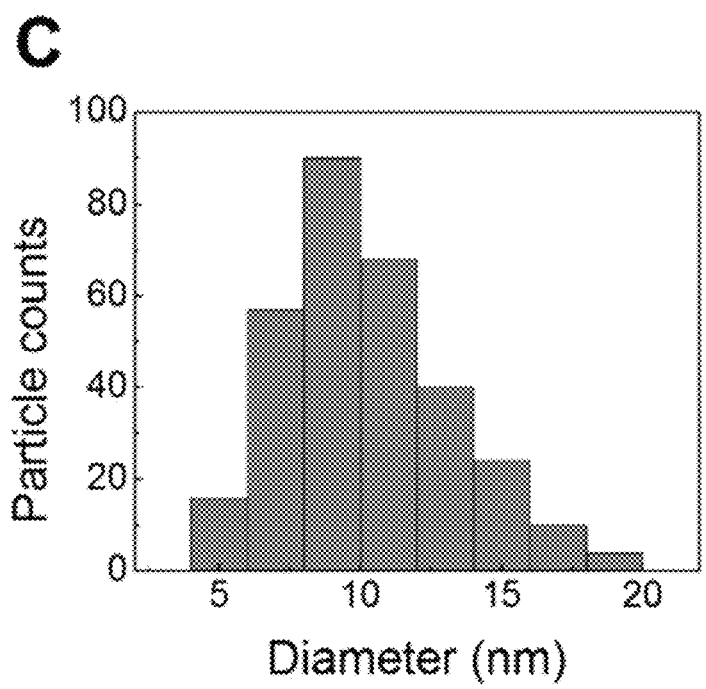
Figure 22D:
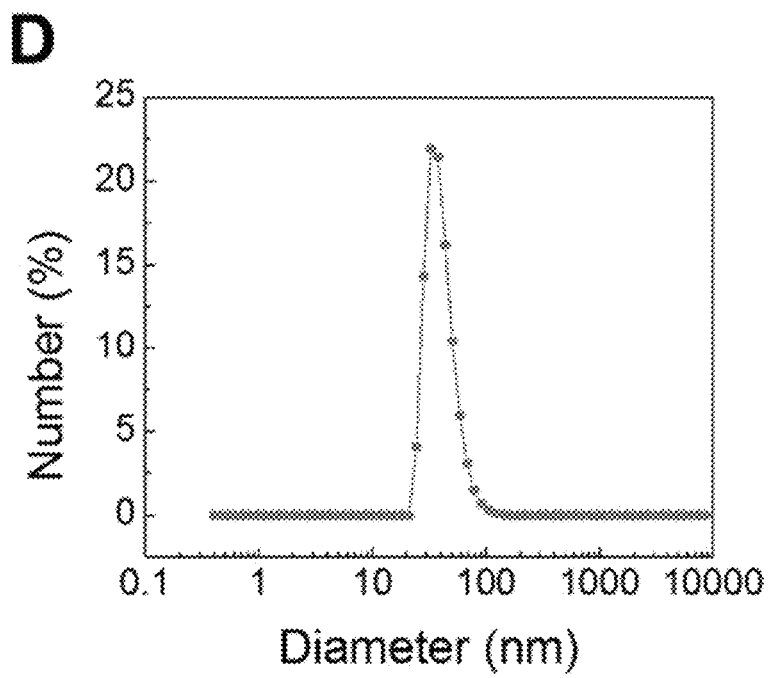
Figure 22E:
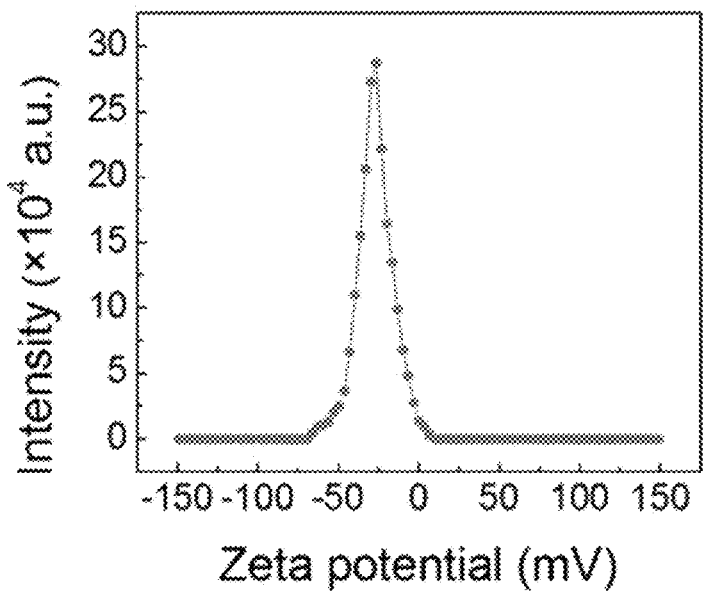
Figure 22F:
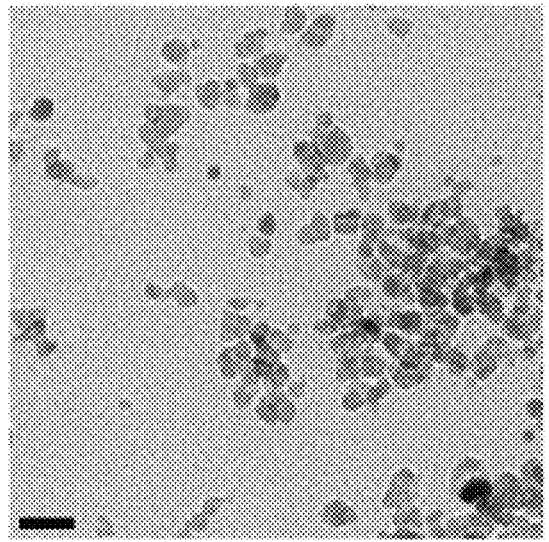
Figures 23A, 23B, 23C, 23D:
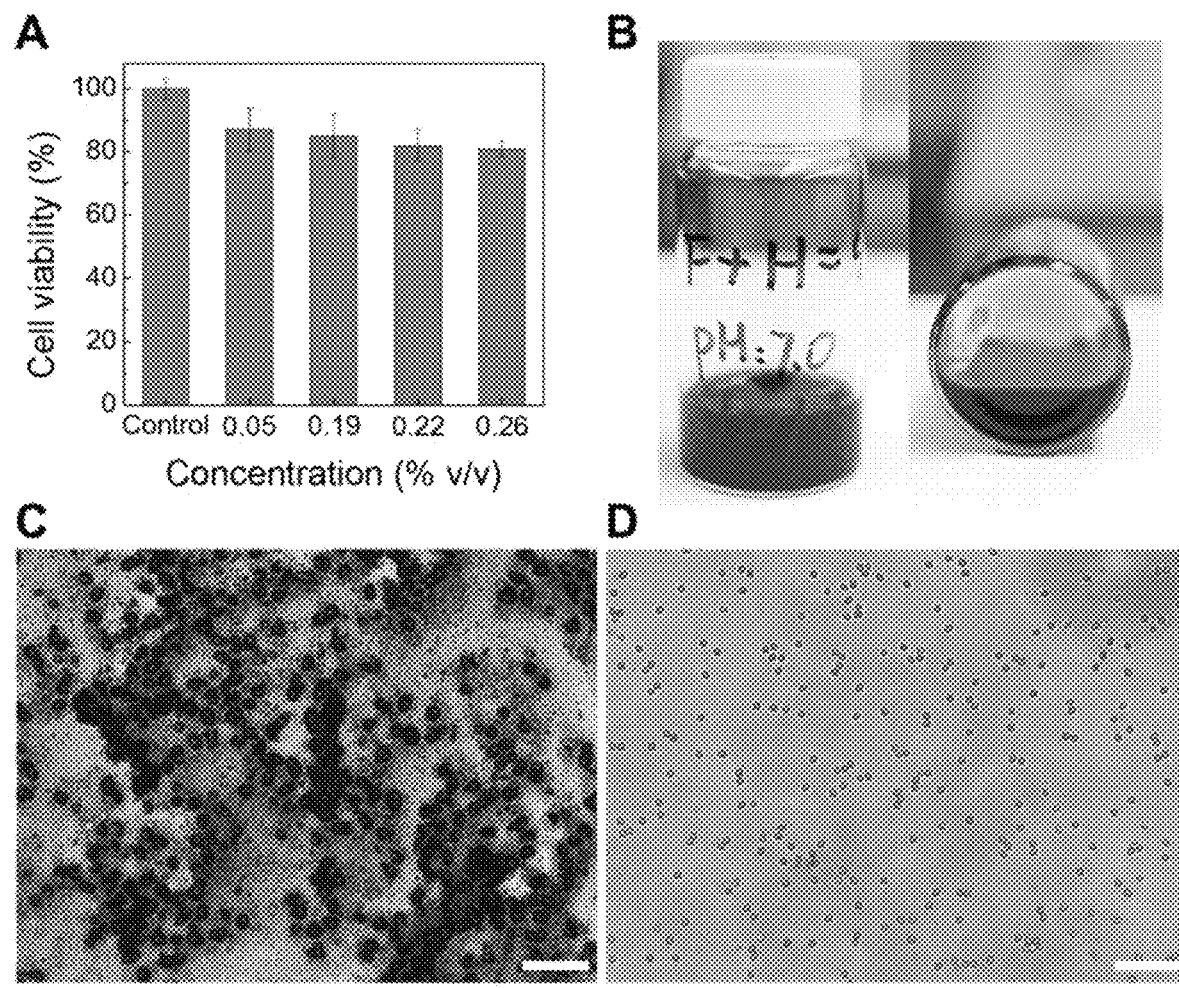
FIGS. 23A-23D (FIG. 23A) Cell viability of H1299 lung cancer cells in different concentrations of ferrofluids was evaluated by a MTT assay. Cell viability was 80.8±2.4% after 12-h incubation with a 0.26% (v/v) concentration ferrofluid.
Figure 24:
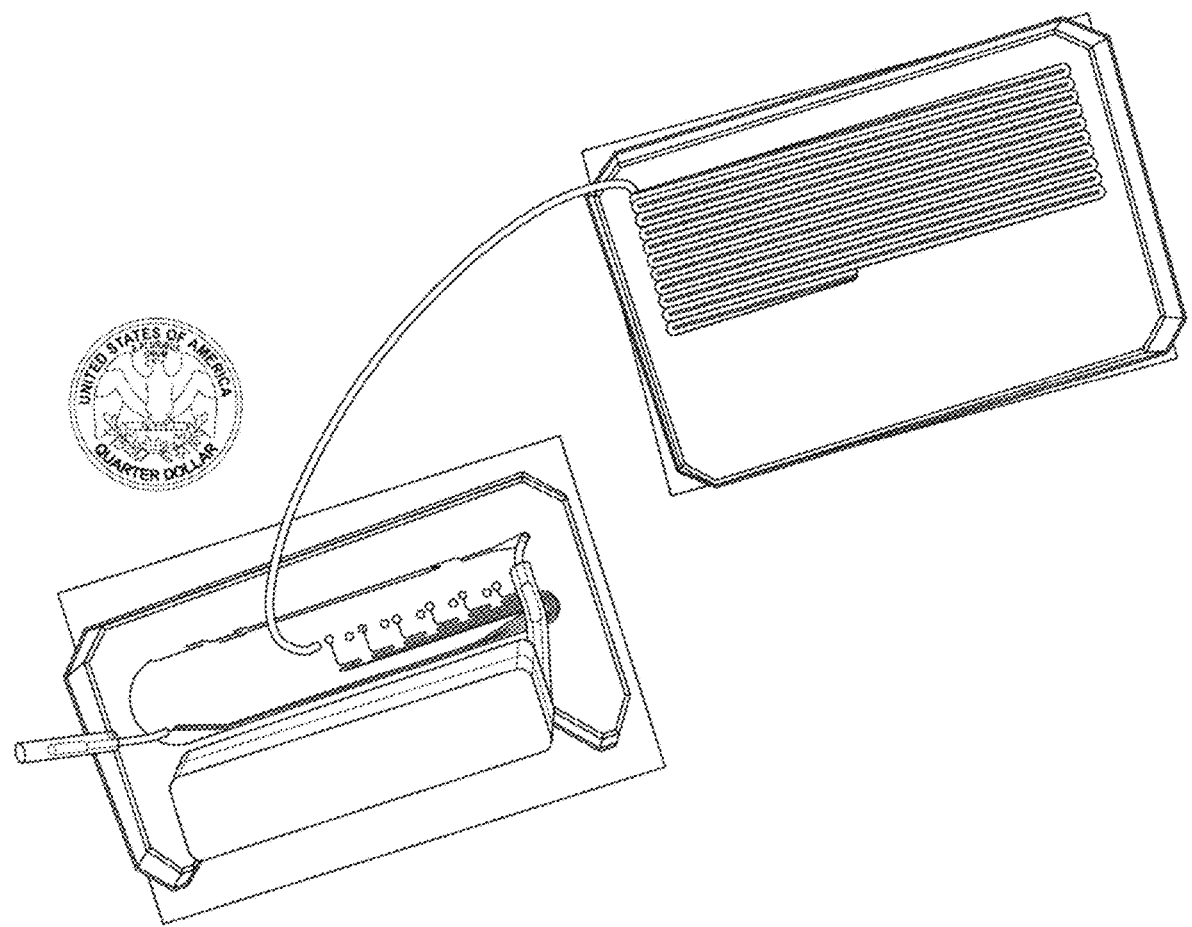
FIG. 24 An image of a FCS device and an attached collection chamber. The FCS device was connected to a serpentine collection chamber that was used to accurately enumerate cancer cells for the FCS calibration using cultured cancer cell lines. The depth of collection chamber is 50 µm. The size of the glass slide is 75×50 mm. Blue dye was used to visualize the microchannel.
Figure 25:
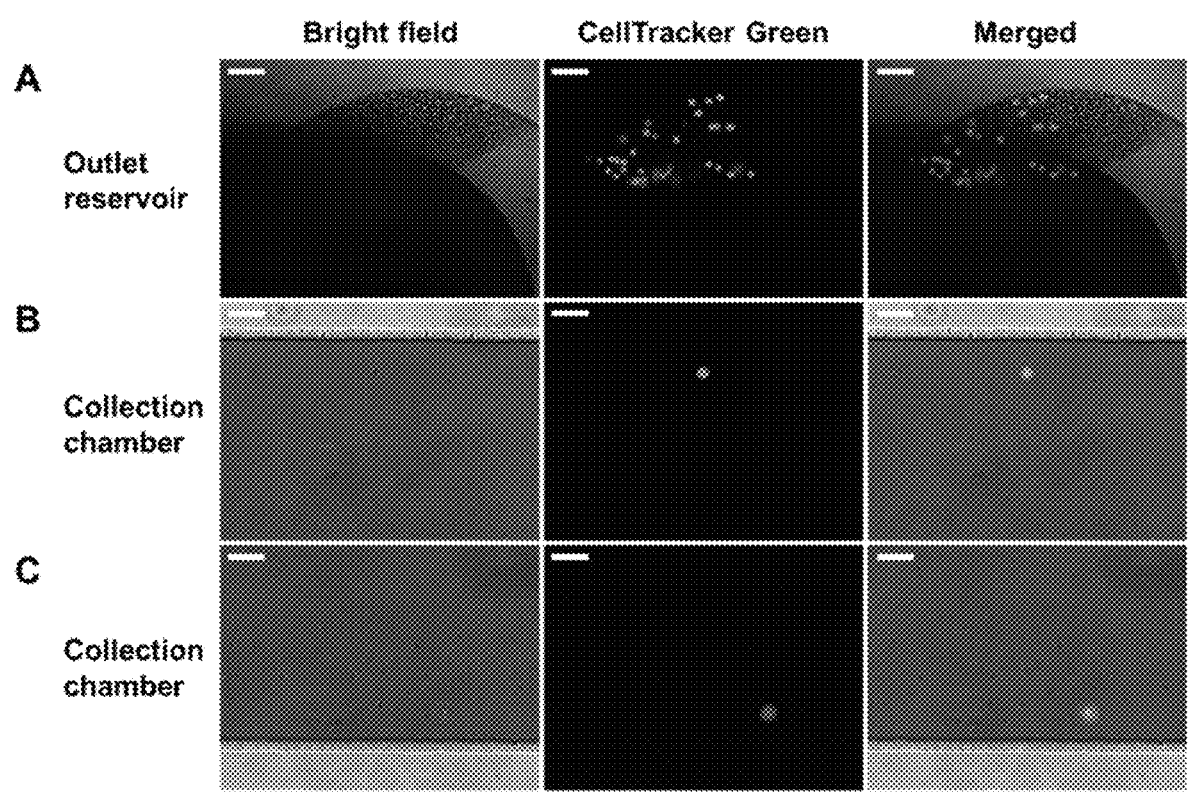
FIG. 25 Representative micrographs of lung cancer H1299 cells and WBCs after a separation of spiked cancer cells in a FCS device at a throughput of 6 mL h$^{-1}$. ~100 CellTracker Green stained H1299 cells were spiked into 1 mL of undiluted WBCs. (A) H1299 lung cancer cells and WBCs were identified in the outlet (outlet 6) reservoir. Scale bars: 100 µm. (B) and (C) H1299 lung cancer cells and WBCs were identified in the serpentine collection chamber. Scale bars: 50 µm.
Figure 26:
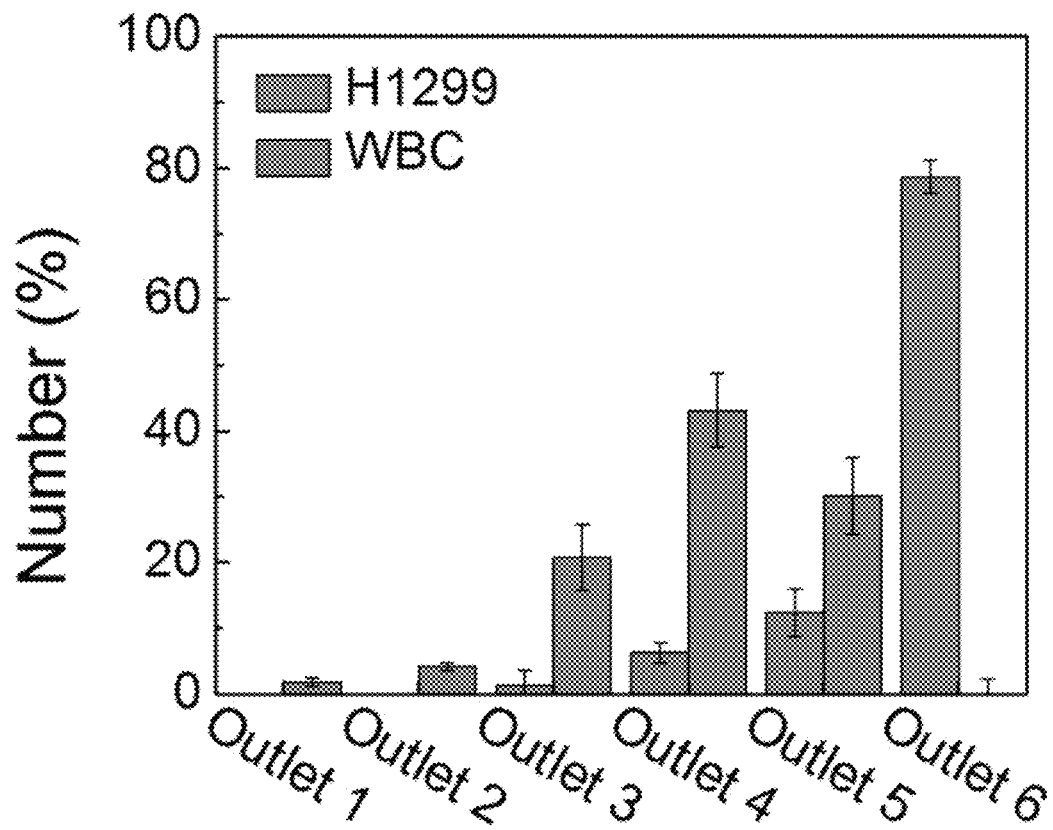
FIG. 26 Cell type distribution of cells collected from outlets 1-6 after a separation of ~100 H1299 cells spiked into 1 mL of undiluted WBCs using a FCS device at a throughput of 6 mL h$^{-1}$.
Figures 27A, 27B:
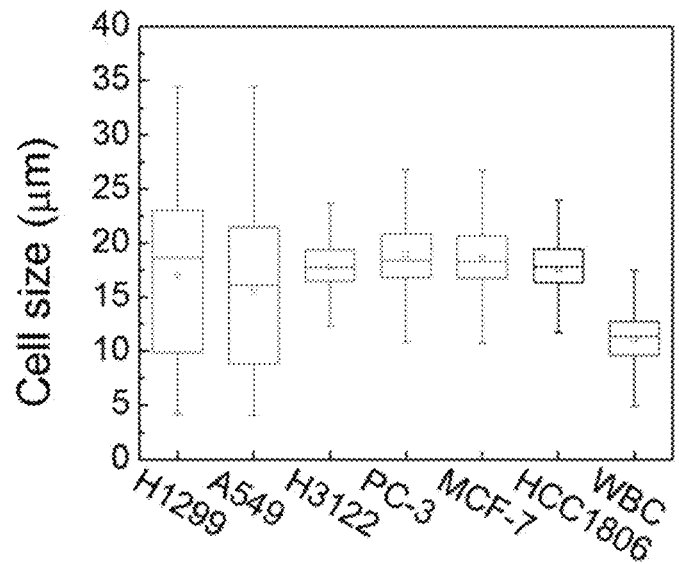
FIG. 27A The average cell size of six cancer cell lines and WBCs measured by a cell counter.
FIG. 27B Size distribution of cancer cells and WBCs.
Figure 28:
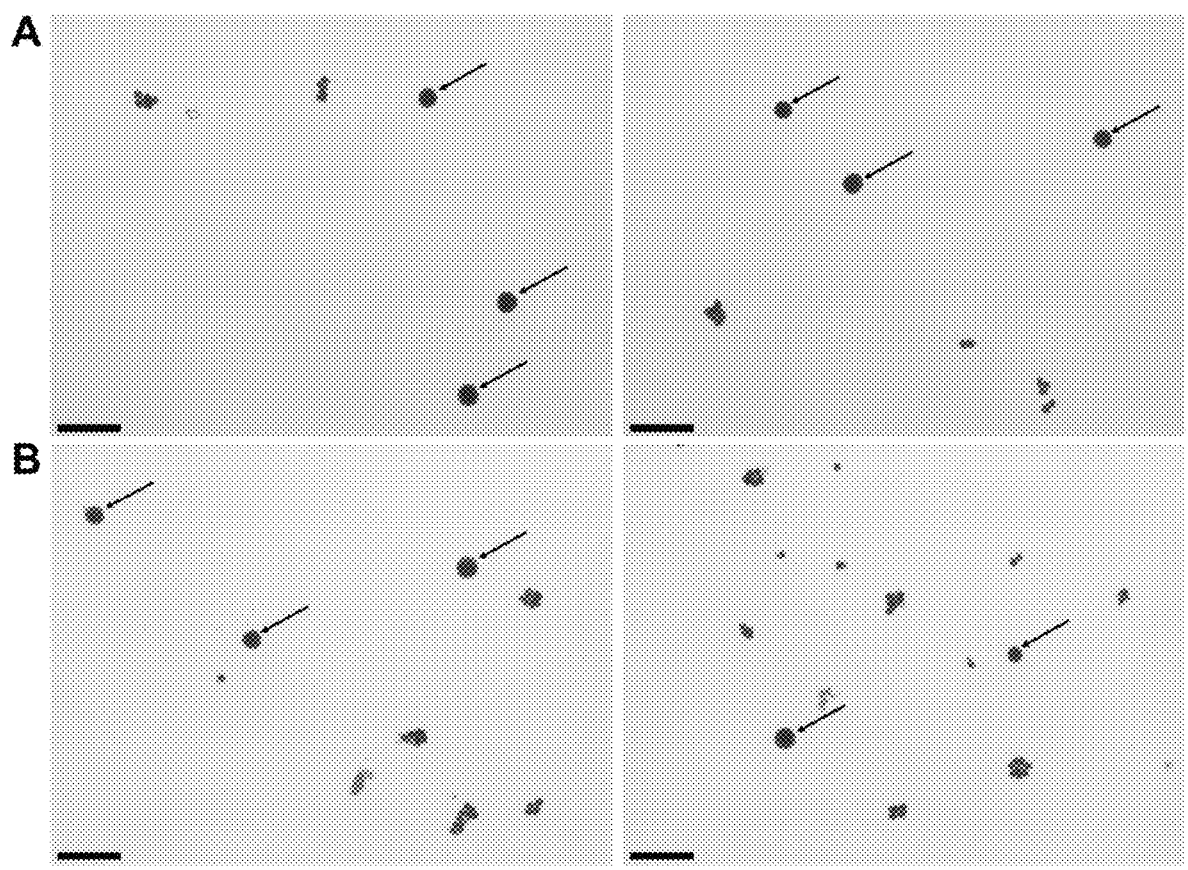
FIG. 28 Representative images of CTC identification from patient A and B, with their blood processed by FCS devices. Black arrows indicate the identified CTCs. Scale bars: 50 µm.

We first confirmed the validity of the model by comparing simulated trajectories (FIG. 19) with experimental ones (FIG. 20) that were obtained from imaging 16.9-μm-diameter H1299 cells (emulated with beads of similar size) and 11.1-μm-diameter WBCs in a FCS device. From FIG. 21, the simulated cell trajectories generated by the model matched the experimental one very well. We then started to use the model for FCS optimizations. The dimensions of the channel were listed in FIG. 18. Concentration of ferrofluid was 0.26% (v/v) and the viscosity was measured to be 2.92 mPa·s. Average diameters of WBC and H1299 cells were 11.1 μm and 16.9 μm. Dimensions of the permanent magnet were 50800 μm (length)×12700 μm (width)×12700 μm (height) and the B field at the polar surface was measured to be 0.5 T.

Modeling of FCS and its Calibration

The model used in this study to simulate cell trajectories in three-dimensional (3D) manner was previously described. We modified the analytical model for this study, which could predict the 3D transport of diamagnetic cancer cells and WBCs in ferrofluids inside a microfluidic channel coupled with permanent magnets. The magnets produced a spatially non-uniform magnetic field that led to a magnetic buoyancy force on the cells. Trajectories of the cells in the device were obtained by (1) calculating the 3D magnetic buoyancy force via an experimentally verified and analytical distribution of magnetic fields as well as their gradients, together with a nonlinear Langevin magnetization model of the ferrofluid, (2) deriving the hydrodynamic viscous drag force with an velocity profile of the channel obtained from COMSOL Multiphysics (Version 3.5, COMSOL Inc., Burlington, Mass.), (3) solving governing equations of motion using analytical expressions of magnetic buoyancy force and hydrodynamic viscous drag force in MATLAB (Math Works Inc., Natick, Mass.). The parameters of simulation (device dimension and geometry, fluid and cell properties, and magnetic fields) reflected exact experimental conditions.

Polystyrene microparticles (Polysciences, Inc., Warminster, Pa.) with diameters of 15.7 μm were mixed together with WBCs at the concentration of 1×10$^4$ particles mL$^{-1}$ for model calibration. Microparticle and cell mixtures were injected into inlet A of a FCS device with a flow rate of 1.2-6 mL h$^{-1}$. The flow rate of inlet B was fixed at 6 mL h-1 for all experiments. The magnet was placed 1 mm away from the channel, which corresponded to magnetic field strengths 443 mT and magnetic field gradients 56.2 T m-1, (ESI, t FIG. S1). A ferrofluid with a concentration of 0.26% (v/v) were used in calibration experiments.

Custom-Made Biocompatible Ferrofluids

A water-based ferrofluid with maghemite nanoparticle was synthesized by a chemical co-precipitation method and made biocompatible following a protocol previously described. Ammonium hydroxide solution (28%), iron (II) chloride tetrahydrate (99%), iron (III) chloride hexahydrate (97%), nitric acid (70%), iron (III) nitrate nonahydrate (98%), and sodium hydroxide (98%) were purchased from a commercial vendor (Sigma-Aldrich, St. Louis, Mo.). All reagents were used as received. Maghemite nanoparticles were synthesized by a chemical co-precipitation method. In a typical reaction, 50 mL of ammonium hydroxide solution was quickly added to a mixture of 100 mL of 0.4 M iron (II) chloride tetrahydrate and 0.8 M iron (III) chloride hexahydrate, and was followed by stirring at room temperature for 30 minutes. The suspension was then centrifuged at 2000×g for 3 minutes and the precipitate was dispersed in 200 mL of 2 M nitric acid and 0.35 M iron (III) nitrate nonahydrate. The mixture was maintained at 90° C. for 1 hour. During this time, the color of the mixture changed from black ($Fe_3O_4$) to reddish brown ($Fe_2O_3$). The maghemite nanoparticle suspension was centrifuged at 3000×g for 3 minutes and finally dispersed in 120 mL of deionized (DI) water, yielding a stable dispersion with a pH of 1.5-2. The pH of the dispersion was adjusted to 2.9 by 1 M sodium hydroxide solution. 40 mL of Atlox 4913 (Croda, Edison, N.J.), a graft copolymer solution, was added to the dispersion and stirred for 5 minutes before raising pH to 7.0. The dispersion was then vigorously stirred at room temperature for 1 hour, and the resulted ferrofluid was dialyzed with a dialysis membrane (Spectrum Labs, Rancho Dominguez, Calif.) against DI water for one week. DI water was refreshed every 24 hours. After dialysis, excess water was vaporized at 72° C. Finally, 10% (v/v) 10× Hank's balanced salt solution (HBSS; Life Technologies, Carlsbad, Calif.) was added into the ferrofluid to render it isotonic for cells followed by adjusting pH to 7.0. Sterile filtration of ferrofluid was performed with a 0.2 μm filter (VWR, Radnor, Pa.) and ferrofluids were exposed to UV light for 12 hours before experimental use.

Size and morphology of maghemite nanoparticles were characterized via transmission electron microscopy (TEM; FEI, Eindhoven, the Netherlands). Magnetic properties of the ferrofluid were measured at room temperature using a vibrating sample magnetometer (VSM; MicroSense, Lowell, Mass.) with a 2.15 T electromagnet. The magnetic moment of ferrofluid was measured over a range of applied fields from −21.5 to +21.5 kOe. The measurements were conducted in step field mode at a stepsize of 250 Oe s$^{-1}$. Zeta potential of the ferrofluid was measured with a Zetasizer Nano ZS (Malvern Instruments, Westborough, Mass.). The hydrodynamic diameter of nanoparticles was measured by dynamic light scattering (DLS). The viscosity of ferrofluids was characterized with a compact rheometer (Anton Paar, Ashland, Va.) at room temperature.

Size and morphology of the maghemite nanoparticles were characterized via transmission electron microscopy (TEM; FEI Corp., Eindhoven, the Netherlands). Magnetic properties of the resulting biocompatible ferrofluid were measured at room temperature using a vibrating sample magnetometer (VSM; MicroSense, LLC, Lowell, Mass.). Briefly, particle size distribution of the custom-made ferrofluid was 10.25±2.96 nm. Saturation magnetization of the as-synthesized ferrofluid was 0.96 kA m$^{-1}$, corresponding to an estimated 0.26% volume fraction of magnetic content. This ferrofluid was colloidally stable for up to 10 months' storage, did not show particle agglomeration during microfluidic operations, and was made to be isotonic and have a 7.0 pH and neutral surfactant for biocompatible cell separation.

Cell Culture and Sample Preparation

Six cancer cell lines (ATCC, Manassas, Va.) including three lung cancer cell lines (H1299, A549 and H3122), one prostate cancer cell line (PC-3), and two breast cancer cell lines (MCF-7 and HCC1806) were used in this study. H1299, A549, H3122, PC-3, and HCC1806 cells were cultured in RPMI-1640 medium (Mediatech, Inc., Manassas, Va.) supplemented with 10% (v/v) fetal bovine serum (FBS; Life Technologies, Carlsbad, Calif.) and 1% (v/v) penicillin/streptomycin solution (Mediatech, Inc., Manassas, Va.). MCF-7 cells were cultured in Dulbecco's modified eagle medium (DMEM; Life Technologies, Carlsbad, Calif.) supplemented with 10% (v/v) FBS, 1% (v/v) penicillin/streptomycin solution and 0.1 mM MEM non-essential amino acid (NEAA; Life Technologies, Carlsbad, Calif.). All cell cultures were maintained at 37° C. under a humidified atmosphere of 5% CO2. Cell lines were released through incubation with 0.05% Trypsin-EDT A solution (Life Technologies, Carlsbad, Calif.) at 37° C. for 5-10 minutes before each use.

Cancer cells were fluorescently stained by incubation with 2 µM CellTracker Green (Life Technologies, Carlsbad, Calif.) for 30 minutes before each use. Probe solution was replaced with culture medium by centrifuging at 2QO×g for 5 minutes. Cells were counted with a hemocytometer (Hausser Scientific, Horsham, Pa.) and serially diluted in culture medium to achieve a solution with approximately $1 \times 10_4$ cells per mL. Cells were then counted with a Nageotte counting chamber (Hausser Scientific, Horsham, Pa.) to determine the exact number of cells per IIL Desired number of cancer cells (50, 100, 200, 500, 1000, or 2000) were spiked into 1 mL of WBCs (RBC-lysed whole blood). The number of cancer cells spiked was determined by the average of two counts, with an average of 5.2% difference between the counts. We chose to focus on separating cancer cells from WBCs because of the size of WBCs (8-14 µm) were much closer to cancer cells (15-25 µm) that RBCs (6-9 µm).

Human whole blood from healthy subjects (Zen-Bio, Research Triangle Park, N.C.) was lysed by RBC lysis buffer (eBioscience, San Diego, Calif.) with a volume ratio of 1:10 for 5 minutes at room temperature. Cell mixtures were centrifuged at 800×g for 5 minutes and the pellet was suspended in the same volume of ferrofluid containing 0.1% (v/v) Pluronic F-68 non-ionic surfactant (Thermo Fisher Scientific, Waltham, Mass.). WBCs were fixed by 4% (w/v) paraformaldehyde (PF A; Santa Cruz Biotechnology, Dallas, Tex.) at 4° C. for 30 minutes for long-term use.

Biocompatibility Study of FCS

Short-term cell viability after FCS was examined using a Live/Dead assay (Life Teclmologies, Carlsbad, Calif.). $1 \times 10^6$ H1299 cancer cells suspended in 1 mL of ferrofluids were injected into inlet A of a FCS device at a flow rate of 6 mL h$^{-1}$. After separation, cells from outlet 6 were collected and washed with phosphate buffered saline (PBS; Life Technologies, Carlsbad, Calif.) three times. Cells were then incubated with working solution (2 µM calcein-AM and 4 µM ethidium homodimer-1 (EthD-1)) for 30 minutes at room temperature. After the solution was removed and washed with PBS, labeled cells were observed under a fluorescence microscope (Carl Zeiss, Germany) for counting.

For long-term proliferation, separated H1299 cells from a FCS device were collected into a centrifuge tube and washed three times with culture medium to remove the nanoparticles, and then the cells were suspended in culture medium and seeded into a 24-well plate (Coming Inc., Coming, N.Y.). Cells were then cultured at 37° C. under a humidified atmosphere of 5% CO2, the medium was refreshed every 24 h during the first 3 days. Cellular morphology was inspected every 24 hours.

Surface biomarker expression change was studied by immunofluorescence staining of cancer cells with EpCAM and cytokeratin antibodies. HCC1806 cancer cells were collected after FCS and seeded on a coverslip. After 24-h incubation, cells were fixed with 4% (w/v) PF A for 30 minutes and subsequently permeabilized with 0.2% (v/v) Triton X-100 (Sigma-Aldrich, St. Louis, Mo.) in PBS for 10 minutes. Cells were then blocked by 0.5% (w/v) bovine serum albumin (BSA; Miltenyi Biotec, San Diego, Calif.) in PBS for 20 minutes. After blocking nonspecific binding sites, cells were immunostained with primary antibodies, anti-cytokeratin 8/18/19 (Abeam, Cambridge, Mass.), human EpCAM/TROP-1 (R&D System, Minneapolis, Minn.). Appropriately matched secondary Alexa Fluor-conjugated antibodies (Life Technologies, Carlsbad, Calif.) were used to identify cells. Nuclei were stained with 4',6-Diamidino-2-Phenylindole (DAPI; Life Technologies, Carlsbad, Calif.). After immunofluorescence staining, cells were washed with PBS and stored at 4° C. or imaged with a fluorescence microscope.

FCS Device Fabrication and Cell Separation

Microfluidic devices were made of polydimethylsiloxane (PDMS) using standard soft lithography techniques. The thickness of the microfluidic channel was measured to be 52 µm by a profilometer (Veeco Instmments, Chadds Ford, Pa.). One NdFeB permanent magnet (K&J Magnetics, Pipersville, Pa.) was embedded into the PDMS channel with their magnetization direction vertical to the channel during the curing stage. The magnet is 5.08 cm in length, 1.27 cm in both width and thickness. Flux density at the center of magnet's surface was measured to be 0.5 T by a Gauss meter (Sypris, Orlando, Fla.) and an axial probe with 0.381 mm diameter of circular active area. Fabricated devices were first flushed by 70% ethanol for 10 minutes at the flow rate of 6 mL h$^{-1}$ and then primed with 1×PBS supplemented with 0.5% (w/v) BSA and 2 mM EDTA (Thermo Fisher Scientific, Waltham, Mass.) for 10 minutes at the flow rate of 6 mL h$^{-1}$ before each use.

During a typical experiment, a microfluidic device was placed on the stage of an inverted microscope (Carl Zeiss, Germany) for observation and recording. Two fluid inputs were controlled by individual syringe pumps (Chemyx, Stafford, Tex.) at tunable flow rates. Blood samples were injected into inlet A of a FCS device, sheath flow (ferrofluids) was injected into inlet B. Images and videos of microparticles and cells were recorded with a high-resolution CCD camera (Carl Zeiss, Germany). After separation, cells were collected in a serpentine collection chamber for cell counting.

NSCLC Patient Blood Processing

De-identified blood samples were obtained from newly diagnosed advanced NSCLC patients before treatment with informed consents according to a protocol approved by Institutional Review Board (IRB) at Augusta University. All blood samples were collected into vacutainer tubes (BD, Franklin Lakes, N.J.) containing the anticoagulant K2EDT A and were processed within 3 hours of blood draw. In a typical process, every 1 mL of whole blood was lysed by 10 mL of RBC lysis buffer for 5 minutes at room temperature. WBCs were then collected by spinning down the solution at S00×g for 5 minutes and the pellet was suspended in 1 mL of ferrofluid containing 0.1% (v/v) Pluronic F-68. The sample was then loaded into a 10-mL syringe (BD, Franklin Lakes, N.J.) followed by processing with the FCS device at a flow rate of 6 mL h$^{-1}$. A stainless-steel sphere (BC Precision, Chattanooga, Tenn.) with a diameter of 1.6 mm was also loaded into a syringe. A magnet was used to gently agitate the sphere to prevent blood cells from settling down every 5-10 minutes. After separation, the FCS device was flushed by PBS or ThinPrep PreservCyt solution (Hologic, Marlborough, Mass.) at 30 mL h$^{-1}$ for 20 minutes to remove any cells in outlet reservoir. During the separation, the cells from outlet 6 of a FCS device were directly preserved in ThinPrep PreservCyt solution for further analysis.

CTC Identification

After processing of blood with a FCS device, collected cells were preserved in ThinPrep PreservCyt solution. Samples collected in ThinPrep vials were directly loaded into ThinPrep 2000 processor (Hologic, Marlborough, Mass.), which is an automated slide-processing instrument that was routinely used in cytology laboratory for preparing gynecologic and nongynecologic samples. The instrument transferred diagnostic cells in the sample to a slide that was then immersed in cell fixative bath ready for staining. Papanicolaou (Pap) staining of the slides was performed using Shandon Gemini stainer (Thermo Fisher Scientific, Waltham, Mass.) followed by cover-slipping using permount. ThinPrep slides were afterwards evaluated by a cytopathologist using light microscopy to identify and count the number of CTCs. Collected cells were also fixed with 4% (w/v) PFA for 30 minutes and subsequently permeabilized with 0.2% (v/v) Triton X-100 in PBS for 10 minutes. Cells were then blocked by 0.5% (w/v) BSA in PBS for 20 minutes. Afterblocking nonspecific binding sites, cells were immunostained with primary antibodies, anticytokeratin 8/18/19, human EpCAM/TROP-1, and anti-CD45 (Abcam, Cambridge, Mass.). Following, the appropriately matched secondary Alexa Fluor-conjugated antibodies (Life Technologies, Carlsbad, Calif.) were used to identify cells. After immunofluorescence staining, cells were washed with PBS and stored at 4° C. or imaged with a fluorescence microscope.

Results and Discussion

Optimization of FCS for High-Throughput, High-Recovery and Biocompatible CTC Separation Previous ferrohydrodynamic cell sorting devices were developed to process cells at low throughput and high spike ratios, therefore cannot be realistically used to separate CTCs from blood. CTCs are extremely rare in the blood circulation, occurring usually at a concentration of less than 100 CTCs per mL of blood. These cells are dispersed in a background of billions of RBCs and millions of WBCs, making the separation of CTCs a significant challenge. For any CTC separation method, it is necessary for it to be able to process several milliliters of blood within one hour with a high CTC recovery rate to enrich sufficient numbers of viable CTCs. Thus, high-throughput, high recovery rate, reasonable purity and biocompatible separation of viable CTCs are four criteria for any separation method targeting clinical applications. For ferrohydrodynamic cell separation (FCS) method, the parameters that will affect the above-mentioned criteria include device geometry, magnetic field and its gradient, flow rate of cells, and ferrofluid properties (i.e., magnetic volume fraction or concentration, pH, tonicity, materials and surfactants of nanoparticles, colloidal stability). These parameters are highly coupled with each other and for this reason an effective model was needed for systematic device optimization. To search for parameters for high throughput, high recovery rate, reasonable purity and biocompatible CTC separation, we first started with a device geometry depicted in FIG. 1D and FIG. S2 that operated in low Reynolds number laminar flow region when its cell flow rates were from 1.2 to 7.2 mL h$^{-1}$. The corresponding Reynolds numbers were from 0.5 to 3.1, and the upper limit of this flow rate range was close to the clinically relevant throughput in typical CTC separation. We then created an analytical model that could predict three-dimensional (3D) trajectories of cancer cells and blood cells in ferro fluids inside this device coupled with a permanent magnet. We considered both magnetic buoyancy force and hydrodynamic drag force in simulating the cell trajectories. The detailed description of this 3D analytical model is described below.

The dominant magnetic force in ferrohydrodynamic cell sorting (FCS) is a magnetic buoyancy force generated on diamagnetic cells immersed in ferrofluids. Particles immersed in ferrofluids experience this force under a non-uniform magnetic field, $$\vec{F}_m = \mu_0 V_c [(\vec{M}_c - \vec{M}_f) \cdot \nabla] \vec{H} \quad (1)$$

where $\mu_0 = 4\pi \times 10^{-7}$ H m$^{-1}$ is the permeability of free space, $V_c$ is the volume of the magnetized body, in this case a cell, $\vec{M}_c$ (is its magnetization (close to zero for most cells), $\vec{M}_f$ is magnetization of the ferrofluid surrounding the body, and $\vec{H}$ is magnetic field strength at the center of the body. For cell separation in ferrofluids under a strong magnetic field, magnetization of the ferrofluid with superparamagnetic particles in it can be modeled via Langevin function, $$\frac{\vec{M}_f}{\phi_f \vec{M}_{f,b}} = L(\alpha_f) = \coth(\alpha_f) - \frac{1}{\alpha_f} \quad (2)$$

where $\alpha_f = \mu_0 \pi M_{f,b} H d_f^3 / 6 k_B T$, $\phi_f$ is the volume fraction of the magnetic materials in ferrofluids, $M_{f,b}$ is saturation moment of the bulk magnetic materials, and $d_f$ is the diameter of nanoparticles in a ferrofluid. $k_B$ is the Boltzmann constant, T is temperature. In ferrohydrodynamic cell sorting, the magnetization of the cell $\vec{M}_c$ is less than its surrounding magnetic liquid $\vec{M}_f$, and the direction of the magnetic force $\vec{F}_m$ on the cell is pointing towards magnetic field minima.

The hydrodynamic viscous drag force exerted on diamagnetic cell takes the form, $$\vec{F}_d = -3\pi \eta D_c (\vec{U}_c - \vec{U}_f) f_D \quad (3)$$

where η is the viscosity of ferrofluids, $D_c$ is the diameter of the cell, and $\vec{U}_c$ and $\vec{U}_f$ are the velocity vectors of the cell and ferrofluids respectively, is the hydrodynamic drag force coefficient for a cell moving near a solid surface, often referred to as the "wall effect". Because of the low Reynolds number in FCS devices, inertial effects on the cell were neglected and motion of cells in ferrofluids could be determined by the balance of hydrodynamic viscous drag force and magnetic buoyancy force. From Equations 1-3, it can be seen that cells with different volumes experience different magnitudes of magnetic buoyancy force, which can result in the separation of these cells in ferrofluids in a continuous-flow manner.

Figure 1C:
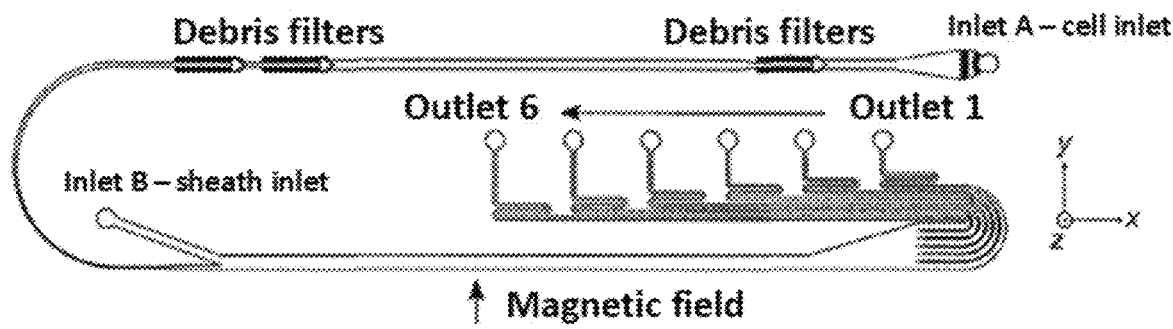
FIG. 1C is a top-view of the FCS device with labels of inlets, debris filters and outlets. A total of 6 outlets were fabricated in order to account for the broad size distributions of cells. The arrow indicates the direction of magnetic field during device operation. Dimensions of the FCS device and magnet are described below.
Figure 2A:
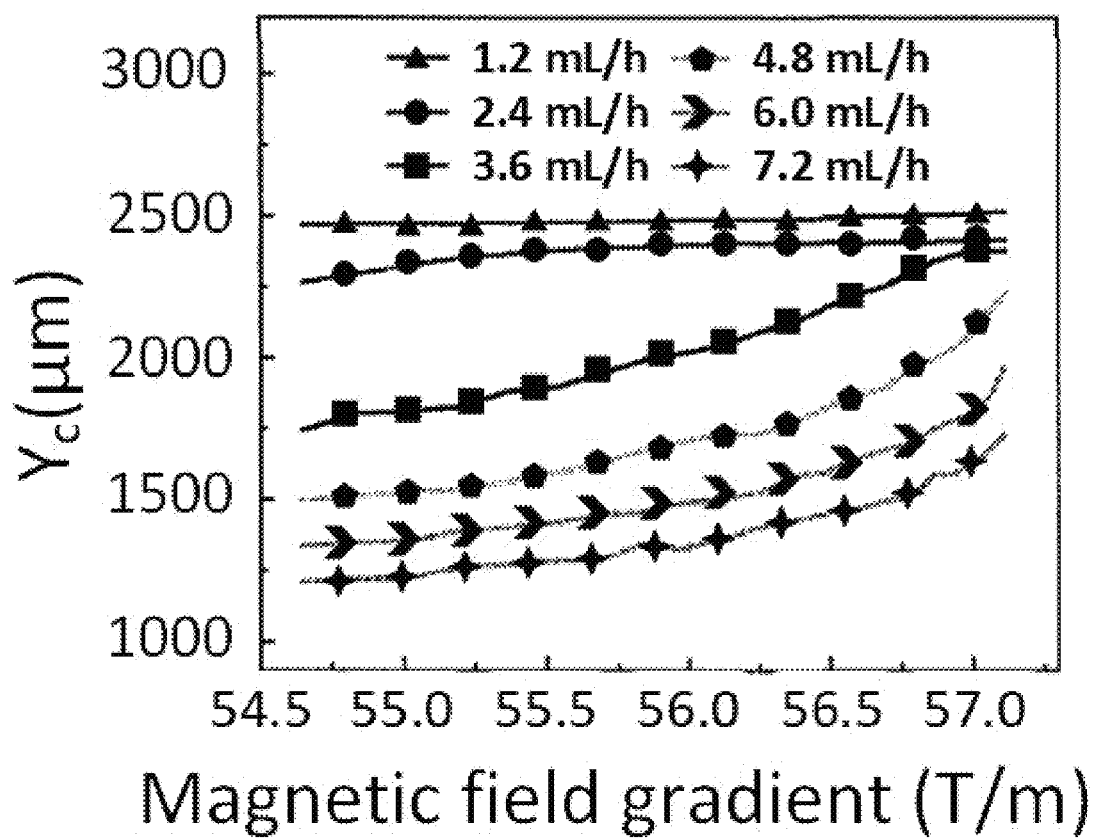
FIGS. 2A-2D show the results of optimization of FCS devices with their device geometry shown in FIG. 1C for high-throughput, high-recovery and biocompatible CTC separation. A 3D analytical model considering magnetic buoyancy force, hydrodynamic drag force, laminar flow profiles and cancer/blood cell physical properties was developed to guide the optimization. The validity of the model was confirmed by comparing its simulated trajectories with experimental ones. Numerical optimization of deflection distance $Y_c$ and separation distance $\Delta Y$ (corresponding to recovery rate and purity) at the end of the FCS device was conducted with parameters including.
Figure 2B:
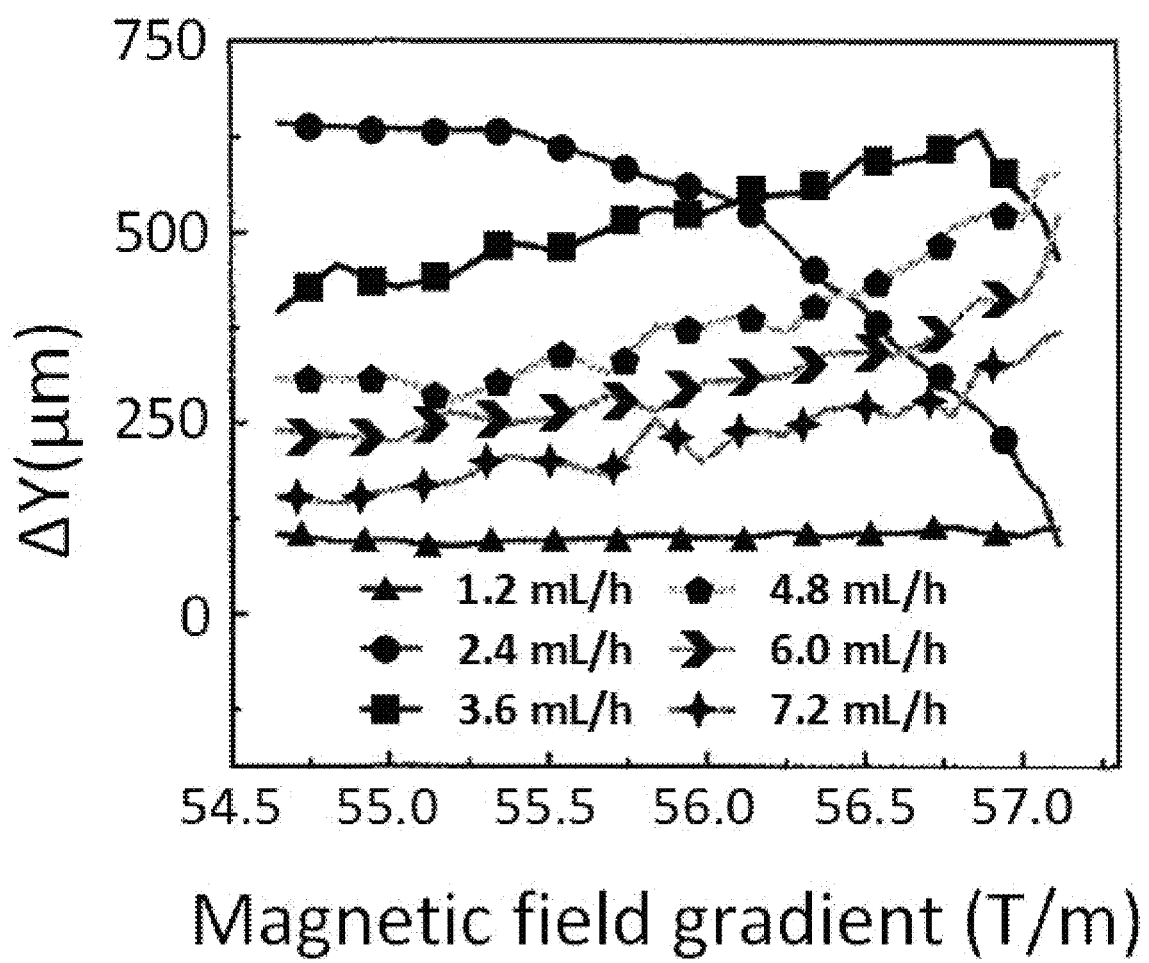

We first confirmed the validity of the model by comparing simulated trajectories with experimental ones that were obtained from imaging 15.6-μm-diameter polystyrene beads and 11.1-μm-diameter WBCs in a FCS device. We then used the model to optimize the FCS device for CTC separation. The optimization was focused on the study of separating cancer cells from WBCs, because of their subtle size difference. Briefly, we allowed cancer cells and WBCs (H1299 lung cancer cells with a mean diameter of 16.9 μm, and WBCs with a mean diameter of 11.1 μm) to enter the channel and simulated their trajectories in ferrofluids under external magnetic fields. From their simulated trajectories, we calculated two outputs—a deflection in the y-direction (see FIG. 1C) for cancer cells, denoted as $Y_c$, and a separation distance between the two types of cells, denoted as $\Delta Y$. Both outputs were optimized using parameters including flow rates of cell inlet (1.2-7.2 mL h$^{-1}$), magnetic fields and gradients (field: 471-415 mT; gradient: 57.1-54.6 T m$^{-1}$ and ferrofluid concentrations (up to 1% v/v). The goal here was to achieve high cell flow rate, cancer cell recovery rate and recovered cancer cell purity, which translated to maximizing both Y c and ~Y simultaneously. FIG. 2A shows when the magnetic field gradient increased, the deflection distance of cancer cells $Y_c$ increased monotonically for all flow rates. This was because the driving force, magnetic buoyancy force on cells, was proportional to the magnitude of magnetic field gradient. As the cell inlet flow rate increased, $Y_c$ decreases due to reduced time in the channel. FIG. 2B shows similar trend of separation distance $\Delta Y$ increasing as the field gradient increased when flow rates are 4.8, 6.0 and 7.2 mL h$^{-1}$ Interestingly, when cell input flow rates are smaller (e.g., 1.2, 2.4 and 3.6 mL h$^{-1}$), the separation distance $\Delta Y$ between two cell types had different trends. This was due to the fact that both cell types at slower flow rates reached their maximum deflections very quickly, resulting in a mixing rather than separation of the two types. For practical CTC separation, we chose a cell flow rate of 6 mL h$^{-1}$ and a magnetic field gradient of 56.2 T m$^{-1}$ that could be generated realistically through magnet and channel integration in a FCS device to achieve high-throughput and high recovery rate cell separation. It should be noted here that the optimization was conducted on a single-channel device, and higher cell flow rates and throughputs were possible with device scale-up or multiplexing.

Figure 2C:
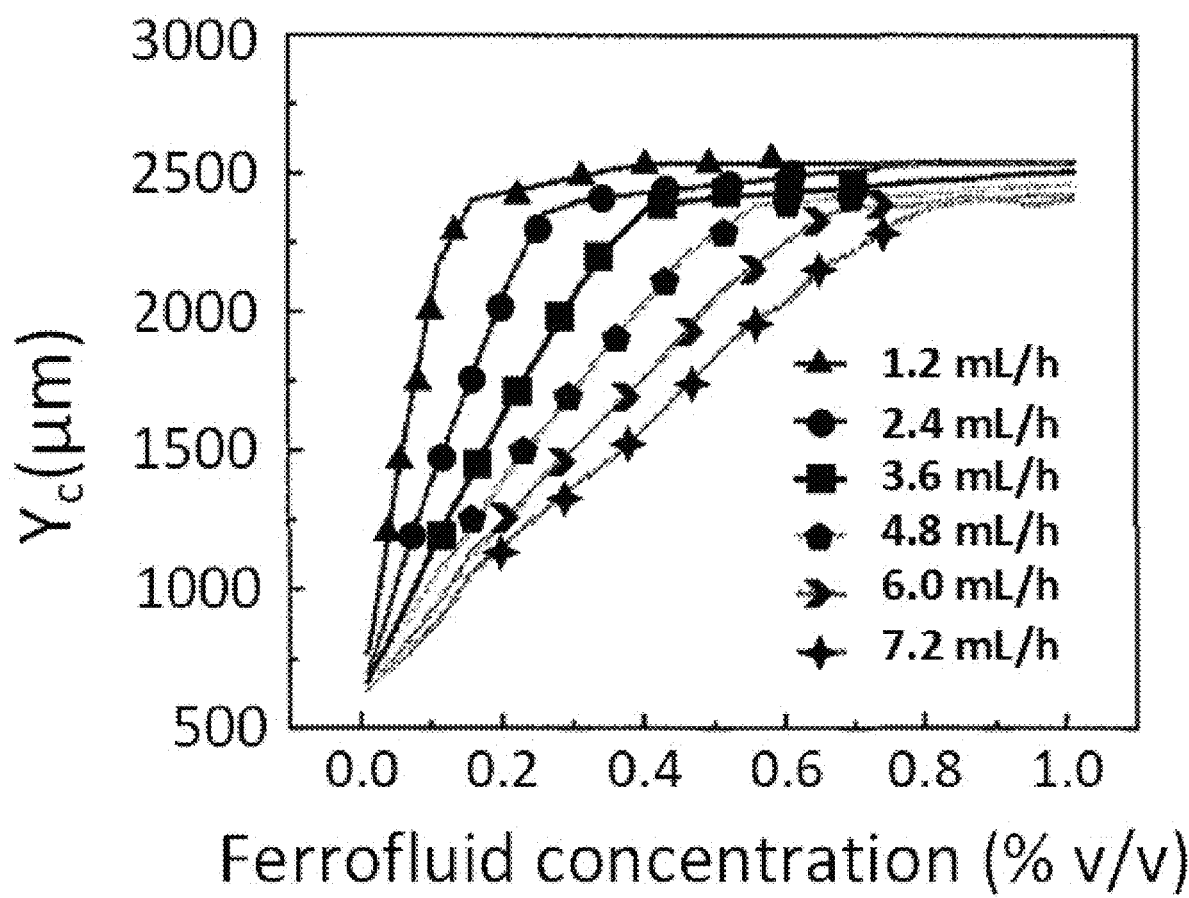
Figure 2D:
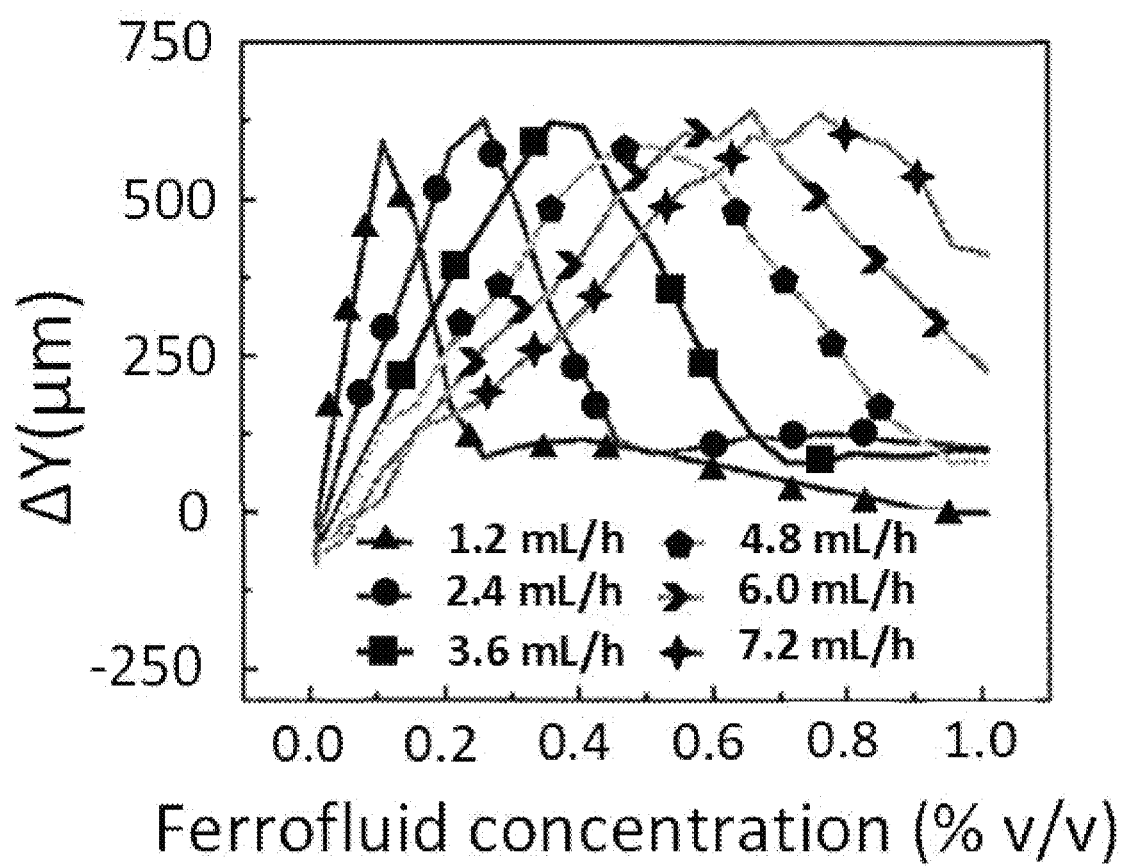

After optimizing flow rate and magnetic field gradient, another critical parameter that still needs to be optimized is the ferrofluid itself. Ideally, the ferrofluid needs to possess properties that are not only biocompatible to CTCs but also enable its colloidal stability under high flow rates and strong magnetic fields. Therefore, its pH value, tonicity, materials and surfactants of nanoparticles need to be optimized as a biocompatible medium for cells, while at the same time the overall colloidal stability of the ferrofluid will have to be well maintained. Based on our previous work, we have developed a water-based ferrofluid with maghemite nanoparticles in it that was tested to be biocompatible for cancer cells from cultured cells lines. The particles had a mean diameter of 11.24 nm with a standard deviation of 2.52 nm. The diameter of the nanoparticles was chosen to preserve the colloidal stability of ferrofluids against agglomeration due to gravitational settling and magnetic dipole-dipole attraction. As a result, our ferrofluids remained colloidally stable after at least 10 months' storage. The nanoparticles were functionalized with a graft copolymer as surfactants to prevent them from coming too close to one another when there was a magnetic field. The volume fraction of the magnetic content of the ferrofluid is 0.26%. This low volume fraction of the ferrofluid not only leaded to excellent biocompatibility for cell sorting, but also enabled us to observe cell motion in microchannel directly with bright-field microscopy, which was difficult with opaque ferrofluids of high solid volume fractions. The ferrofluid was made to be isotonic and its pH was adjusted to 7.0 for biocompatible cell separation. We further optimized the ferrofluid concentration for high-throughput and high recovery separation. From Equation, 1, the magnetic buoyancy force depends on the magnetization of the ferrofluid and affects the cell separation outcome. Therefore, the concentration of ferrofluid had an impact on the process of cell separation. A higher concentration could lead to a higher magnitude of magnetic buoyancy force on cells and a larger deflection $Y_c$ (FIG. 2C), but not necessarily a larger $\Delta Y$ (FIG. 2D). FIG. 2D shows there was an optimal ferrofluid concentration close to 0.6% (v/v) at 6.0 mL h−1 flow rate for I:i Y. Concentrations higher than 0.6% (v/v) resulted in larger $Y_c$ but smaller $\Delta Y$. This again was because both cell types achieved sufficient deflections in a strongly magnetized ferrofluid, resulting in mixing rather than separation of the two. In addition, ferrofluid biocompatibility could be compromised as its nanoparticle concentration increases. Based on these considerations, we chose a 0.26% (Wu) ferrofluid concentration to strike a balance between high-recovery and biocompatible cell separation at a flow rate of 6 mL h$^{-1}$.

Figure 3A:
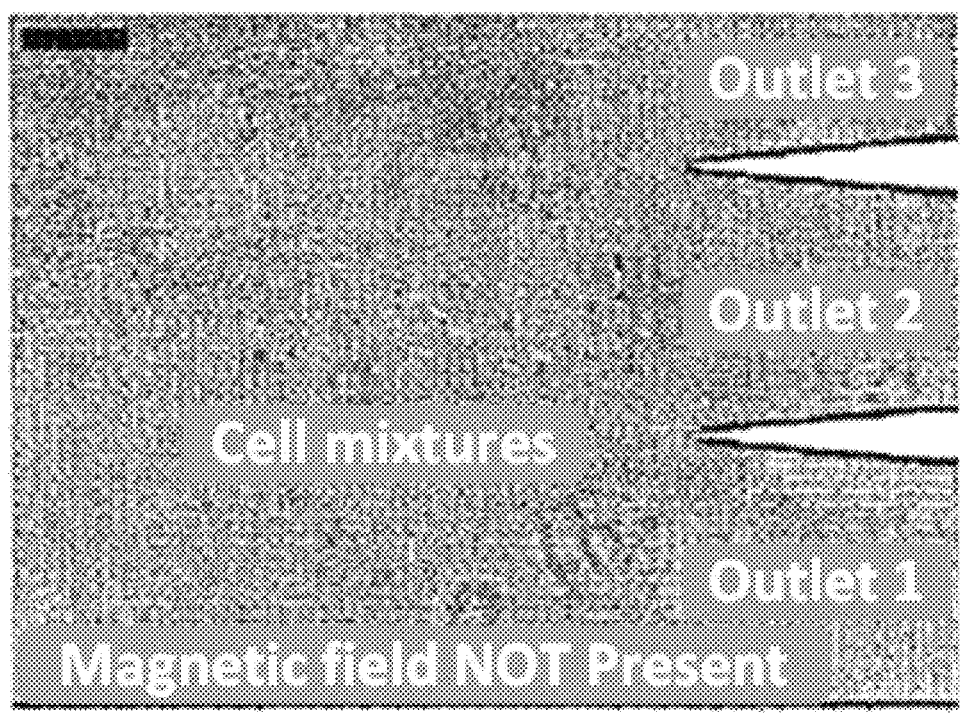
FIGS. 3A-3D are micrographs of spiked cancer cells of cell culture lines and undiluted WBCs separation process in a FCS device. In order to image the separation process, 1×10$^5$ cells H1299 lung cancer cells were spiked into 1 mL of undiluted WBCs to increase the cancer cell concentration so that their fluorescent signals were visible. The cell mixture was processed at the flow rate of 6 mL h$^{-1}$. A ferrofluid with its concentration of 0.26% (v/v) was used; magnetic field was fixed at 443 mT and its gradient was fixed at 56.2 T m$^{-1}$.
Figure 3B:
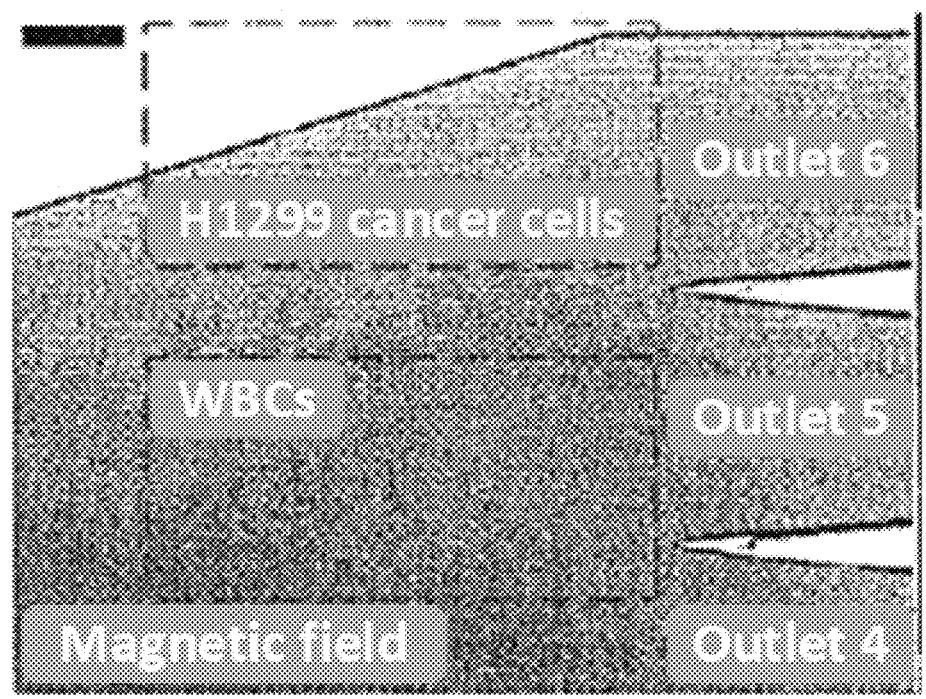
Figure 3C:
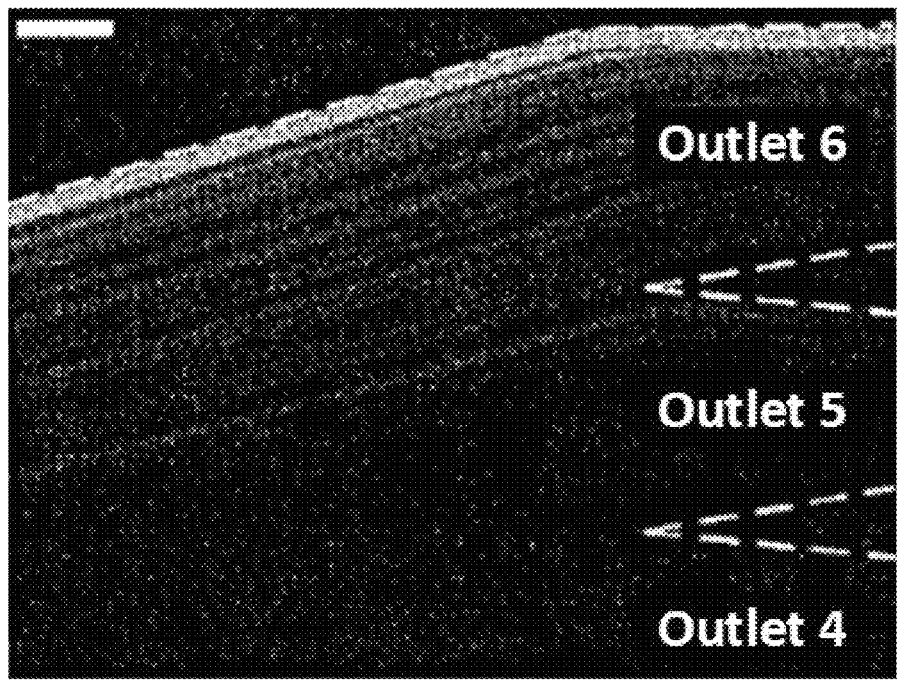
Figure 3D:
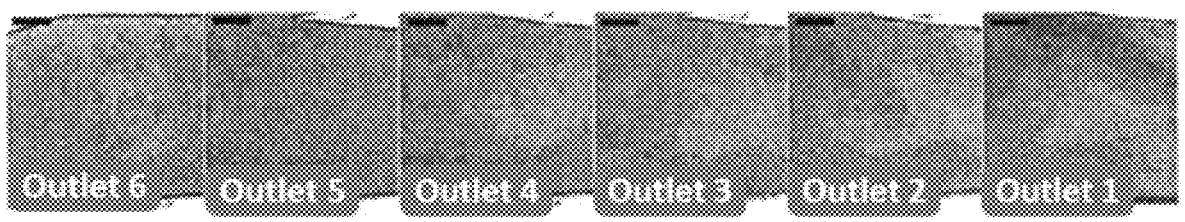

Verification of FCS for High-Throughput and High-Recovery Spiked Cancer Cells Separation We performed experimental verification of high-throughput, high-recovery and biocompatible separation of spiked cancer cells of cultured cell lines from WBCs based on the optimal parameters obtained from simulation and calibration. During separation experiments, a permanent magnet was placed 1 mm away from the channel (magnetic field: 443 mT, magnetic field gradient: 56.2 T m$^{-1}$), and ferrofluids with a concentration of 0.26% (Wu) were used. We first studied the CTC recovery rate at different flow rates using spiked H1299 lung cancer cells in WBCs. The concentration of WBCs was 3-7×106 cells mL$^{-1}$; CTCs were simulated by spiking ~100 Cell Tracker Green stained H1299 cancer cells into 1 mL of WBCs. The cells were loaded into a FCS device at variable flow rates of 1.2-6 mL h$^{-1}$ for recovery rate evaluation. FIG. 3 shows a typical cancer cell (Lung cancer H1299) separation process in the FCS device. When the magnetic field was not present, all cell types including cancer cells and WBCs were flowing near the bottom sidewall of the channel and exiting through outlets 1 and 2 (FIG. 3A). When the magnetic field was present, a separation between cancer cells and WBCs was visible. Magnetic buoyancy forces deflected larger H 1299 cancer cells with a mean diameter of 16.9 j . . . Lm from the cell mixture toward outlets 5 and 6, as shown in FIGS. 3B-3D, Meanwhile, magnetic buoyancy forces on WBCs were insufficient to deflect them about outlet 5, resulting in a spatial separation of the cell mixtures at the end of the channel. Cells from outlets 5 and 6 after separation were collected into a serpentine collection chamber, which was used to accurately enumerate fluorescently labeled cancer cells. The recovery rate was defined as the ratio of the number of identified cancer cells collected from outlets 5 and 6 of the FCS device over the total number of spiked cancer cells from outlets 1-6.

Figure 4A:
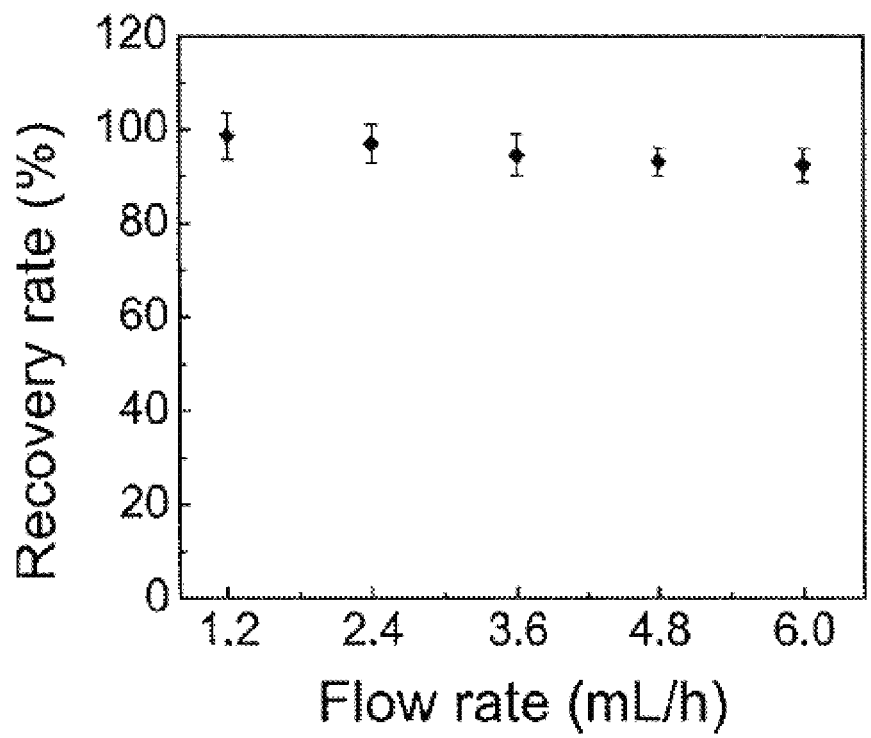
FIGS. 4A-4D show verification of FCS devices for high-throughput and high-recovery spiked cancer cells separation.
Figure 4B:
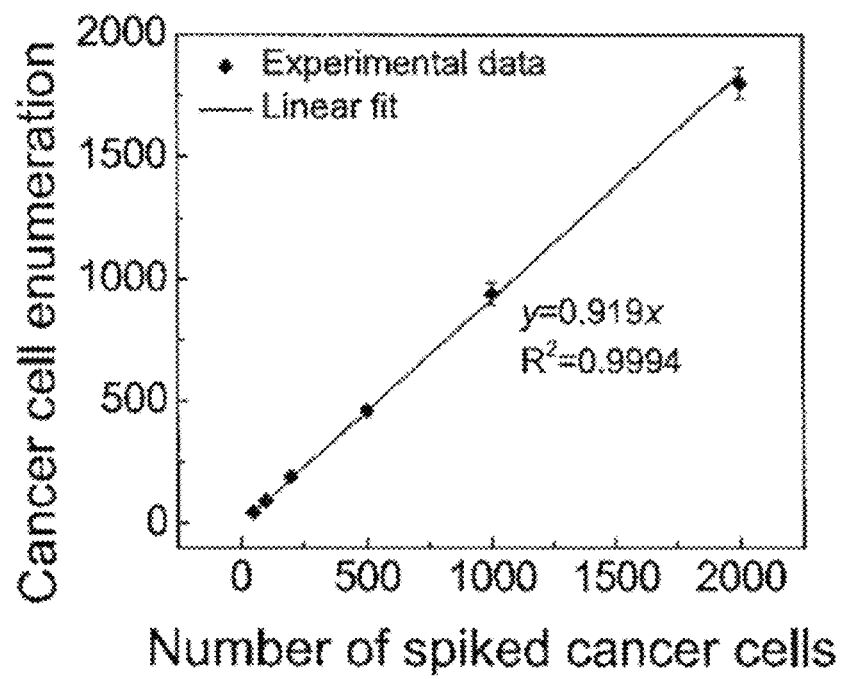
Figure 4C:
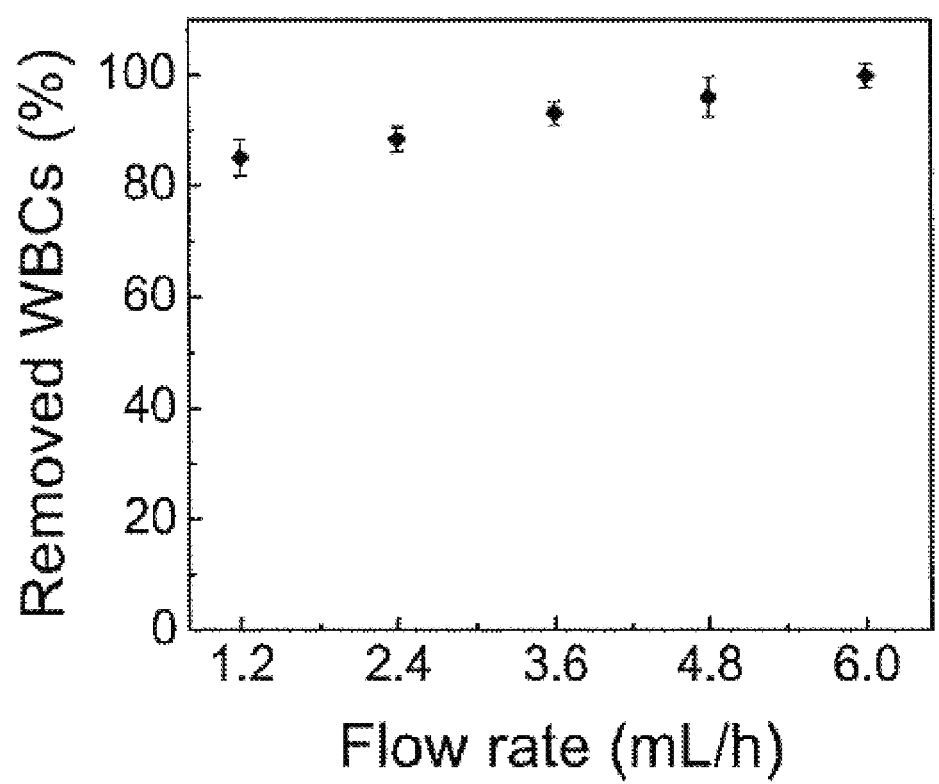

FIG. 4A shows the relationship between cancer cell recovery rates and flow rates for H1299 cancer cells. As flow rates increased from 1.2 mL h$^{-1}$ to 6 mL h$^{-1}$, recovery rates decreased from 98.6±5.0% to 92.3±3.6%. An average recovery rate of 92.3% was achieved for current FCS devices with a throughput of 6 mL h$^{-1}$ when ~100 H1299 cancer cells were spiked into 1 mL of WBCs. To validate that the device has the potential to process clinically relevant blood samples, a series of spike-in experiments in which a certain number of H1299 cells (50, 100, 200, 500, 1000, and 2000) were spiked into 1 mL of WBCs. As shown in FIG. 4B, an average recovery rate of 91.9% was achieved in the FCS device for this particular lung cancer cell line. FIG. 4C shows the relationship between removal rates of WBCs and cell input flow rates. As the flow rate increased, more WBCs were removed during the separation process. For example, 99.92±2.2% of WBCs were removed at the flow rate of 6 mL h$^{-1}$ when ~100H1299 cancer cells were spiked into 1 mL of WBCs. The corresponding purity of separated cancer cells was 11.1%±1.2%. The purities of separated cancer cells in other spike-in experiments were 4.8%-67.4% (4.8±1.6%, 20.3±2.8%, 31.2±4.7%, 41.7±4.9%, and 67.4±3.3% when 50, 200, 500, 1000, and 2000 H1299 cancer cells were spiked into 1 mL of WBCs). The purity was defined as the number of identified cancer cells over the total number of cells from FCS device's collection outlets. As the number of spiked cells increased, the number of separated cancer cells also increased, which leaded to a higher purity value.

Figure 4D:
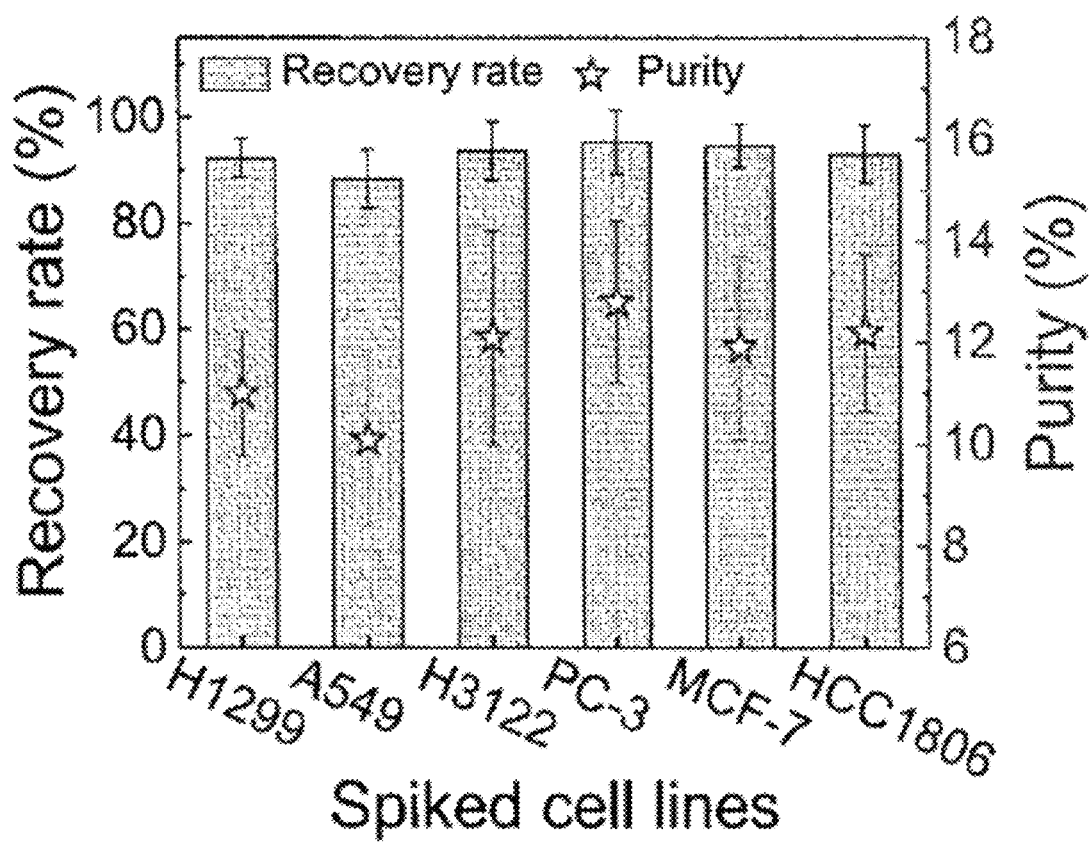

After successfully demonstrating low-concentration cancer cell separation using H1299 lung cancer cell line, we also characterized the FCS device with 5 other types of cancer cells lines. Size distribution of CTCs from clinical samples is unknown, it is therefore important to characterize the performance of FCS devices with cancer cell culture lines with different sizes. For this purpose, lung cancer, prostate cancer, and breast cancer cell culture lines were used to characterize the cancer cell recovery rates at 6 mL h$^{-1}$ throughput with ~100 cell mL$^{-1}$ spike ratio. As shown in FIG. 4D, the average recovery rates of 88.3±5.5%, 93.7±5.5%, 95.3±6.0%, 94.7±4.0%, and 93.0±5.3%, were achieved for A549 (lung cancer), H3122 (lung cancer), PC-3 (prostate cancer), MCF-7 (breast cancer), and HCC1806 (breast cancer) cell lines, respectively. The corresponding purities of separated cancer cells for each cell line were 10.1±1.7% (A549), 12.1±2.1% (H3122), 12.8±1.6% (PC-3), 11.9±1.8% (MCF-7), and 12.2±1.6% (HCC1806), confirming the robustness of the FCS device for cancer cell separation. The recovery rate increased as the mean cell size of cancer cells increased (Table 1), which was expected as FCS was based on size difference of cell types. In summary, we experimentally verified that the optimized FCS device was capable of separating cancer cells from WBCs with a flow rate of 6 mL with a cancer cell recovery rate of 92.9% and a separated cancer cell purity of 11.7% averaged from all 6 cancer cell lines at ~100 cell mL$^{-1}$ spike ratio, which allowed us to use the devices to process the clinical samples.

TABLE 1

Rare cell separation with spiked cancer cells from cultured cell lines. ~100 cancer cells were spiked into 1 mL of undiluted WBCs (3-7 × 10$^6$ cells mL$^{-1}$). The recovery rate was defined as the ratio of the number of identified cancer cells collected from collection outlets (outlets 5 and 6) over the total number of spiked cancer cells from all outlets. The purity was defined as the number of identified cancer cells over the total number of cells from FCS device's collection outlets. Waste outlets were outlet 1-4. Size of cells were measured and summarized in supplementary information (ESI, † FIG. S11). Data are expressed as mean ± standard deviation (s.d.), n = 3.

| Cancer cell line | Cancer cell type | Measured average cell diameter (μm) | No. of spiked cancer cells | No. of cells (collection outlets) | No. of cells (waste outlets) | Recovery rate | Purity |
| --- | --- | --- | --- | --- | --- | --- | --- |
| A549 | Lung | 15.5 | 99 ± 2 | 89 ± 4 | 10 ± 6 | 88.3 ± 5.5% | 10.1 ± 1.7% |
| H1299 | Lung | 16.9 | 99 ± 3 | 91 ± 1 | 8 ± 4 | 92.3 ± 3.6% | 11.1 ± 1.2% |
| HCC1806 | Breast | 17.6 | 100 ± 4 | 93 ± 4 | 7 ± 4 | 93.0 ± 5.3% | 12.2 ± 1.6% |
| H3122 | Lung | 17.8 | 101 ± 4 | 92 ± 6 | 9 ± 4 | 93.7 ± 5.5% | 12.1 ± 2.1% |
| MCF-7 | Breast | 18.7 | 100 ± 3 | 94 ± 3 | 6 ± 3 | 94.7 ± 4.0% | 11.9 ± 1.8% |
| PC-3 | Prostate | 18.9 | 100 ± 7 | 95 ± 7 | 5 ± 7 | 95.3 ± 6.0% | 12.8 ± 1.6% |

Effect of FCS on Cancer Cell Viability, Proliferation and Biomarker Expressions

Figure 5A:
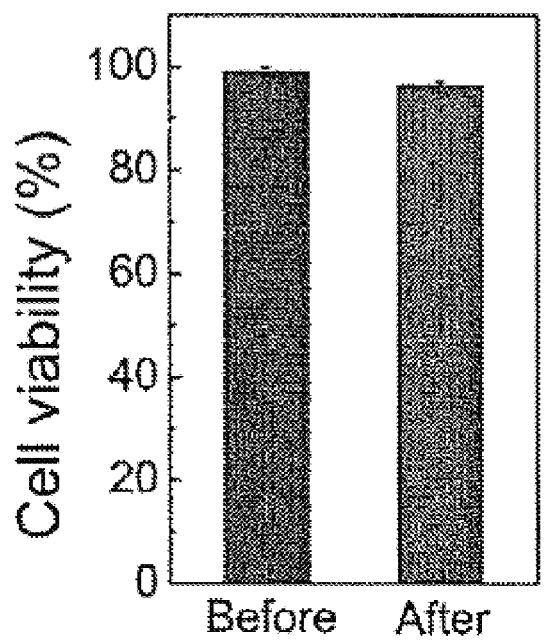
FIGS. 5A-5D show the effect of FCS on cancer cell viability, proliferation and biomarker expressions.
Figure 5B:
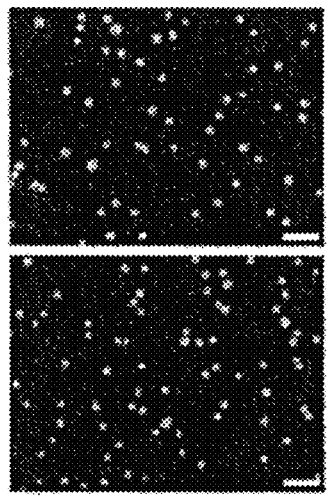

As discussed above, the operating parameters of the FCS device need to preserve cell integrity during its cell separation process. To investigate the impact of ferrofluids and current separation conditions on cell integrity, we examined short-term cell viability, long-term cell proliferation, as well as biomarker expression of cancer cells following the separation process. The short-term viability of cancer cells in ferro fluids was first evaluated by 3-(4,5-dimethylthiazol-2-yl)-2,5-diphenyl-tetrazolium bromide (MTT) assay for 12-h incubation with different concentrations of ferrofluids. The results show that H1299 lung cancer cells had a cell viability of 80.8±2.4% after 12-h incubation with 0.26% (v/v) ferrofluids as shown in ESI,† FIG. S7. Next, we investigated the short-term cell viability after ferrohydrodynamic cell separation using a Live/Dead assay. Cells in 1 mL of ferrofluids (1×10$_6$ H1299 cells) were processed by the FCS device at a flow rate of 6 mL h–1. The device-operating parameters were chosen to be the same as those used in aforementioned cancer cell separation experiments. After running the cell sample through the device, cancer cells collected from outlet 6 were stained with 2µM calcein-AM and 4 MM EthD-1 for 30 minutes at room temperature to determine their viability. Cells with a calcein–AM+/EthD–1–staining pattern were counted as live cells, whereas cells with calcein–AM–/EhD-1+staining patterns were counted as dead cells. Cell viability of H1299 cells before and after separation groups were determined to be 98.9±0.9% and 96.3±0.9%, respectively, indicating a very slight decrease in cell viability before and after the ferrohydrodynamic separation process. Representative fluorescence images of cells are shown in FIG. 5B.

Figure 5C:
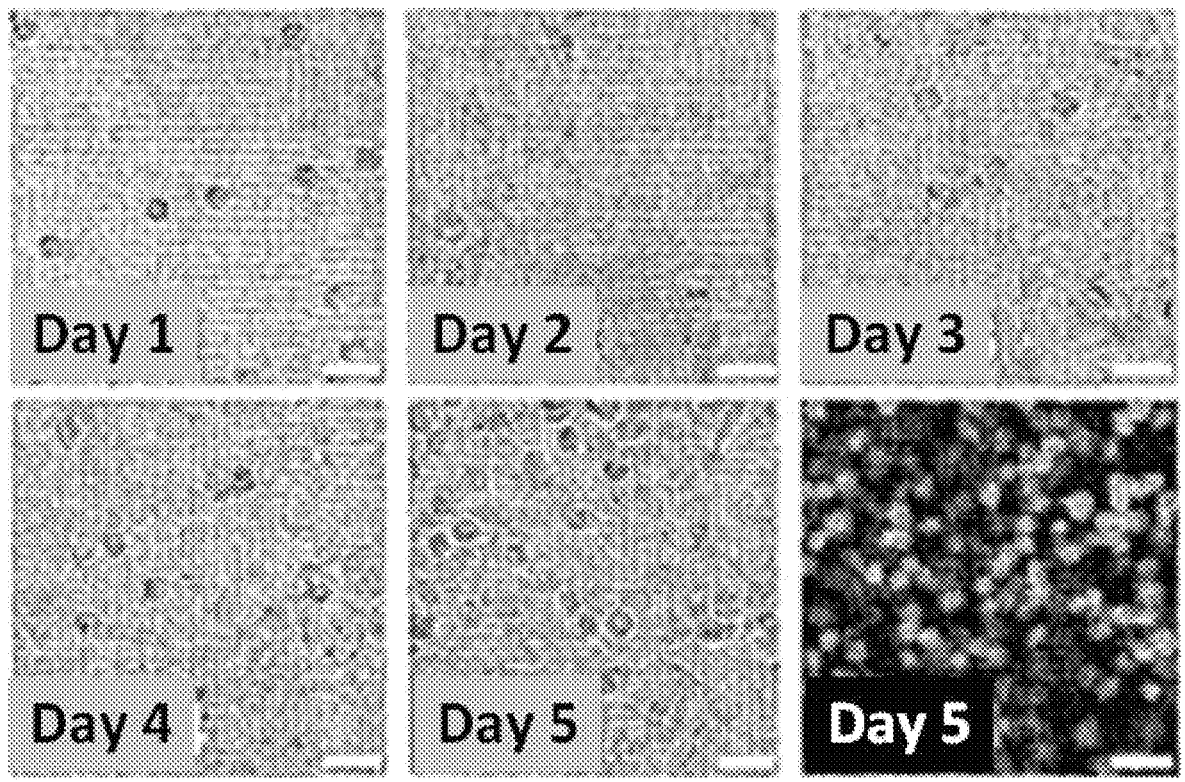

After determining short-term cell viability, we examined whether separated cancer cells continued to proliferate nonnally after the separation process. To simulate the actual separation conditions, $1 \times 10^6$ H1299 cells were spiked into 1 mL of ferrofluids and passed through the FCS device. The flow rate and ferrofluid concentration were chosen to be the same as those used in cancer cell separation experiments. Following cell collection, the recovered H1299 cells were washed with culture medium to remove maghemite nanoparticles and transferred to an incubator. Cells were cultured at 37° C. under a humidified atmosphere of 5% $CO_2$, FIG. 5C shows the images of the cultured H1299 cells over a 5-day period. These cells were able to proliferate to confluence and maintain their morphologies after the ferrohydrodynamic separation process. Fluorescence image in FIG. 5C also confirms that cells were viable after the 5-day culture.

Figure 5D:
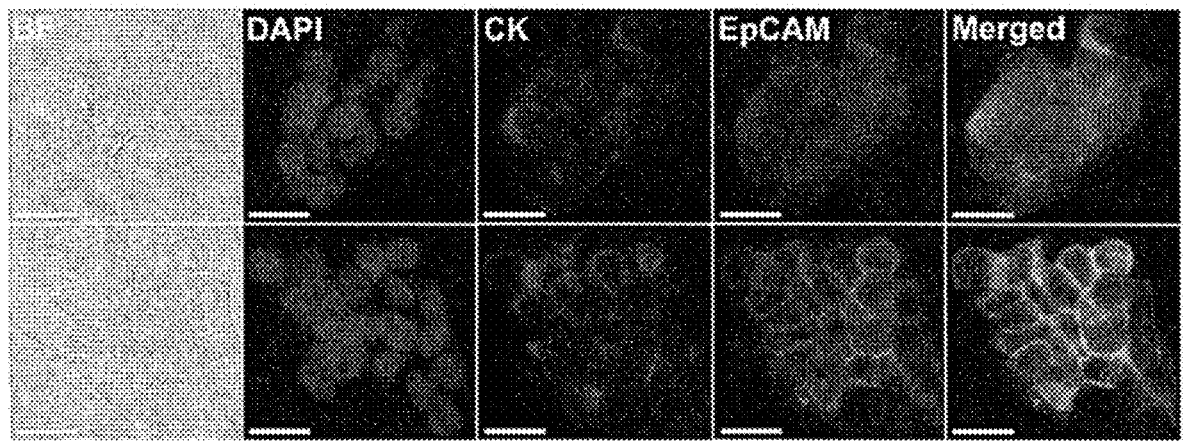

In order to determine whether the FCS process would alter the expression of cell surface biomarkers, we looked for changes in biomarker expression using immunofluorescence staining. Specifically, we compared expressions of epithelial cell adhesion molecule (EpCAM) and cytokeratin (CK), two key biomarkers in CTC studies, in paired sets of pre- and post-FCS process. Results shown in FIG. 5D indicate there was no visible change in either EpCAM or CK expression on HCC1806 breast cancer cells because of the FCS process. Collectively, the short-term viability, long-term cell proliferation and biomarker studies presented here demonstrated that the FCS method was biocompatible for cancer cell separation and could enable downstream characterization of separated CTCs.

Enrichment of CTCs from NSCLC Patient Blood Using FCS

Figure 6A:
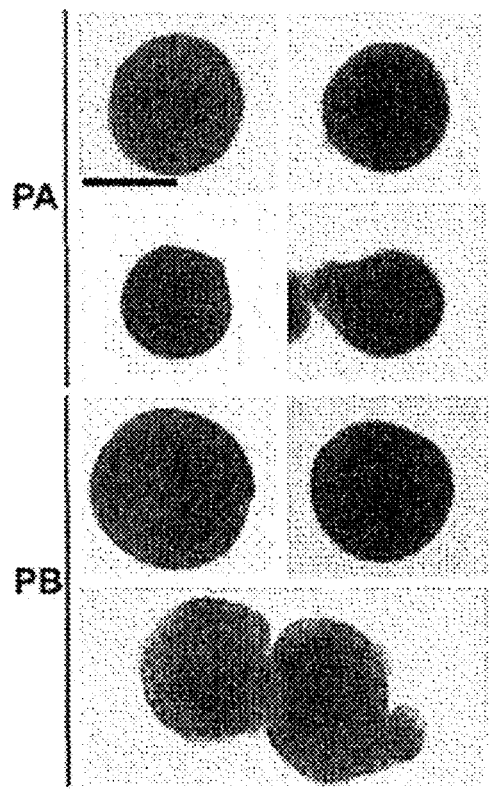
FIGS. 6A-6C show enrichment of OTCs from NSCLC patient blood using FOS devices, and CTC identification with cytopathology and immunofluorescent staining. CTCs (FIG. 6A) and WBCs (FIG. 6B) from the blood of two NSCLC patients (PA and PB) were enriched by FCS devices and stained with Papanicolaou procedure, then identified by a cytopathologist.
Figure 6B:
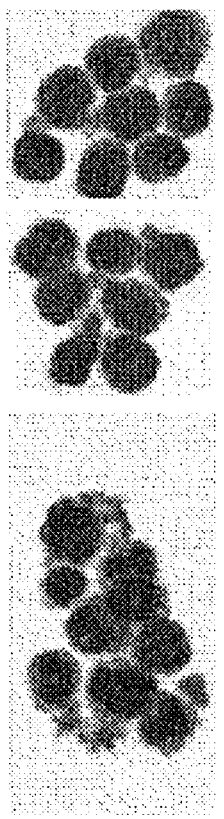
Figure 6C:
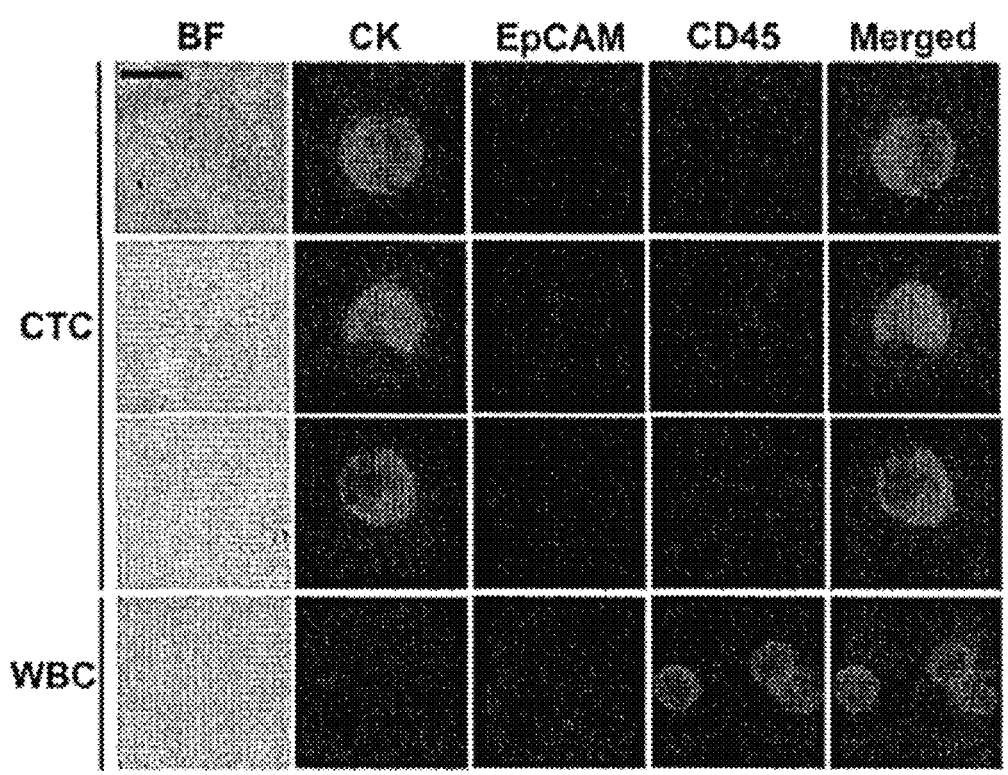

There was a large variance in repmied numbers of captured CTCs for advanced metastatic cancer patients. The exact reasons for this variance are still an area of active research. Nonetheless, most CTC separation methods chose to use blood from advanced metastatic patients for technology validation.III.Q, 20-25 22, J.Q As a clinical validation of this method, we validated FCS devices with blood samples obtained from two patients with advanced NSCLC. Peripheral blood was collected from patients with newly diagnosed NSCLC (stage IVB) before initiation of treatment. Blood was lysed to remove RBCs and then processed with FCS devices within 3 hours of blood draw. 6.5 mL of blood was processed from patient A, and 5.6 mL of blood was processed from patient B. After separation, cells from FCS device's outlet 6 were directly preserved in ThinPrep PreservCyt solution. These enriched cells were concentrated and stained using the Pap stain, which was commonly used for cytopathology analysis of clinical samples. Enriched cells were then inspected by a cytopathologist and CTCs were enumerated. Criteria used to identify CTC were as follows: (1) large cells with high nuclear to cytoplasmic ratio; (2) cells with irregular chromatin distribution and nuclear contours; (3) cells that are 4-5 times the size of a WBC. FIG. 6A shows a few Pap-stained CTCs and WBCs separated from two NSCLC patients. Both patients showed high CTC counts through cytopathology: 1165 and 369 CTCs were identified from 6.5 and 5.6 mL of blood samples, respectively. Purity of CTCs (defined as the number of identified CTCs over the total number of cells from FCS device's collection outlets) from these two patients was 17.0±7.8%. Additionally, Immunofluorescent staining of CKS/18/19, EpCAM, and leukocyte marker CD45 was also used to confirm the presence CTCs separated from patient B's blood. Cells were identified as CTCs if the staining pattern is CK+/CD45− or EpCAM+/CD45− or CK+!EpCAM+/CD45−, otherwise, cells were identified as WBCs. Typical fluorescent images are shown in FIG. 6B based on this immunostaining detection criteria.

Discussion

In this paper, we developed a ferrohydrodynamic cell separation (FCS) method for CTC separation and its devices that were capable of high-throughput (6 mL h−1), high recovery rate (92.9%, an average from 6 cancer cell lines at ~100 cell mL−1 spike ratio) and biocompatible enrichment of cancer cells from RBC-lysed blood with an average 11.7% purity, by systematically investigating the device operating parameters on its separation performance. The FCS process involved multiple parameters that could affect the cell separation performance, including cell flow rates, magnetic fields and its gradient, ferrofluid concentrations and compositions. All of these parameters were highly coupled with each other and required an effective model for device optimization. We have developed and validated such an analytical model that considered magnetic buoyancy force, hydrodynamic drag force, laminar flow profiles and cancer/blood cell physical properties to guide the optimization and design of a high-throughput, high recovery rate FCS devices. We also considered the chemical makeup of the ferrofluids, including its nanoparticle concentration, pH value, nanoparticle size and surfactant, tonicity to optimize a colloidally stable and biocompatible ferrofluid suitable for cancer cell separation. After systematic optimization, we demonstrated that FCS devices were capable of separating various types of low-concentration cancer cells of cultured cell lines (~100 cell mL−1) from WBCs under a flow rate of 6 mL h−1. The recovery rates of spiked cancer cells were on average 92.9% from all tested cell lines at clinically relevant CTC occurrence rates. The recovered cancer cells were viable, could proliferate to confluence and expressions of a few key biomarker remained unaffected. These results indicated the practical use of this method in separating CTCs from patient blood were feasible. We further demonstrated FCS devices worked well with clinical samples by successfully separating and identifying CTCs from blood samples of two late-stage (IVB) non-small cell lung cancer patients.

While current FCS devices demonstrated a high-recovery and biocompatible separation of rare cancer cells at a clinically relevant throughput, and was validated with NSCLC patient blood, it was still at its early stage of development and could benefit from further system optimization or integration with other methods in order to achieve high-throughput, high-recovery, high-purity separation of intact CTCs. When comparing FCS performance to other size-based label-free CTC separation methods, its rate of recovery of cancer cells was higher than the current average reported value of 82%, including methods based on standing surface acoustic wave (>83%), dean flow (>85%), vortex technology (up to 83%), and deterministic lateral displacement (>85%). Although the throughput of current FCS device (6 mL h$^{-1}$) was sufficiently high to process clinically relevant amount of blood, it was slower than a few hydrodynamics-based methods that had extremely high flow rates, including the dean flow (56.25 mL h$^{-1}$) the vortex technology (48 mL h$^-$) and DLD (10 mL min$^{-1}$). Further system optimization, scale-up or multiplexing of FOS devices should be conducted in order to process more blood quickly. The average purity of separated cancer cells in current FCS devices was 11.7%. Reported purity values varied dramatically from 0.1% to 90% in label-free methods, 1625 as most of them focused on improving recovery instead of purification of rare cells. Nonetheless, hydrodynamics-based methods including the dean flow (50%) and the vortex technology (57-94%) reported significantly higher purity of cancer cells in their collection outputs than FCS. Low cancer cell purity due to WBC or other cell contamination could interfere with subsequent ere characterization. It is therefore necessary for future FCS devices to further deplete these contamination cells.

FCS currently distinguished cells primarily based on their size difference. For cancer cells that have similar size as WBC's, this method will result in lower separated cancer cell purity than label-based method. Additional cell characteristics or methods could be integrated with FCS to further improve the purity of separated cancer cells. One possible strategy is for future FCS devices to exploit both size and magnetic labels of cells for ere separation. 22 For example, WBC's in blood can be labeled with sufficient number of anti-CD45 magnetic beads so that the overall magnetization of the WBC-bead complex is larger than its surrounding ferrofluids. The direction of magnetic force on the complex is then pointing towards magnetic field maxima. On the other hand, magnetization of the non-labeled CTCs is zero and less than its surrounding ferrofluids, the direction of magnetic force on CTCs is therefore pointing towards magnetic field minima. In this scenario, both label-based magnetophoresis and size-based FCS coexist in one system, i.e magnetic force will attract WBC-bead complex towards field maxima while pushes CTCs towards field minima.

Example 2: iFCS Technology and Device (Medium Magnetic Field Gradient, One-Stage, Sheath-Free)

Circulating tumor cells (CTCs) contains abundant information regarding the location, type and stage of cancer and have significant implications in both diagnostic target and guiding personalized treatment. The traditional isolation technologies rely on the properties of CTCs such as antigens (e.g., epithelial cell adhesion molecule or EpCAM) or size to separate them from blood. Integrated—ferrohydrodynamic cell separation (iFCS), a size-independent and marker-independent method, can isolate cancer cells with large size distribution in biocompatible ferrofluids with a throughput 6 mL h$^{-1}$, an average recovery rate of 97.9%, and an 99.95% WBC depletion. We performed systematic parametric studies of key factors influencing the performance of iFCS and determined parameters for high-throughput, high recovery rate and high purity CTC separation. We then tested and validated the performance of the method with cancer cells from 8 cultured cancer cell lines and 3 different types of cancer. The mean recovery rate of non-small cancer cells from RBC-lysed blood using this technology was 98.7%.

This method was also validated with small lung cancer cells and the mean recovery rate was 95.5%.

Integrated Ferrohydrodynamic Cell Separation (iFCS) Working Principle

Figures 7A, 7B, 7C, 7D, 7E, 7F:
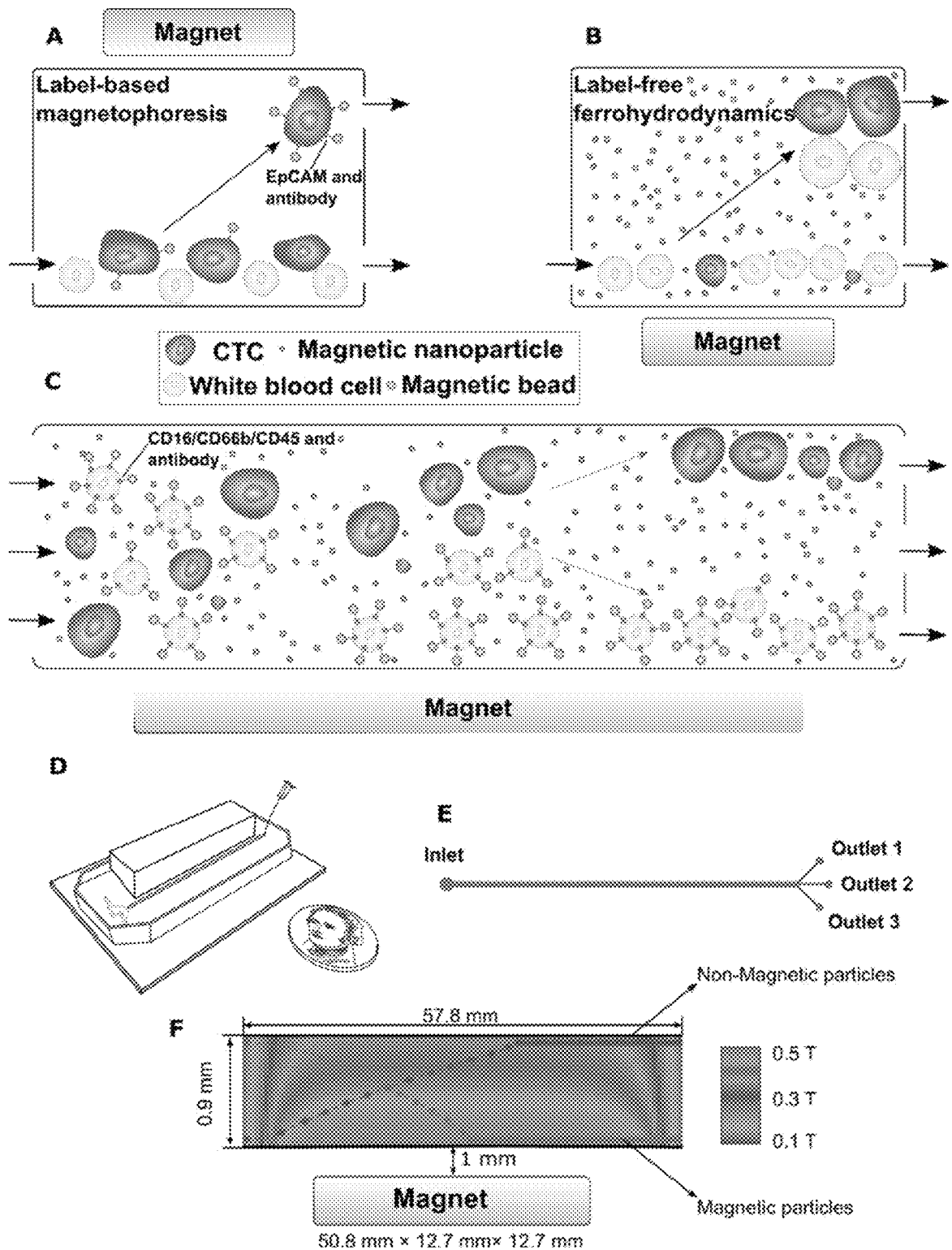
FIG. 7A is a schematic illustration of traditional label-based magnetophoresis for CTC separation, in which rare cells were targeted via specific biomarkers such as epithelial cell adhesion molecule (EpCAM) through functionalized magnetic particles in order to pull these cells through magnetic force towards magnetic field maxima in a continuous-flow manner.
FIG. 7B is a schematic illustration of label-free ferrohydrodynamic cell separation (FCS) for CTCs. Large rare cells in ferrofluid experience large magnetic buoyance force and will be pushed towards magnetic field minimum
FIG. 7C is a schematic of integrated ferrohydrodynamic cell separation (iFCS) for CTC separation. In iFCS, RBC-lysed blood and biocompatible ferrofluid were processed in a single straight channel. CTCs of different size and labelled WBCs were pushed toward two different directions, resulting in a spatial separation at the end of the iFCS device.
FIG. 7D is a photograph of a prototype iFCS device filled with dye and a permanent magnet.
FIG. 7E is a top-view of the iFCS device with labels of inlets, outlets.
FIG. 7F is a simulation of magnetic flux density and particle trajectories of magnetic particles and non-magnetic particles in channel (L×W×H, 57.80 mm×0.90 mm×0.15 mm).

In the case of label-based magnetophoresis (FIG. 7A), magnetization of the particles $\vec{M}_p$ is larger than the surrounding fluid medium $\vec{M}_f$, therefore the magnetic force will point toward magnetic field maxima (FIG. 7A). On the other hand, for label-free negative magnetophoresis, magnetization of the diamagnetic particles $\vec{M}_p$ s smaller than the surrounding ferrofluid medium $\vec{M}_f$, therefore the magnetic force will point toward magnetic field minima (FIG. 7B). Integrated ferrohydrodynamic cell separation (iFCS) scheme integrates both label-based magnetophoresis and label-free negative magnetophoresis in a single device (FIGS. 7D and 7E) under non-uniform magnetic field. Particles and/or cells of magnetization larger than surrounding medium and smaller than surrounding medium will move in different direction in the device, as shown in FIGS. 7C and 7F, resulting in separation of particles and/or cells based on their relative magnetization to the fluid medium.

Simulation and Calibration with Microbeads

In order to test the validity of working principle, we compared simulated trajectories of microbeads with experimental ones that were obtained from imaging 15.0-μm-diameter non-magnetic beads (NMB) and 11.8-μm-diameter magnetic beads (MB) in an iFCS device. From the trajectories, we calculated the deflection in the y-direction, denoted as Y, and separation distance between the two types of beads, denoted as ΔY. The simulation results were carried out using different parameters including throughput (10-600 μL min$^{-1}$), ferrofluid concentration (0-1.0%, v/v) and magnetic field gradient (20-280 T m$^{-1}$). The goal here was to optimize the separation of non-magnetic beads from magnetic beads, which translated to maximizing both Y and ΔY simultaneously. Experimental conditions for calibration were the same as those in simulation. We extracted Y and ΔY at the end of the channel and used them to compare simulation and experimental results.

Figure 8A:
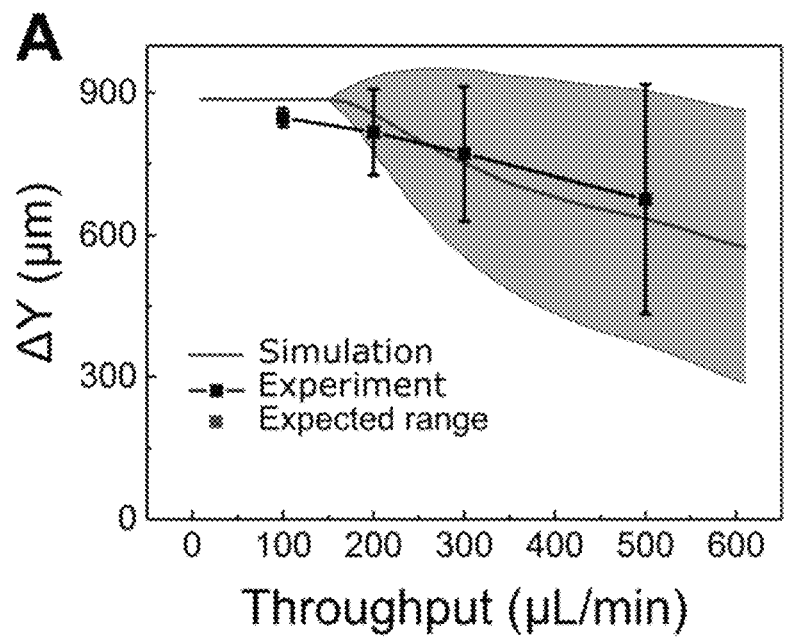
FIGS. 8A-8I show optimization of iFCS device via simulation and beads calibration. A 3D model was developed to simulate particle trajectories and validated by comparing simulation and experimental results. Numerical optimization of final position Y, separation distance ΔY, and the expected range (standard deviation) at the end of the channel was conducted with different parameters.
Figure 8B:
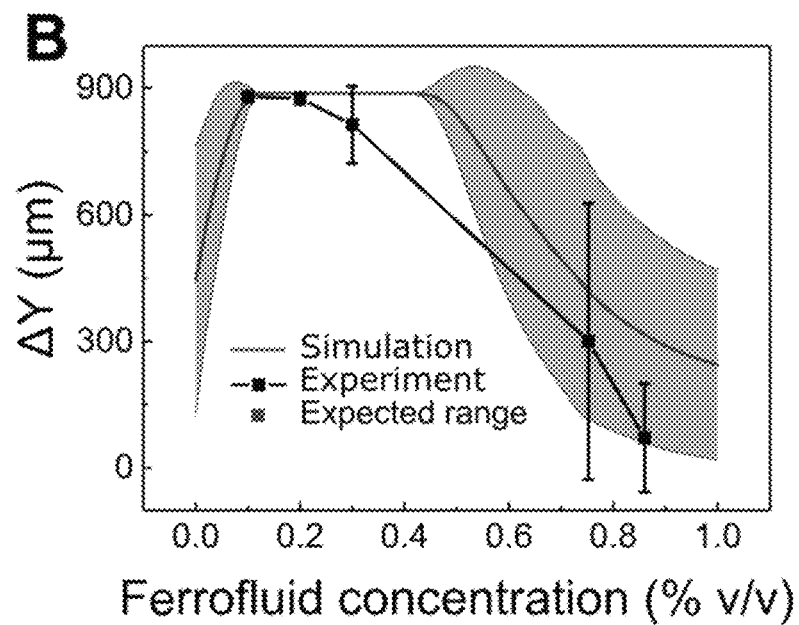
Figure 8C:
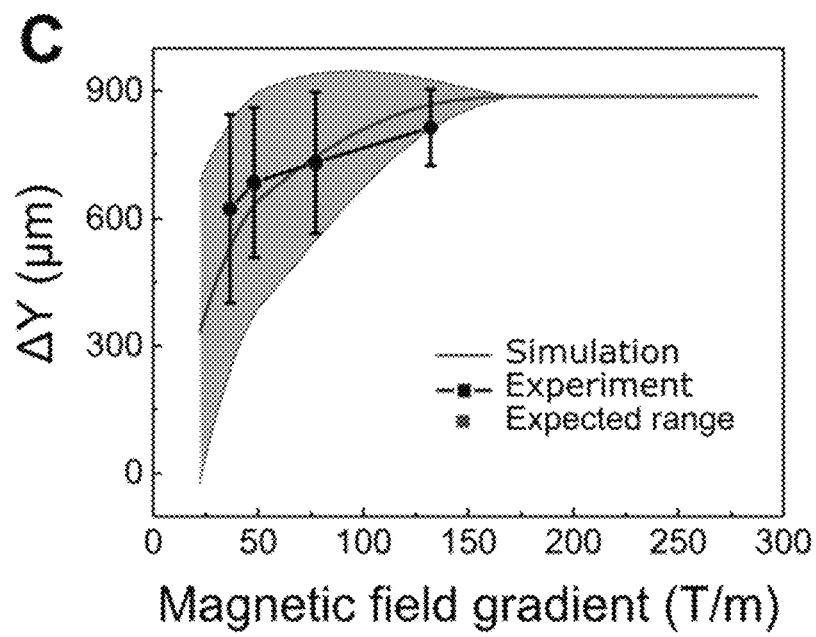
Figure 8D:
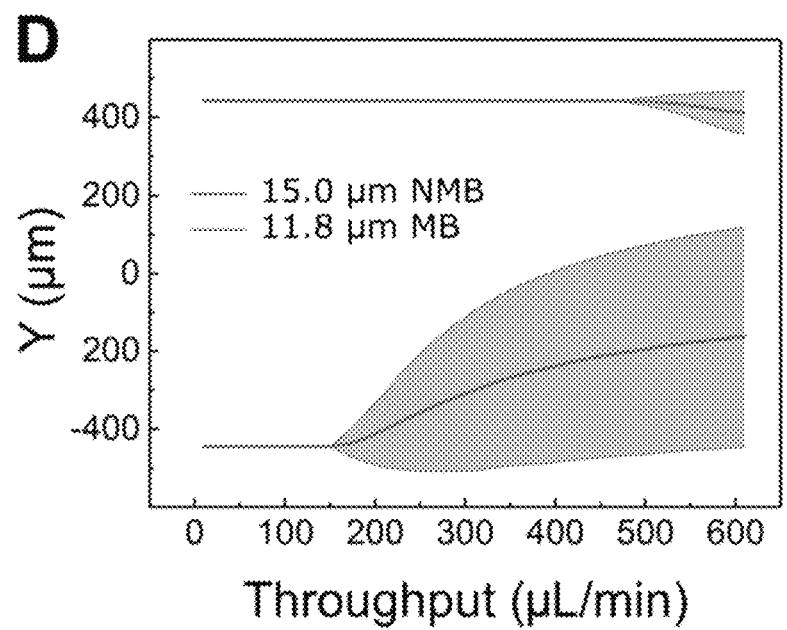
Figure 8E:
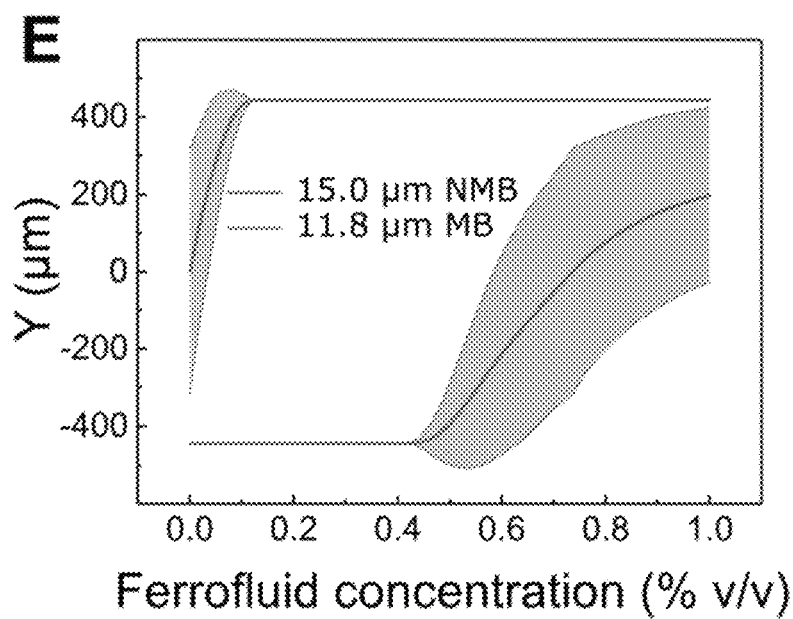
Figure 8F:
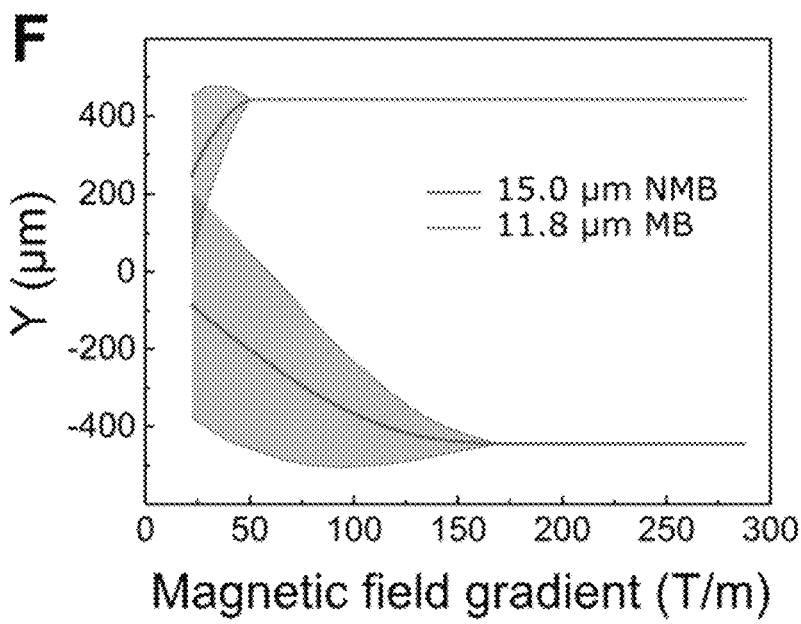
Figure 8G:
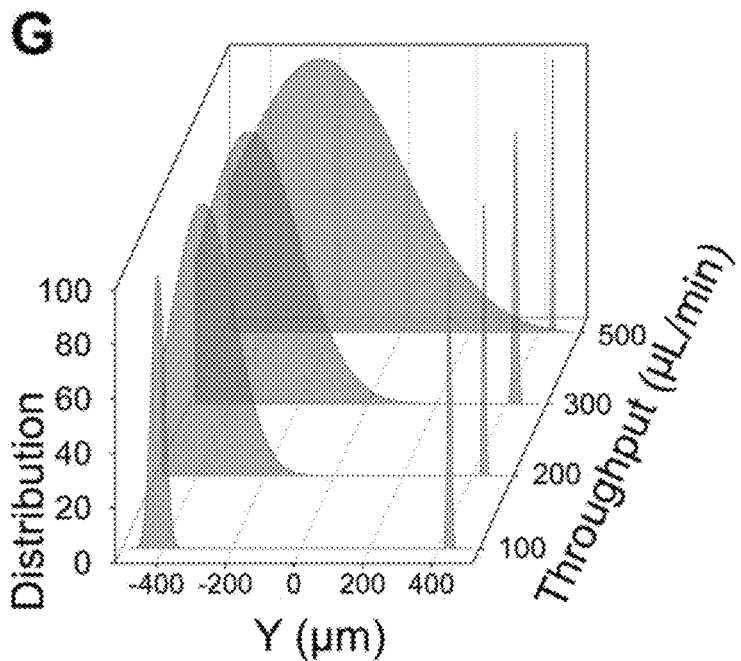
Figure 8H:
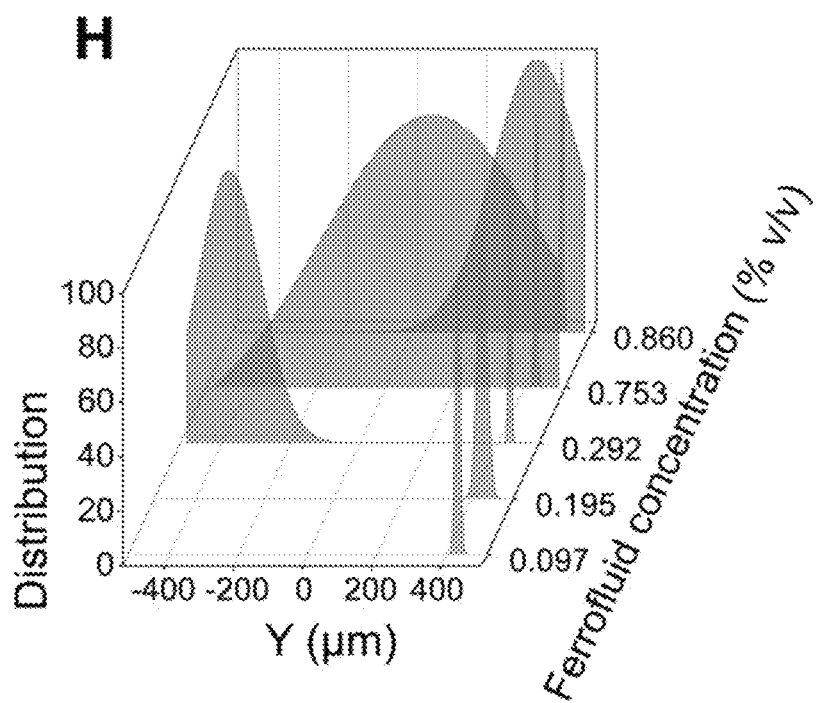
Figure 8I:
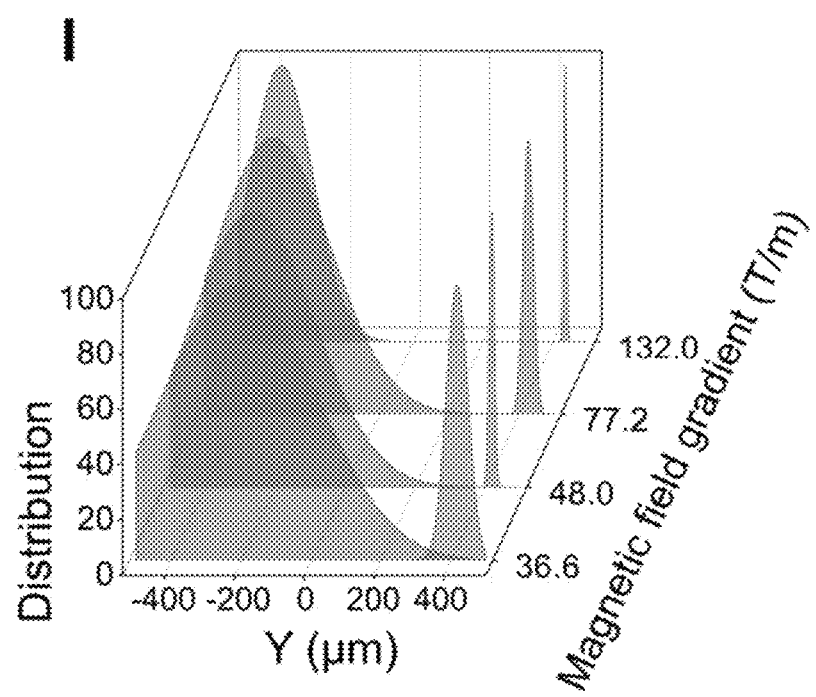

We first optimized the throughput of the device. Both simulation and experimental results (FIG. 8A) showed a monotonically decreasing trend for ΔY as the throughput increased. Both simulation (FIG. 8D) and experimental results (FIG. 8G) indicated widely distributed trajectories for 11.8 μm magnetic bead, and completely deflected trajectories for 15.0 μm non-magnetic beads at high flow rate. The second parameter we optimized was ferrofluid concentration. In general, a higher ferrofluid concentration resulted large magnetic force on non-magnetic beads, leading to a larger deflection in the y-direction. However, the Y value of magnetic beads (magnetic content is 0.737% v/v in this case) decreased as ferrofluid concentration increased, and increased when the concentration was larger than 0.737% (FIGS. 8E and 8H), resulting a smaller separation distance ΔY (FIG. 8B). Its should be noted that a portion of magnetic beads were trapped at the bottom of channel when ferrofluid concentration was low. The last parameter that we chose to optimize was magnetic field gradient, whose value changed as we adjusted the distance between the magnet and the channel. FIGS. 8C and 8F showed that, in both simulation and calibration, when the magnetic field gradient increased, the overall deflection Y for both beads increased too. This is because the magnetic force on beads was determined in part by the gradient. The larger the field gradient, the larger the magnetic force. On the other hand, the separation distance decreased when the gradient was too weak to deflect beads. As a result, we chose a field gradient of 132 T m$^{-1}$ for following experiments.

Figures 9A, 9B, 9C, 9D, 9E, 9F:
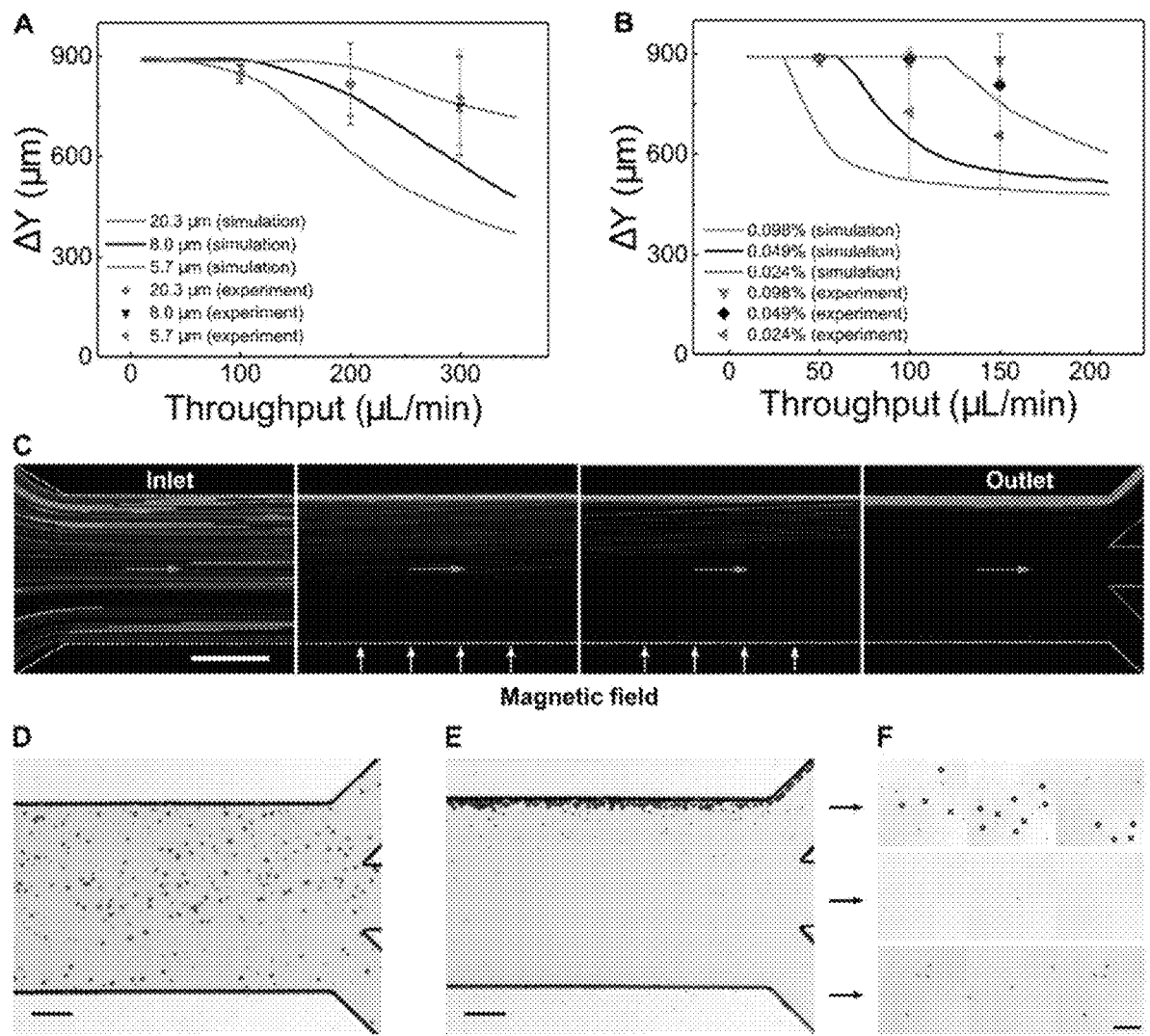
FIGS. 9A-9F demonstrate iFCS applied to multiple beads separation.

To achieve high throughput, recovery rate and purity, we chose a throughput of 100 μL min$^{-1}$, ferrofluid concentration of 0.049% (v/a) and magnetic field gradient of 132 T m$^{-1}$. With optimized parameters, we run a series of experiments with 20.3 and 8.0 μm (red fluorescent) non-magnetic beads and 11.8 μm (yellow fluorescent) magnetic beads. All the beads are randomly distributed near the inlet. Without magnetic field, there are no separation (FIG. 9D) and they start to deflect under the non-uniform magnetic field (FIG. 9E). Non-magnetic beads were collected from outlet 1, as shown in FIGS. 9C and 9E. on the other hand, magnetic beads were collected from outlet 2 and 3, as shown in FIG. 9F.

Figure 10A:
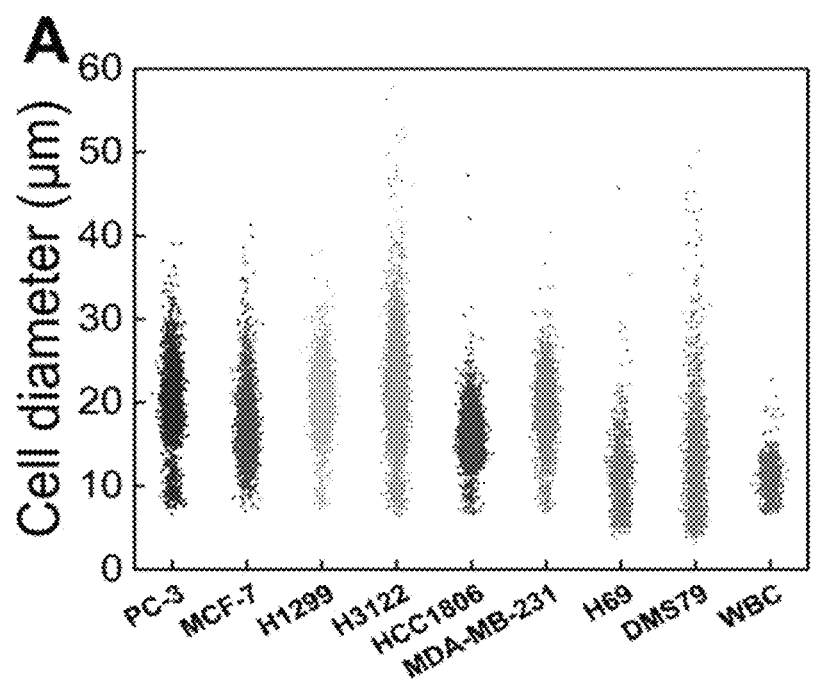
FIGS. 10A-10C demonstrate size of cancer cell lines and labelling results of WBCs.

Verification of iFCS for High-Throughput and High-Recovery Spiked Cancer Cells Separation In order to show the size-independent characteristic of iFCS device, we measured the size of cancer cell lines before separation. The size distributions of various cancer cell lines and white blood cells are presented in FIG. 10A. There is large size overlap between cancer cell lines and white blood cells (WBCs), which was the main challenge in existing label-free cancer cell separation methods. For example, the minimum size of PC-3 cell line was measured to be around 8 μm. This makes it challenging to enrich small PC-3 cancer cells from WBCs, because they have overlapping sizes (FIG. 10A).

Figure 10B:
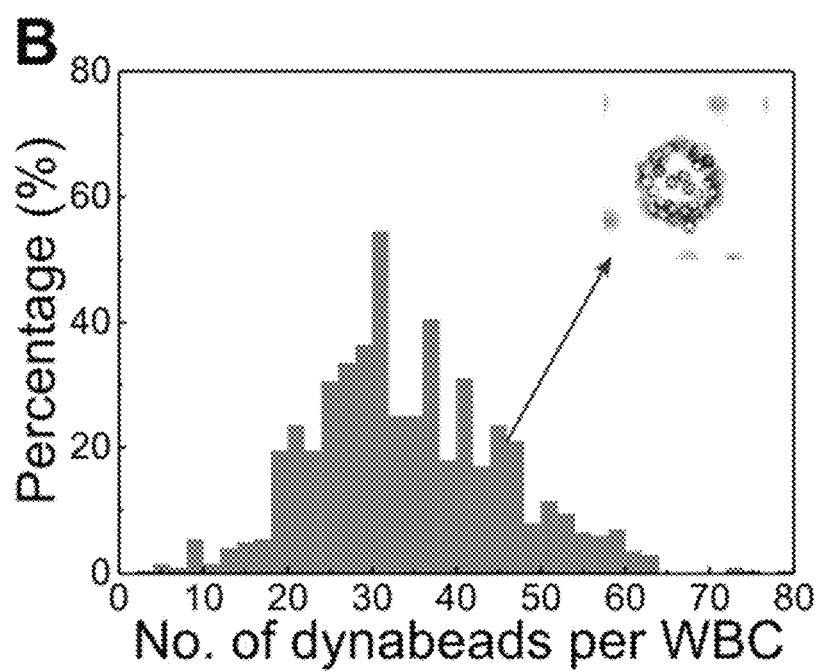
Figure 10C:
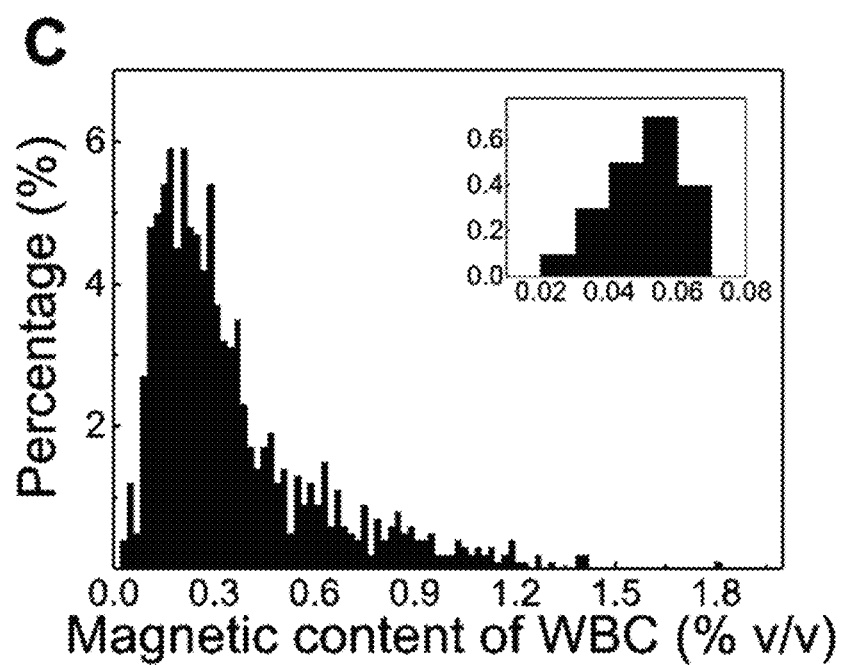

In addition, we measured the number of dynabeads on each labeled WBC (n=1000). Human whole blood was obtained from healthy donors according to a protocol approved by Institutional Review Board (IRB) at University of Georgia. Calculated the amount of biotinylated antibody and magnetic beads required based on the WBC count. Used 100 fg/WBC for anti-CD45, anti-CD16 (BioLegend, San Diego, Calif.), and anti-CD66b (Life Technologies, Carlsbad, Calif.). Each WBC were labeled with 125 magnetic beads (Dynabeads Myone streptavidin T1, Life Technologies, Carlsbad, Calif.). Dynabeads were washed twice with 0.01% TWEED 20 in PBS, then washed with 0.1% BSA in PBS and resuspended in PBS. The whole blood was firstly labeled with antibodies for 30 min and lysed by RBC lysis buffer (eBioscience, San Diego, Calif.) for 7 min at room temperature. Cell mixtures were centrifuged for 5 min at 800×g and the pellet were suspended in PBS with Dynabeads. Incubate the tube for 25 min on the rocker. Added ferrofluid and 0.1% (v/v) Pluronic F-68 non-ionic surfactant (Thermo Fisher Scientific, Waltham, Mass.) to achieve the same volume with whole blood and keep mixing for 5 more minutes. The number of dynabeads on each WBC were counted with microscope and the average was 34±11 dynabeads per WBC (FIG. 10B). The magnetic content in dynabeads was 11.5% (v/v). Based on the size of WBCs and the number of labeled dynabeads, we calculated the magnetic content in each WBC (FIG. 10C), About 99.5% of WBCs had magnetic content larger than 0.05% (v/v). Under optimized experimental conditions (throughput=100 μL min$^{-1}$, ferrofluid concentration=0.049%, and field gradient=132 T m$^{-1}$), we collected about 99 spiked cancer cells and remove >99.5% WBCs.

Figures 11A, 11B, 11C, 11D, 11E, 11F:
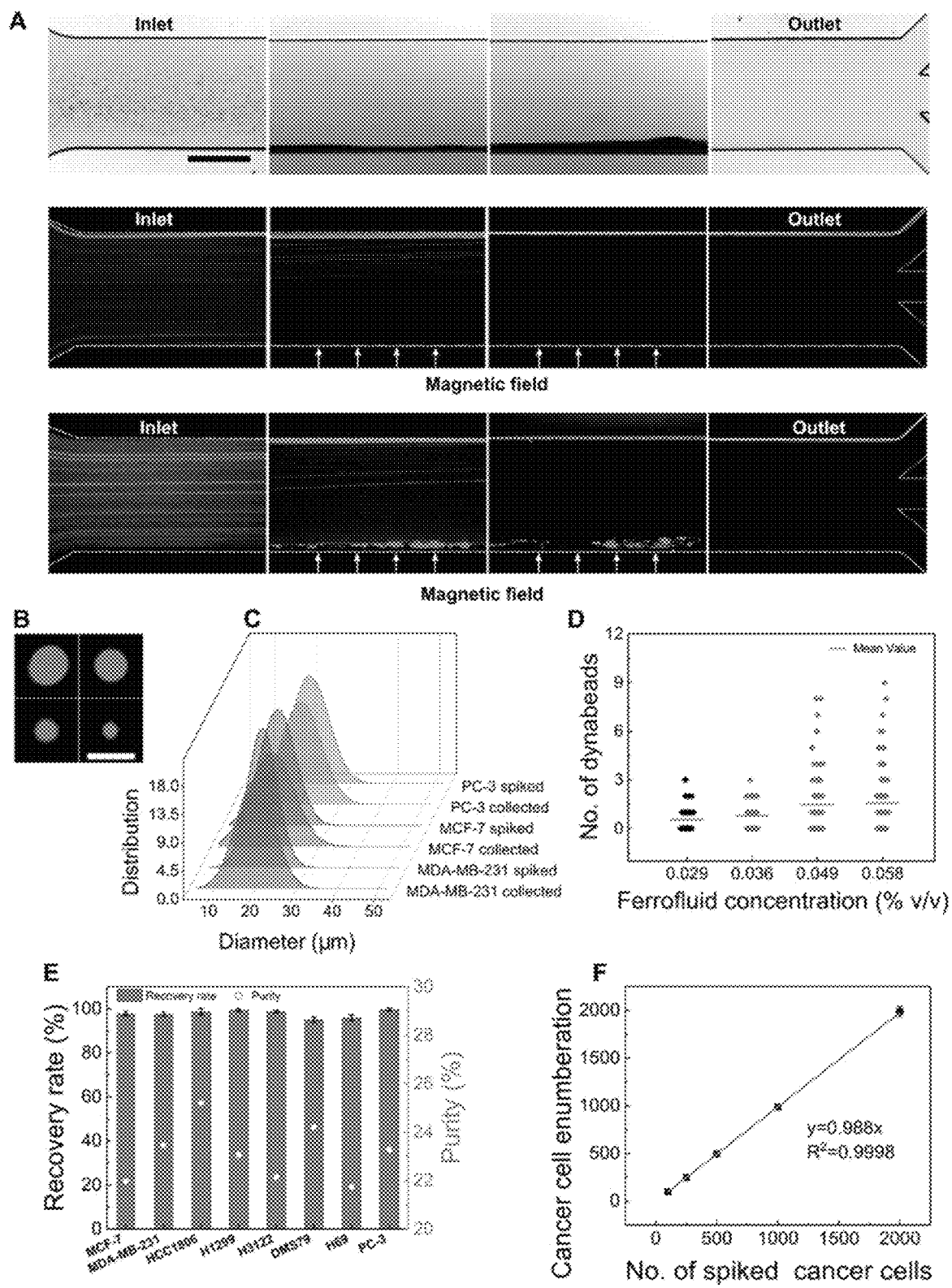
FIGS. 11A-11F show iFCS applied to cancer cells separation. Certain number of PC-3 prostate cancer cells and 1×10$^6$ WBCs were spiked into 1 mL ferrofluid with concentration of 0.049% (v/v). The cell mixture was processed at the flow rate of 100 μL mind; the magnetic field gradient was fixed at 132 T (FIG. 11A) Bright field and fluorescent images of 1×10$^5$ PC-3 cancer cells and WBCs separation process. Green signal comes from PC-3 cancer cells and red signal comes from WBCs Scale bar: 500 μm.

We performed a series of experiments with spiked cancer cells of cultured cell lines and WBCs based on optimal parameters. We first studied the performance of iFCS using spiked PC-3 prostate cancers in WBCs. The concentration of DAPI stained WBCs, labeled with dynabeads, was 1×10$^6$ cells mL$^{-1}$; CTCs were simulated by spiking ~1×10$^4$ Cell-Tracker Green stained PC-3 cancer cells into 1 mL of WBCs. FIG. 11A indicated that all the cells were randomly distributed at the inlet of the device, then started to deflect when they entered the magnetic field region and were completely separated at the outlets. PC-3 cells collected from collection outlet had polydisperse sizes, as shown in FIG. 11B. To future validate the size-independent characteristics of iFCS, we repeated the experiments with MCF-7 and MDA-MB-231 cancer cells under the same conditions. The size distributions of each cell line were extremely similar before and after iFCS processing (FIG. 11C, Table 2). WBCs collected from collection outlet were also identified by counting the number of dynabeads on their surface (FIG. 11D). The average number of dynabeads per WBC increased as the ferrofluid concentration increased.

TABLE 2

Statistics about spiked and collected cancer cells under optimized experimental conditions.

| Cancer cell line | Minimum diameter (spiked, μm) | Minimum cell diameter (collected, μm) | average diameter (spiked, μm) | average diameter (collected, μm) |
| --- | --- | --- | --- | --- |
| MCF-7 | 7.0 | 6.6 | 17.5 ± 4.3 | 18.8 ± 5.3 |
| MDA-MB-231 | 7.0 | 7.0 | 19.1 ± 3.6 | 19.9 ± 4.6 |
| PC-3 | 8.1 | 6.6 | 19.9 ± 4.6 | 20.4 ± 4.9 |

We characterized the iFCS device with 6 types of cancer cells under optimized conditions with ~100 cell mL$^{-1}$ spike ratio. As shown in FIG. 11E and Table 3, the average recovery rates of 97.9±1.0%, 97.6±1.0%, 98.8±1.4%, 99.4±0.6%, 98.7±0.6%, and 99.7±0.6% were achieved for MCF-7, MDA-MB-231, HCC1806, H1299, H3122 and, PC-3 cell lines, respectively. The corresponding purities of separated cancer cells for each cell line were 22.0±1.3% (MCF-7), 23.5±0.7% (MDA-MB-231), 25.2±1.5% (HCC1806), 23.1±0.9% (H1299), 22.2±0.9 (H3122), and 23.3±0.4 (PC-3), confirming the robustness of the iFCS device for cancer cell separation. We further validated the device with small lung cancer cells. The average recovery rates of 95.0±1.2% and 95.9±1.3% were achieved for DMS79 and H69 cell lines, respectively. A series of spike-in experiment, in which a certain number PC-3 cells (100, 250, 500, 1000, 2000) and 1 million WBCs were spiked into 1 mL ferrofluid, were carried out to validate that the device has the potential to process clinically relevant blood samples (FIG. 11F). An average recovery rate of 98.8% was achieved in the iFCS for this particular prostate cancer cell line.

TABLE 3

Cancer cell separation under optimized conditions. ~100 cancer cells and $1 \times 10^6$ WBCs were spiked into 1 mL of ferrofluid with concentration of 0.049% (v/v). The recovery rate was defined as the ratio of the number of cancer cells collected from outlet 1 over the total number of spiked cancer cells from all outlets. The purity was defined as the number of identified cancer cells over the total number of cells (WBCs + cancer cells) from outlet 1. Data are expressed as mean ± standard deviation (s.d.), n = 3.

| Cancer cell line | Cancer cell type | Measured minimum diameter (μm) | Measured Average diameter (μm) | No. of spiked cancer cells | No. of cancer cells (outlet 1) | No. of cells (outlet 2 & 3) | Recovery rate | No. of WBCs | Purity |
|---|---|---|---|---|---|---|---|---|---|
| MCF-7 | Breast | 7.0 | 17.5 | 110 ± 9 | 108 ± 8 | 2 ± 1 | 97.9 ± 1.0 | 384 ± 2 | 22.0 ± 1.3 |
| MDA-MB-231 | Breast | 7.0 | 19.1 | 110 ± 7 | 108 ± 7 | 3 ± 1 | 97.6 ± 1.0 | 354 ± 6 | 23.5 ± 0.7 |
| HCC1806 | Breast | 6.7 | 15.4 | 109 ± 4 | 108 ± 5 | 1 ± 2 | 98.8 ± 1.4 | 324 ± 6 | 25.2 ± 1.5 |
| H1299 | Lung | 7.2 | 20.4 | 101 ± 4 | 100 ± 3 | 1 ± 1 | 99.4 ± 0.6 | 336 ± 4 | 23.1 ± 0.9 |
| H3122 | Lung | 6.7 | 17.7 | 104 ± 3 | 103 ± 3 | 1 ± 1 | 98.7 ± 0.6 | 360 ± 2 | 22.2 ± 0.9 |
| DMS79 | Lung | 3.2 | 12.8 | 118 ± 12 | 112 ± 10 | 6 ± 2 | 95.0 ± 1.2 | 350 ± 4 | 24.2 ± 1.7 |
| H69 | Lung | 4.0 | 11.2 | 106 ± 4 | 102 ± 4 | 4 ± 1 | 95.9 ± 1.3 | 366 ± 7 | 21.7 ± 0.8 |
| PC-3 | Prostate | 8.1 | 19.4 | 99 ± 3 | 99 ± 3 | 0 ± 1 | 99.7 ± 0.6 | 324 ± 1 | 23.3 ± 0.4 |

Example 3: iFCS Technology and Device (High Magnetic Field Gradient, Multiple-Stage, Sheath-Flow)

Figures 12A, 12B, 12C:
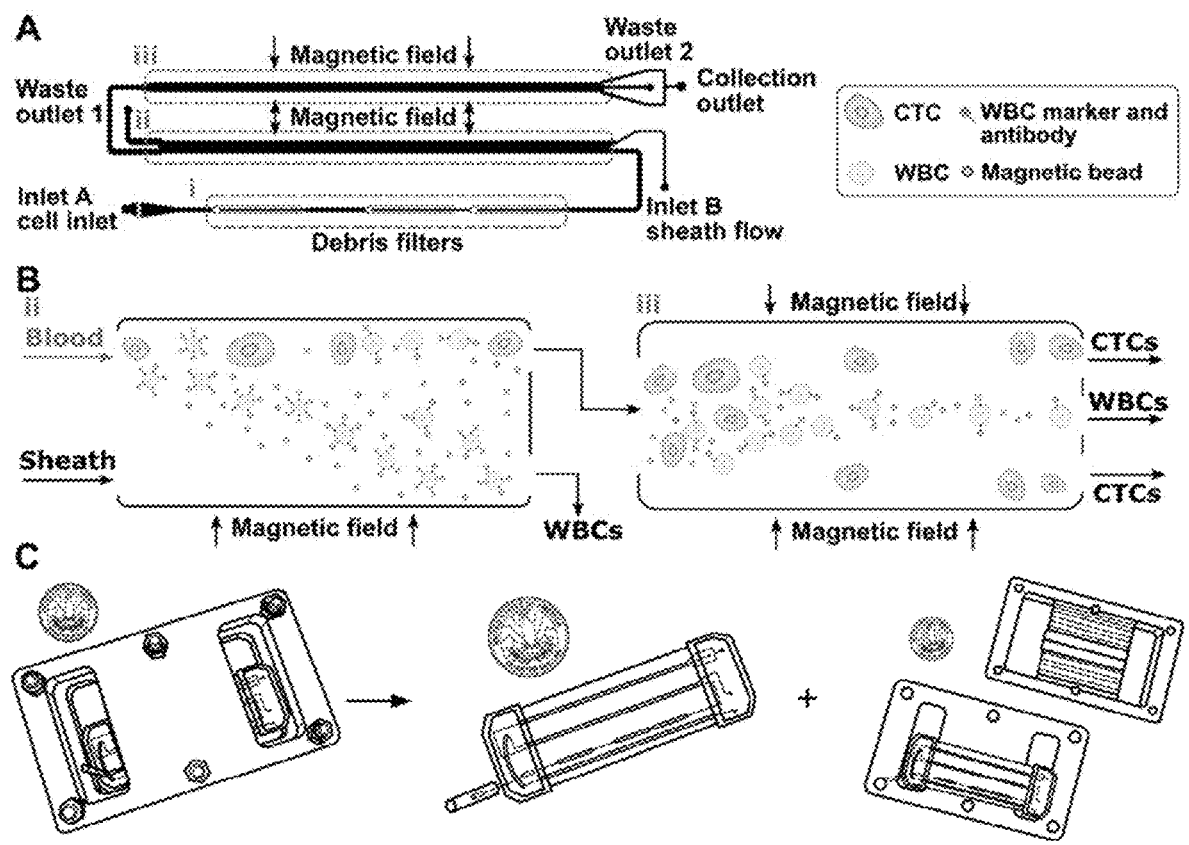
FIGS. 12A-12C: FCSv2 device design and operating principle.
Figure 13:
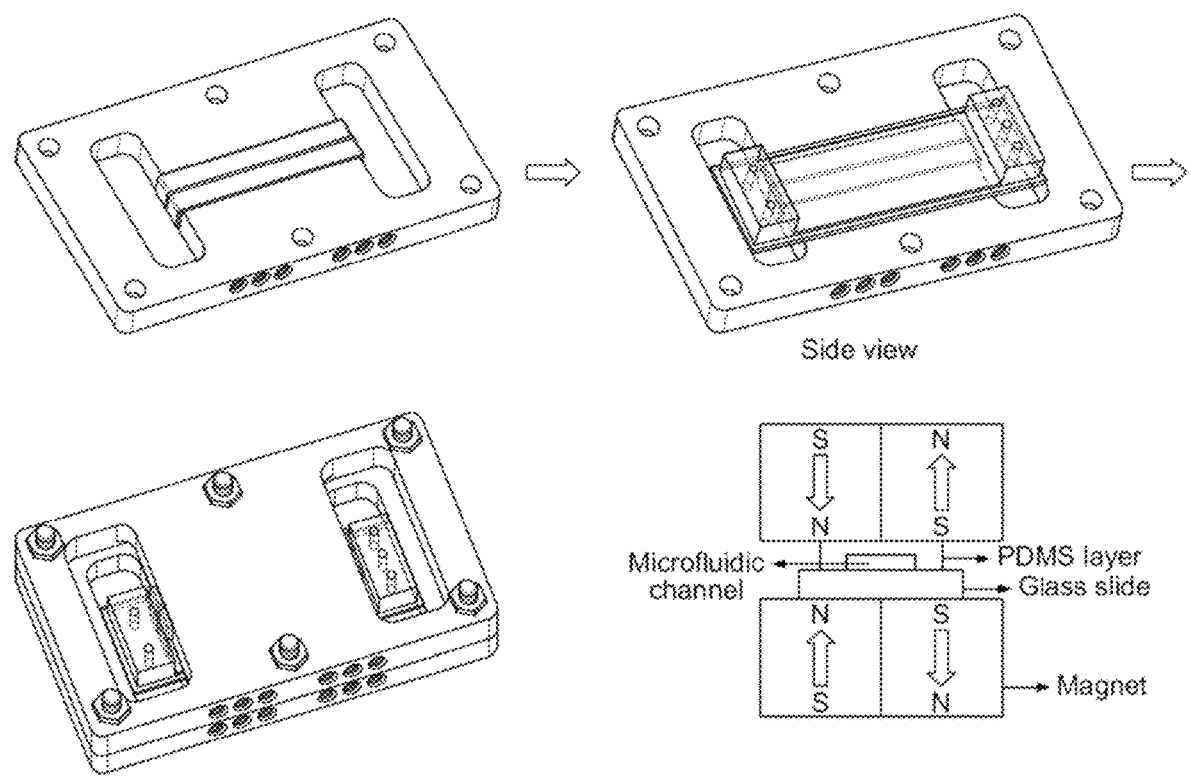
FIG. 13: The microfluidic device is sandwiched between the two device holders, which consist of top and bottom magnet arrays repelling each other and is secured with screws and nuts. The center of the stage 3's microchannel in FIG. 1 is aligned exactly with the center of the magnet arrays.

In this device, we have developed a marker-independent and size-independent integrated ferrohydrodynamic cell separation (iFCS) method, which is biocompatible and could enrich entire rare circulating tumor cells (CTCs) from patient blood with a high throughput and a high recovery rate. The blood samples suspended in ferrofluids (0.03% v/v) are injected into the inlet A and focused by sheath flow through inlet B (ferrofluids with a concentration of 0.03% v/v). The majority of labeled white blood cells (WBCs) and free Dynabeads are depleted into the waste outlet 1 in stage 2. The unlabeled cells and some labeled WBCs, including CTCs, enter the stage 3. The CTCs are then continuously deflected to the two sides of the channel and labeled WBCs and free beads are focused in the center of the channel, as shown in FIGS. 12A-12C.

Figure 14:
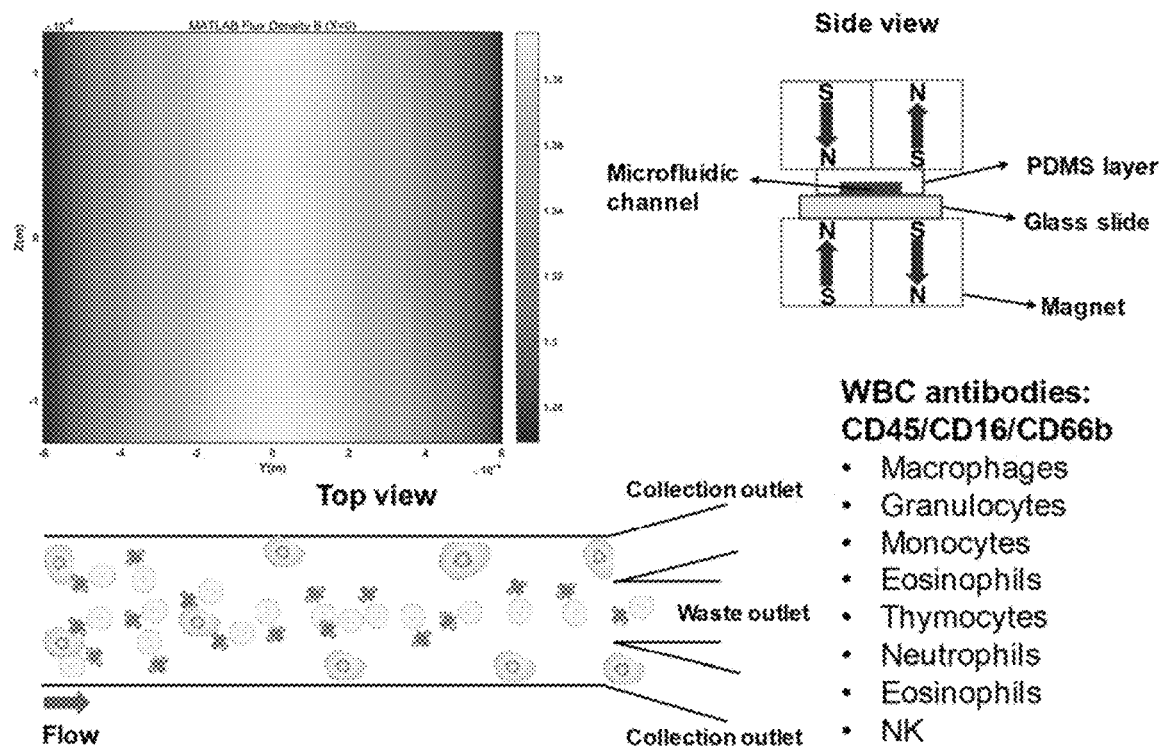
FIG. 14: The simulation result shows the magnetic field is stronger in the center of the stage 3 region in FIG. 1. As a result, the labeled white blood cells and free magnetic beads are focused in the center of the channel and are collected through the waste outlet. At the same time, any unlabeled cells, including circulating tumor cells are deflected into two sides of the channel and are collected through collection outlets. Whole blood is labeled and lysed by RBC lysing buffer before it is processed with the FCSv2. Leukocyte-specific biotinylated antibodies (anti-CD45, anti-CD66b and anti-CD16) and magnetic Dynabeads are added to the blood sample for incubation.

The magnet holder consists of top and bottom parts and is secured with screws and nuts. Two magnet arrays repelling each other are placed in the top and bottom holders, respectively. The microfluidic device is sandwiched between the magnet holders and the center of the stage 3's channel is exactly aligned with the center of the magnet arrays (FIGS. 12A-12C and FIG. 13). CTCs enrichment is achieved by inputting red blood cell (RBC)-lysed blood that is pre-labeled with magnetic beads (Dynabeads MyOne Streptavidin T1) targeting WBCs via CD45, CD16 and CD66B surface antigens (FIG. 14). We will refer this multiple stage device as FCSv2.

Figures 15A, 15B:
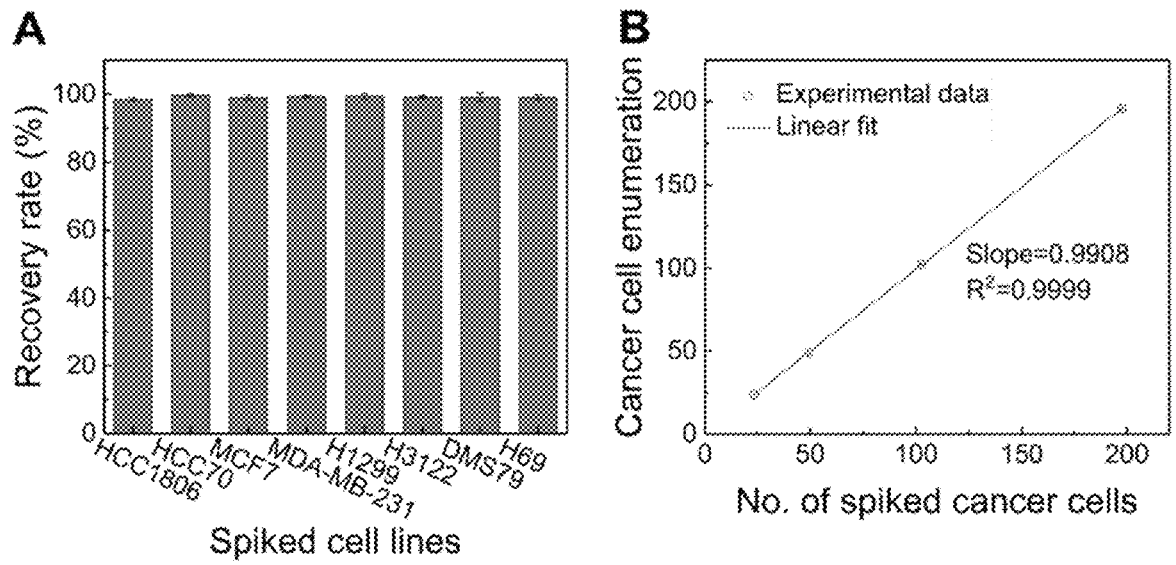
FIG. 15A Recovery rate of separated cancer cells for different cancer cell lines at the flow rate of 12 mL/h. recovery rates of 98.46±0.50%, 99.68±0.46%, 99.05±0.75%, 99.35±0.46%, 99.40±0.85%, 99.13±0.49%, 99.11±1.25%, and 99.11±0.74% are achieved for HCC1806 (breast cancer), HCC70 (breast cancer), MCF7 (breast cancer), MDA-MB-231 (breast cancer), H1299 (non-small cell lung cancer), H3122 (non-small cell lung cancer), DMS79 (small cell lung cancer), and H69 (small cell lung cancer) cell lines, respectively.
(FIG. 15B) A series of spike-in separation experiments in which a certain number (20, 50, 100, and 200) of HCC70 breast cancer cells are spiked into 1 mL of labeled white blood cells. An average recovery rate is 99.08%.
Figures 16A, 16B:
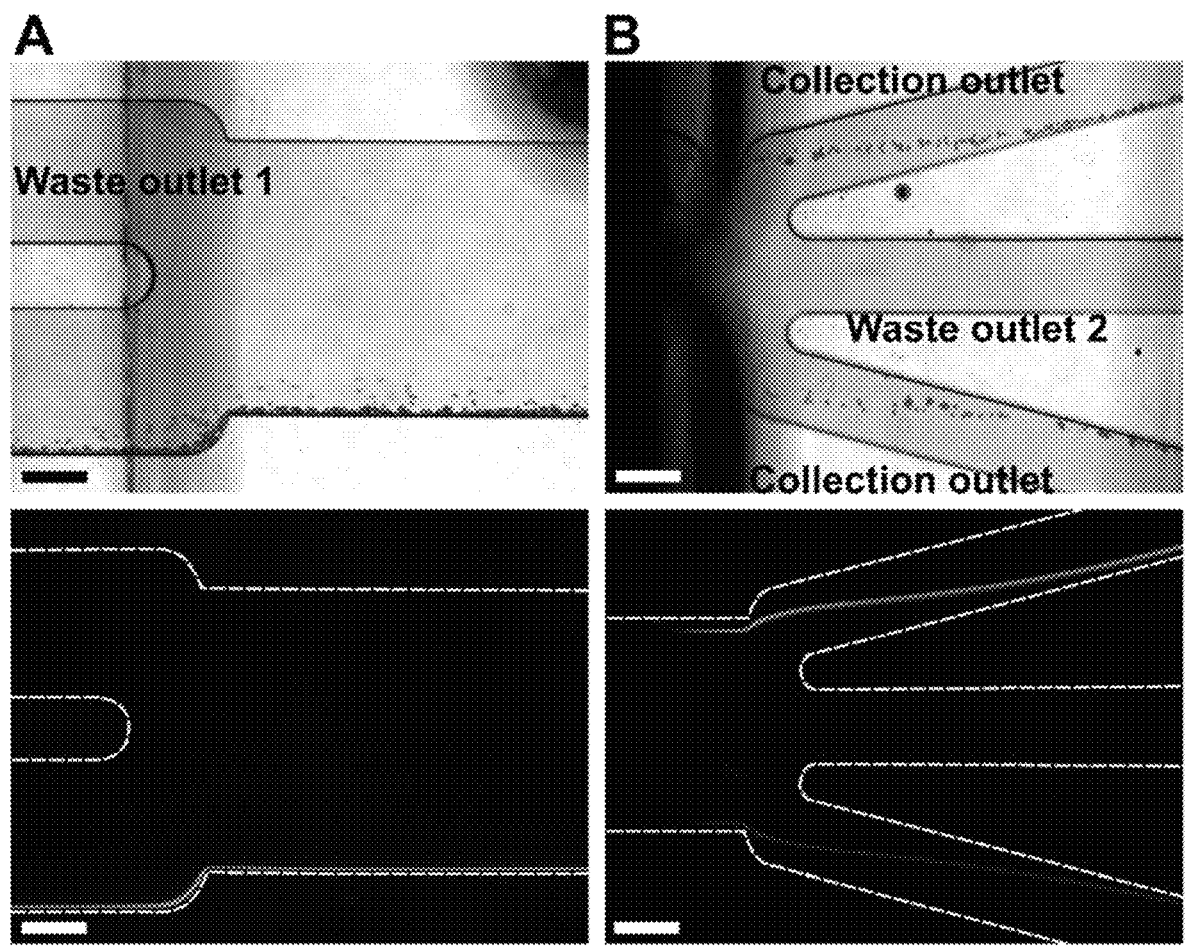
FIGS. 16A-16B. Bright field and fluorescence image of spiked MDA-MB-231 breast cancer cells (labeled with CellTracker Green) during the separation process confirmed the cancer cell trajectories at the end of stages 2 and 3 in FIGS. 12A-12C. Scale bars: 500 µm.

We performed systematic optimization of this method and determined parameters in the microfluidic device that achieved an average recovery rate of 99.16% using 8 different cell lines (HCC1806, HCC70, MCF7, MDA-MB-231, H1299, H3122, DMS79, and H69) from RBC-lysed WBCs, which were labeled with Dynabeads conjugated with leukocyte antibodies. The developed device is able to process 12 mL of blood within one hour. The device achieved an average WBC carryover of 527 WBCs per mL of input blood. Specifically, for each cell line at ~100 cells per mL spike ratio, the recovery rates of cancer cells were 98.46±0.50% (HCC1806 breast cancer), 99.68±0.46% (HCC70 breast cancer), 99.05±0.75% (MCF7 breast cancer), 99.35±0.46% (MDA-MB-231 breast cancer), 99.40±0.85% (H1299 non-small cell lung cancer), 99.13±0.49% (H3122 non-small cell lung cancer), 99.11±1.25% (DMS79 small cell lung cancer), and 99.11±0.74% (H69 small cell lung cancer). To validate that the device has the potential to process clinically relevant blood samples, a series of spike-in experiments in which a certain number of HCC70 breast cancer cells (20, 50, 100, and 200) are spiked into 1 mL of WBCs. As shown in FIGS. 15A-15B, an average recovery rate of 99.08% is achieved in the FCSv2 device. FIGS. 16A-16B show the separation of spiked cancer cells (stained with CellTrack Green) at the end of stages 2 and 3.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The present disclosure will be better understood upon review of the following features, which should not be confused with the claims.

Feature 1. A multi-stage microfluidic device for enriching circulating tumor cells in a biological sample, the device comprising: (i) a first stage comprising a first end, a second end, a first microfluidic channel fluidly connecting the first end and the second end, a first fluid inlet fluidly connected to the first microfluidic channel at the first end, and one or more filters along a length of the first microfluidic channel; wherein the first fluid inlet is configured to receive the biological sample; and wherein the one or more filters are configured to remove a first plurality of waste particles from the biological sample; (ii) a second stage comprising a third end, a fourth end, a second microfluidic channel fluidly connecting the third end and the fourth end, a second fluid inlet fluidly connected to the second microfluidic channel at the third end, and a first fluid outlet fluidly connected to the second microfluidic channel at the fourth end; wherein the second fluid inlet is configured to receive a sheathing fluid; wherein the first fluid outlet is configured to receive a second plurality of waste particles from the biological sample; and (iii) a third stage comprising a fifth end, a sixth end, a third microfluidic channel fluidly connecting the fifth end and the sixth end; a second fluid outlet fluidly connected to the third microfluidic channel at the sixth end, and one or more circulating tumor cell outlets fluidly connected to the third microfluidic channel at the sixth end; wherein the second fluid outlet is configured to receive a third plurality of waste particles from the biological sample; and wherein the one or more circulating tumor cell outlets are configured to receive a majority of the circulating tumor cells from the biological sample.

Feature 2. The microfluidic device according to Feature 1, further comprising one or more magnetic sources, wherein the one or more magnetic sources cause one or both of: (a) a non-uniform magnetic field along a length of the second microfluidic channel having a component sufficiently perpendicular to the second microfluidic channel to cause magnetic particles in the second microfluidic channel to be deflected into the first fluid outlet; and (b) a focusing magnetic field having a field maximum along a length of the third microfluidic channel sufficient to cause magnetic particles in the third microfluidic channel to be focused toward a center of the third microfluidic channel.

Feature 3. The microfluidic device according to any one of Features 1-2, wherein the device comprises a first magnet array and a second magnet array; wherein the third stage is sandwiched between the first magnet array and the second magnet array; wherein the first magnet array and the second magnet array are oriented to repel each other; and wherein the third stage is oriented such that the length of the third microfluidic channel is centrally aligned between the first magnet array and the second magnet array.

Feature 4. The microfluidic device according to any one of Features 1-3, wherein one or more of the first microfluidic channel, the second microfluidic channel, and the third microfluidic channel have a thickness of about 10 µm to about 10000 µm, about 10 µm to about 1000 µm, about 10 µm to about 500 µm, about 150 µm to about 350 µm, about 220 µm to about 280 µm, or about 250 µm.

Feature 5. The microfluidic device according to any one of Features 1-4, wherein the second stage has a width of about 50 µm to about 10000 µm, about 500 µm to about 5000 µm, about 1200 µm to about 2000 µm, about 1400 µm to about 1800 µm, or about 1600 µm.

Feature 6. The microfluidic device according to any one of Features 1-5, wherein the third stage has a width of about 50 µm to about 10000 µm, about 500 µm to about 5000 µm, about 800 µm to about 1600 µm, about 1000 µm to about 1400 µm, or about 1200 µm.

Feature 7. The microfluidic device according to any one of Features 1-6, wherein the majority of the circulating tumor cells comprises about 90%, about 92%, about 95%, about 97%, or more of the circulating tumor cells as compared to a total number of circulating tumor cells present in the biological sample inserted into the first fluid inlet when in operation.

Feature 8. The microfluidic device according to any one of Features 1-7, wherein the biological sample comprises whole blood, wherein the whole blood comprises a plurality of components.

Feature 9. The microfluidic device according to any one of Features 1-8, wherein the plurality of components comprises magnetically labelled white blood cells, and wherein at least 95%, at least 98%, at least 99%, at least 99.9%, or more of the white blood cells are not collected in the one or more circulating tumor cell outlets as compared to a total number of white blood cells present in the whole blood inserted into the first fluid inlet when in operation.

Feature 10. The microfluidic device according to any one of Features 1-9, wherein the plurality of components comprises magnetically labelled white blood cells, and wherein at least 95%, at least 98%, at least 99%, at least 99.9%, or more of the white blood cells are collected in one or more of the filters, the first fluid outlet, and the second fluid outlet as compared to a total number of white blood cells present in the whole blood inserted into the first fluid inlet when in operation.

Feature 11. The microfluidic device according to any one of Features 1-10, wherein the plurality of components comprise unlabeled rare cells and at least 90%, 92%, 95%, or more of the unlabeled rare cells are collected in the one or more circulating tumor cell outlets as compared to a total number of unlabeled rare cells present in the whole blood inserted into the first fluid inlet when in operation.

Feature 12. A method of enriching circulating tumor cells in a biological sample comprising a plurality of components, the method comprising introducing the biological sample into the first fluid inlet of a microfluidic device according to any one of claims 1-11 at a flow rate sufficient to cause the biological sample to flow along the first microfluidic channel, the second microfluidic channel, and the third microfluidic channel such that a majority of the circulating tumor cells from the biological sample are collected in the one or more circulating tumor cell outlets.

Feature 13. The method according to Feature 12, wherein the biological sample is whole blood.

Feature 14. The method according to Feature 12 or Feature 13, wherein the biological sample comprises about 50 to about 250 circulating tumor cells per milliliter of the biological sample.

Feature 15. The method according to any one of Features 12-14, wherein the flow rate is about 6 milliliters to about 25 milliliters of the biological sample per hour.

Feature 16. The method according to any one of Features 12-15, wherein the circulating tumor cells are selected from the group consisting of a primary cancer cell, a lung cancer cell, a prostate cancer cell, a breast cancer cell, a pancreatic cancer cell, and a combination thereof.

Feature 17. A single-stage microfluidic device for enriching circulating tumor cells in a biological sample, the device comprising a first stage comprising: a first end, a second end, a microfluidic channel fluidly connecting the first end and the second end, a fluid inlet fluidly connected to the microfluidic channel at the first end, three fluid outlets each fluidly connected to the microfluidic channel at the second end, and a magnet along a length of the microfluidic channel to create a non-uniform magnetic field along the microfluidic channel; wherein the microfluidic channel has a length of about 1 cm to about 100 cm; wherein the microfluidic channel has a width of about 50 µm to about 10000 µm; wherein the microfluidic channel has a thickness of about 10 µm to about 10000 µm; and wherein a gradient of magnetic field flux density of the magnet is about 0.001 T/m to 1000 T/m.

Feature 18. A method of enriching circulating tumor cells in a biological sample comprising a plurality of components, the method comprising introducing the biological sample and a biocompatible ferrofluid into the fluid inlet of a microfluidic device according to claim 17 at a flow rate sufficient to cause the biological sample to flow along the microfluidic channel, wherein a majority of the circulating tumor cells from the biological sample are collected in one of the outlets.

Feature 19. The method according to Feature 18, wherein the flow rate is about 10 µL to about 600 µL per minute.

Feature 20. The method according to Feature 18 or Feature 19, wherein the biological sample is whole blood.

Feature 21. The method according to any one of Features 18-20, wherein the biological sample comprises about 50 to about 250 circulating tumor cells per milliliter of the biological sample.

Feature 22. The method according to any one of Features 18-21, wherein the flow rate is about 6 milliliters to about 25 milliliters of the biological sample per hour.

Feature 23. The method according to any one of Features 18-22, wherein the circulating tumor cells are selected from the group consisting of a primary cancer cell, a lung cancer cell, a prostate cancer cell, a breast cancer cell, a pancreatic cancer cell, and a combination thereof.

Feature 24. A method of enriching circulating tumor cells in a sample of whole blood, wherein the whole blood comprises unlabeled rare cells and white blood cells, the method comprising: (i) adding a plurality of magnetic beads to the sample to produce a magnetically labeled sample, wherein at least some of the white blood cells are associated with the magnetic beads; (ii) filtering the magnetically labeled sample in a microfluidic device to produce a filtered sample by removing large cell debris from the magnetically labeled sample; (iii) separating at least a portion of the white blood cells that are associated with the magnetic beads by flowing the filtered sample through a sheath flow in a nonuniform magnetic field to produce a first enriched sample; and (iv) isolating a majority of the unlabeled rare cells by magnetic flow focusing the first enriched sample in a microfluidic channel.

I claim:

1. A method of enriching rare cells in a biological sample, wherein the biological sample comprises unlabeled rare cells and white blood cells, the method comprising:
   (i) adding a plurality of magnetic beads to the sample such that the magnetic beads associate with at least a portion of the white blood cells in the sample to produce a magnetically labeled sample having magnetically labeled white blood cells;
   (ii) introducing the magnetically labeled sample into a multi-stage microfluidic device comprising a first stage, a second stage, a third stage, and a magnetic source comprising a first magnet array and a second magnet array oriented to repel each other, wherein the third stage is sandwiched between the first magnet array and second magnet array and oriented such that a length of a third-stage microfluidic channel in the third stage is centrally aligned between the first magnet array and second magnet array;
   (iii) filtering the magnetically labeled sample in the first stage of the microfluidic device to produce a filtered sample;
   (iv) separating at least a portion of the magnetically labeled white blood cells by flowing the filtered sample and a biocompatible sheathing ferrofluid in sheath flow in the second stage of the microfluidic device under a nonuniform magnetic field to produce a first enriched sample, wherein the magnetic source is adjacent to the second stage and configured to produce a nonuniform magnetic field having a component sufficiently perpendicular to a length of a microfluidic channel of the second stage to cause a plurality of magnetically labeled white blood cells to be deflected into a first fluid outlet at an end of the second-stage microfluidic channel, wherein the first fluid outlet is offset from a central diameter of the second-stage microfluidic channel; and
   (v) isolating a portion of the unlabeled rare cells from the first enriched sample by flowing the first enriched sample in the third stage of the microfluidic device under a focusing magnetic field to separate additional magnetically labeled white blood cells from the unlabeled rare cells to produce enriched rare cells, wherein the first and second magnet arrays are configured to produce a substantially symmetric magnetic field having a field maximum along a length of the microfluidic channel of the third stage sufficient to cause the magnetically labeled white blood cells in the third-stage microfluidic channel to be focused toward a center of the channel and to exit the channel via a second fluid outlet and to cause circulating tumor cells to be deflected towards an outer portion of the third-stage microfluidic channel and to exit the channel via one or more circulating tumor cell outlet.

2. The method of claim 1, wherein the biological sample comprises whole blood having a plurality of components.

3. The method of claim 1, wherein the biological sample comprises red blood cell lysed whole blood.

4. The method of claim 1, wherein the biological sample comprises about 50 to about 250 circulating tumor cells per milliliter of the biological sample.

5. The method of claim 1, wherein the unlabeled rare cells are circulating tumor cells.

6. The method of claim 5, wherein the circulating tumor cells are selected from the group consisting of a primary cancer cell, a lung cancer cell, a prostate cancer cell, a breast cancer cell, a pancreatic cancer cell, and a combination thereof.

7. The method of claim 1, wherein the magnetic beads are conjugated with leukocyte antibodies for binding white blood cells in the biological sample.

8. The method of claim 1, wherein the biocompatible sheathing ferrofluid comprises magnetic nanoparticles and a biocompatible surfactant suspended in a biocompatible carrier fluid.

9. The method of claim 1, wherein the biological sample is combined with a biocompatible ferrofluid prior to introduction into the microfluidic device, wherein the biocompatible ferrofluid has the same composition as the biocompatible sheathing ferrofluid.

10. The method of claim 1, comprising flowing the biological sample through the microfluidic device at a flow rate of about 6 milliliters to about 25 milliliters per hour.

11. The method of claim 1, comprising flowing the biological sample through the microfluidic device at a flow rate of about 10 µL to about 600 µL per minute.

12. The method of claim 1, wherein about 90% or more of the unlabeled rare cells are collected in the enriched rare cells produced as compared to a total number of unlabeled rare cells present in the biological sample introduced into the microfluidic device.

13. The method of claim 1, wherein about 95% or more of the white blood cells in the biological sample are separated from the produced enriched rare cells, as compared to a total number of white blood cells present in the biological sample introduced into the microfluidic device.

14. A method of enriching rare cells in a biological sample, wherein the biological sample comprises unlabeled rare cells and white blood cells, the method comprising:
   (i) adding a plurality of magnetic beads to the sample such that the magnetic beads associate with at least a portion of the white blood cells in the sample to produce a magnetically labeled sample having magnetically labeled white blood cells;
   (ii) introducing the magnetically labeled sample into a multi-stage microfluidic device comprising a first stage, a second stage, a third stage, and a magnetic source comprising a first magnet array and a second magnet array oriented to repel each other, wherein the third stage is sandwiched between the first magnet array and second magnet array and oriented such that a length of a third-stage microfluidic channel in the third stage is centrally aligned between the first magnet array and second magnet array;

(iii) separating at least a portion of the magnetically labeled white blood cells by flowing the magnetically labeled sample and a biocompatible sheathing ferrofluid in sheath flow in the second stage of the microfluidic device under a nonuniform magnetic field to produce a first enriched sample, wherein the magnetic source is adjacent to the second stage and configured to produce a nonuniform magnetic field having a component sufficiently perpendicular to a length of a microfluidic channel of the second stage to cause a plurality of magnetically labeled white blood cells to be deflected into a first fluid outlet at an end of the second-stage microfluidic channel, wherein the first fluid outlet is offset from a central diameter of the second-stage microfluidic channel; and (iv) isolating a portion of the unlabeled rare cells from the first enriched sample by flowing the first enriched sample in the third stage of the microfluidic device under a focusing magnetic field to separate additional magnetically labeled white blood cells from the unlabeled rare cells to produce enriched rare cells, wherein the first and second magnet arrays are configured to produce a substantially symmetric magnetic field having a field maximum along a length of the microfluidic channel of the third stage sufficient to cause the magnetically labeled white blood cells in the third-stage microfluidic channel to be focused toward a center of the channel and to exit the channel via a second fluid outlet and to cause circulating tumor cells to be deflected towards an outer portion of the third-stage microfluidic channel and to exit the channel via one or more circulating tumor cell outlet.

15. The method of claim 14, wherein the biological sample comprises red blood cell lysed whole blood, wherein the red blood cell lysed whole blood is filtered before introducing the sample into the multi-stage microfluidic device.

* * * * *

UNITED STATES PATENT AND TRADEMARK OFFICE
CERTIFICATE OF CORRECTION

PATENT NO. : 11,648,559 B2
APPLICATION NO. : 16/636517
DATED : May 16, 2023
INVENTOR(S) : Leidong Mao, Yang Liu and Wujun Zhao It is certified that error appears in the above-identified patent and that said Letters Patent is hereby corrected as shown below:

On the Title Page

Item (12) Mao should be Mao et al.

Item (72) add inventors "Yang LIU Bogart, GA" and "Wujun ZHAO Waunakee, WI"

Signed and Sealed this
First Day of April, 2025

Coke Morgan Stewart
*Acting Director of the United States Patent and Trademark Office*